United States Patent
Okubo et al.

(10) Patent No.: US 8,548,308 B2
(45) Date of Patent: Oct. 1, 2013

(54) PLAYBACK APPARATUS, INTEGRATED CIRCUIT, AND PLAYBACK METHOD CONSIDERING TRICKPLAY

(75) Inventors: Masafumi Okubo, Osaka (JP); Germano Leichsenring, Osaka (JP)

(73) Assignee: Panasonic Corporation, Osaka (JP)

( * ) Notice: Subject to any disclaimer, the term of this patent is extended or adjusted under 35 U.S.C. 154(b) by 291 days.

(21) Appl. No.: 12/620,242

(22) Filed: Nov. 17, 2009

(65) Prior Publication Data

US 2010/0150523 A1 Jun. 17, 2010

Related U.S. Application Data

(60) Provisional application No. 61/115,742, filed on Nov. 18, 2008, provisional application No. 61/184,038, filed on Jun. 4, 2009.

(30) Foreign Application Priority Data

Nov. 18, 2008 (JP) ................... 2008-294501
Apr. 16, 2009 (JP) ................... 2009-099914

(51) Int. Cl.
| | |
|---|---|
| H04N 5/783 | (2006.01) |
| H04N 9/80 | (2006.01) |
| H04N 5/76 | (2006.01) |
| H04N 5/917 | (2006.01) |
| H04N 5/93 | (2006.01) |

(52) U.S. Cl.
USPC ........... 386/343; 386/248; 386/341; 386/353; 386/355; 386/357

(58) Field of Classification Search
USPC .............. 386/343–352, 239–248; 348/42–60
See application file for complete search history.

(56) References Cited

U.S. PATENT DOCUMENTS

| 5,923,869 A | 7/1999 | Kashiwagi et al. |
| 5,929,859 A | 7/1999 | Meijers |

(Continued)

FOREIGN PATENT DOCUMENTS

| CN | 1247004 A | 3/2000 |
| CN | 1739156 A | 2/2006 |

(Continued)

OTHER PUBLICATIONS

Lenny Lipton, "Foundations of the Stereoscopic Cinema, a Study in Depth", pp. 68, 69 and 260-262, Copyright 1982.

(Continued)

*Primary Examiner* — Hung Dang
(74) *Attorney, Agent, or Firm* — Greenblum & Bernstein, P.L.C.

(57) ABSTRACT

A read unit 201 reads a digital stream that includes a left-view video stream and a right-view video stream from a recording medium. A mode storage unit 203 stores either a 3D mode to show a user video frames in stereoscopic view or a 2D mode to show a user video frames in monoscopic view as a playback mode of the apparatus. A dimension determining unit 202 determines whether the digital stream read from the recording medium supports 3D mode. When (i) the digital stream supports 3D mode and (ii) the current playback mode is 3D mode, a demultiplexer 204 separates the left-view video stream and the right-view video stream from the digital stream, and when condition (i) or (ii) is not met, the demultiplexer 204 separates either the left-view video stream or the right-view video stream from the digital stream.

15 Claims, 42 Drawing Sheets

(56) References Cited

U.S. PATENT DOCUMENTS

| | | |
|---|---|---|
| 6,393,574 B1 | 5/2002 | Kashiwagi et al. |
| 6,470,460 B1 | 10/2002 | Kashiwagi et al. |
| 6,573,819 B1 | 6/2003 | Oshima et al. |
| 6,574,423 B1 | 6/2003 | Oshima et al. |
| 6,925,250 B1 | 8/2005 | Oshima et al. |
| 7,119,849 B2 | 10/2006 | Yui et al. |
| 8,111,283 B2 | 2/2012 | Kim et al. |
| 2001/0053281 A1 | 12/2001 | Kashiwagi et al. |
| 2001/0055474 A1 | 12/2001 | Kashiwagi et al. |
| 2002/0001454 A1 | 1/2002 | Kashiwagi et al. |
| 2002/0001455 A1 | 1/2002 | Kashiwagi et al. |
| 2002/0003944 A1 | 1/2002 | Kashiwagi et al. |
| 2002/0003945 A1 | 1/2002 | Kashiwagi et al. |
| 2002/0003950 A1 | 1/2002 | Kashiwagi et al. |
| 2002/0003951 A1 | 1/2002 | Kashiwagi et al. |
| 2002/0025143 A1 | 2/2002 | Kashiwagi et al. |
| 2003/0053797 A1* | 3/2003 | Oshima et al. ............. 386/98 |
| 2003/0108341 A1 | 6/2003 | Oshima et al. |
| 2003/0138238 A1 | 7/2003 | Kashiwagi et al. |
| 2003/0147627 A1* | 8/2003 | Kim ..................... 386/68 |
| 2004/0146279 A1 | 7/2004 | Seo et al. |
| 2004/0148456 A1 | 7/2004 | Seo et al. |
| 2004/0151472 A1 | 8/2004 | Seo et al. |
| 2004/0175133 A1 | 9/2004 | Kashiwagi et al. |
| 2004/0179820 A1 | 9/2004 | Kashiwagi et al. |
| 2005/0180735 A1 | 8/2005 | Oshima et al. |
| 2006/0117357 A1 | 6/2006 | Surline |
| 2006/0269226 A1 | 11/2006 | Ito et al. |
| 2006/0290817 A1 | 12/2006 | Yui et al. |
| 2007/0002041 A1 | 1/2007 | Kim et al. |
| 2007/0003220 A1 | 1/2007 | Hamasaka et al. |
| 2007/0073780 A1 | 3/2007 | Seo et al. |
| 2007/0088752 A1* | 4/2007 | Seo et al. ................. 707/104.1 |
| 2007/0230917 A1* | 10/2007 | Okada et al. ............. 386/108 |
| 2007/0248321 A1* | 10/2007 | Hamada et al. ............ 386/95 |
| 2007/0258698 A1 | 11/2007 | Okada et al. |
| 2007/0296809 A1* | 12/2007 | Newbery ................. 348/42 |
| 2008/0002946 A1 | 1/2008 | Ikeda et al. |
| 2008/0036854 A1 | 2/2008 | Elliott et al. |
| 2008/0056686 A1 | 3/2008 | Oshima et al. |
| 2008/0063385 A1 | 3/2008 | Oshima et al. |
| 2008/0063386 A1 | 3/2008 | Oshima et al. |
| 2008/0075419 A1 | 3/2008 | Okubo et al. |
| 2008/0101767 A1 | 5/2008 | Oshima et al. |
| 2008/0145031 A1 | 6/2008 | Tanaka et al. |
| 2008/0292287 A1 | 11/2008 | Oshima et al. |
| 2009/0028519 A1 | 1/2009 | Seo et al. |
| 2009/0103833 A1 | 4/2009 | Mitsuhashi et al. |
| 2009/0103902 A1 | 4/2009 | Matsuura et al. |
| 2009/0220215 A1 | 9/2009 | Oshima et al. |
| 2009/0252483 A1 | 10/2009 | Oshima et al. |
| 2010/0020158 A1 | 1/2010 | Oshima et al. |
| 2010/0086285 A1* | 4/2010 | Sasaki et al. ............. 386/108 |
| 2010/0111503 A1 | 5/2010 | Oshima et al. |
| 2010/0119213 A1 | 5/2010 | Oshima et al. |
| 2010/0124406 A1 | 5/2010 | Seo et al. |
| 2010/0142924 A1* | 6/2010 | Yamashita et al. ............ 386/95 |
| 2010/0150529 A1* | 6/2010 | Leichsenring et al. ......... 386/95 |
| 2010/0208042 A1* | 8/2010 | Ikeda et al. ................. 348/53 |
| 2011/0080468 A1 | 4/2011 | Oshima et al. |
| 2011/0181695 A1 | 7/2011 | Oshima et al. |
| 2011/0181696 A1 | 7/2011 | Oshima et al. |
| 2011/0181697 A1 | 7/2011 | Oshima et al. |
| 2011/0181698 A1 | 7/2011 | Oshima et al. |
| 2011/0181699 A1 | 7/2011 | Oshima et al. |
| 2011/0181700 A1 | 7/2011 | Oshima et al. |
| 2011/0234751 A1 | 9/2011 | Oshima et al. |
| 2011/0234752 A1 | 9/2011 | Oshima et al. |
| 2011/0236001 A1 | 9/2011 | Oshima et al. |
| 2011/0279642 A1 | 11/2011 | Oshima et al. |
| 2012/0002006 A1 | 1/2012 | Kim et al. |
| 2012/0189276 A1 | 7/2012 | Oshima et al. |
| 2012/0189277 A1 | 7/2012 | Oshima et al. |
| 2012/0189278 A1 | 7/2012 | Oshima et al. |

FOREIGN PATENT DOCUMENTS

| | | |
|---|---|---|
| CN | 1842869 A | 10/2006 |
| EP | 1603335 | 12/2005 |
| EP | 1633148 | 3/2006 |
| EP | 1739979 | 1/2007 |
| JP | 7-327242 | 12/1995 |
| JP | 11-191895 | 7/1999 |
| JP | 2002-095017 | 3/2002 |
| JP | 2003-298938 | 10/2003 |
| JP | 2004-274125 | 9/2004 |
| JP | 2005-110121 | 4/2005 |
| JP | 2007-221818 | 8/2007 |
| JP | 2008-5203 | 1/2008 |
| JP | 2008-103820 | 5/2008 |
| WO | 98/25413 A1 | 6/1998 |
| WO | 2005/024828 | 3/2005 |
| WO | 2005/119675 | 12/2005 |

OTHER PUBLICATIONS

International Search Report dated Dec. 15, 2009 that issued with respect to PCT/JP2009/006135.

China Office action Office action, mail date is Apr. 24, 2013, for App. No. 200980117335.9.

Search report from E.P.O., mail date is Jul. 29, 2013, for Application No. 09827328.7.

\* cited by examiner

FIG. 3
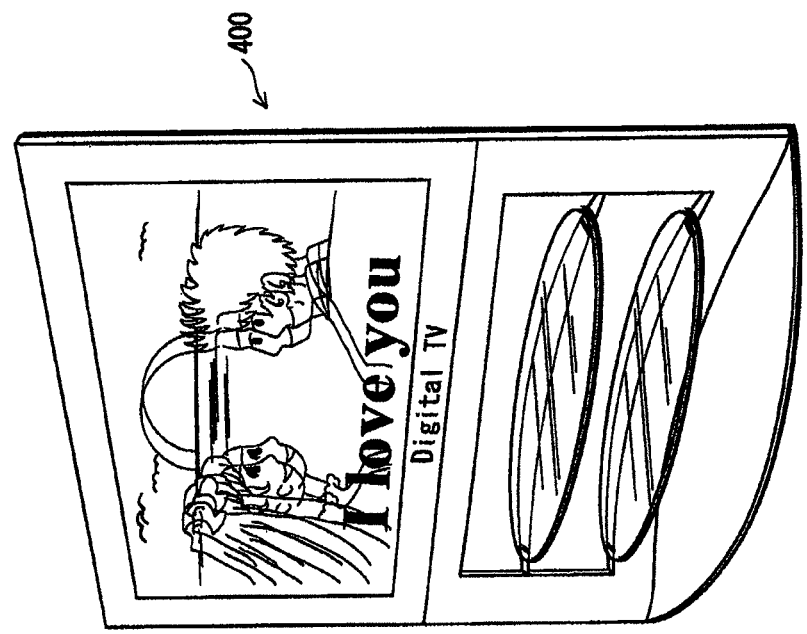
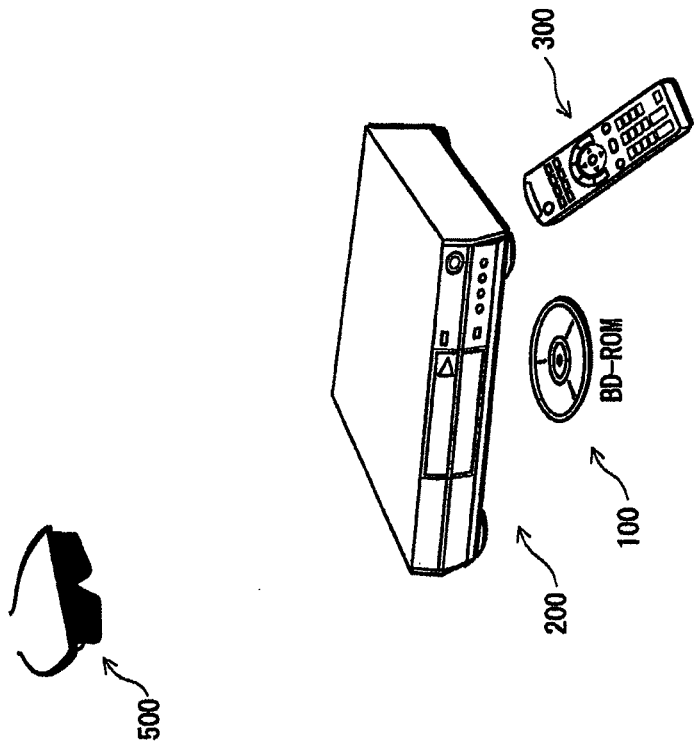

FIG. 6

| 00001.mpls | | |
|---|---|---|
| Playback attribute information | | |
| Version | 2.00 | |
| Playback type | Movie/sequential | |
| Dimension identifying flag | 2D | |

| Playback data information | | |
|---|---|---|
| PlayItem #0 information | | |
| Stream file information | 00001 | |
| Playback time information | 0x002932E0 | |
| Logical stream number | Packet ID | Language attribute |
| Video #1 | 0x02 | — |
| Audio #1 | 0x80 | Japanese |
| Subtitles #1 | 0x92 | Japanese |

Three pieces of stream registration information

FIG. 7

00001.mpls

Playback attribute information

| Version | 2.00 |
|---|---|
| Playback type | Movie/sequential |
| Dimension identifying flag | 3D |

Playback data information

PlayItem #0 information

| Stream file information | 00001 |
|---|---|
| Playback time information | 0x002932E0 |

| Logical stream number | Packet ID | Language attribute | Visual attribute |
|---|---|---|---|
| Video #1 | 0x02 | — | Left-view |
| Video #2 | 0x02 | — | Right-view |
| Audio #1 | 0x80 | Japanese | — |
| Subtitles #1 | 0x92 | Japanese | — |

Four pieces of stream registration information

FIG. 9

Register set /12

| Playback state register | |
|---|---|
| Number | Value |
| (0) | 0x00000001 |
| (1) | 0x000000FF |
| (2) | 0x0FFF0FFF |
| (3) | 0x00000001 |
| (4) | 0x0000FFFF |
| (5) | 0x0000FFFF |
| (14) | 0x20000000 |
| (29) | 0x00000004 |
| (126) | 0x00000000 |
| (127) | 0x00000000 |

| Generic register | |
|---|---|
| Number | Value |
| (0) | 0 |
| (1) | 0 |
| (2) | 0 |
| (3) | 0 |
| (4) | 0 |
| (5) | 0 |
| (6) | 0 |
| (7) | 0 |
| (8) | 0 |
| (9) | 0 |
| (4093) | 0 |
| (4094) | 0 |
| (4095) | 0 |

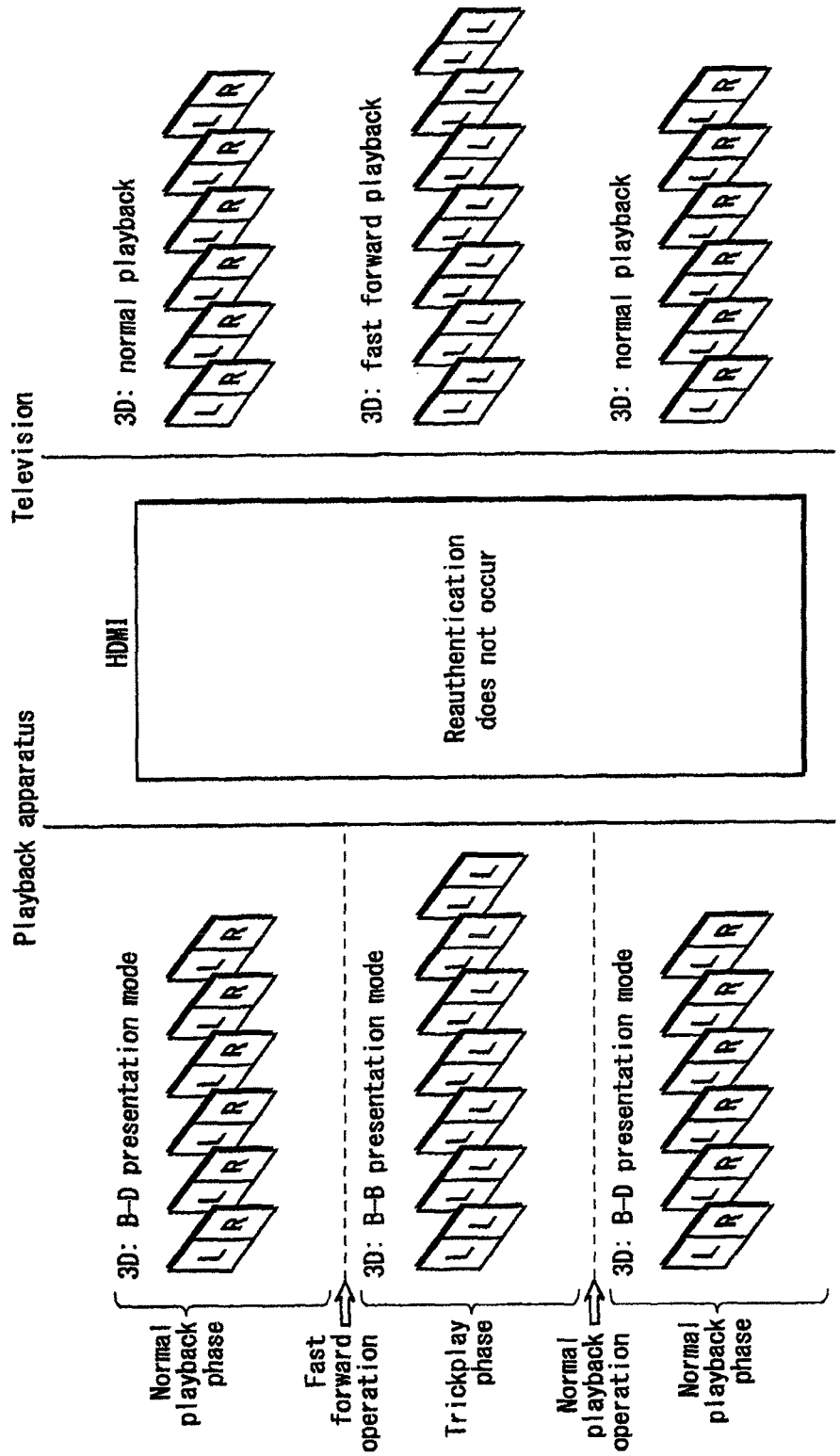

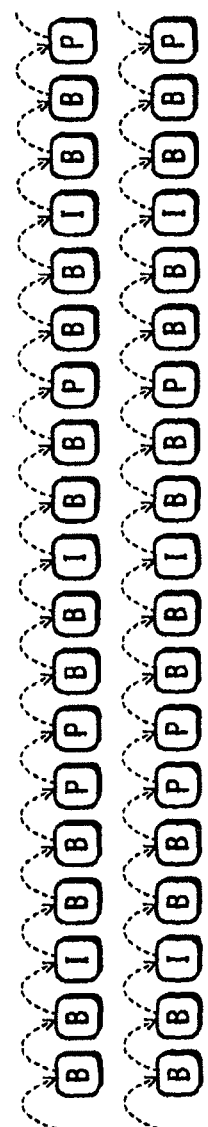
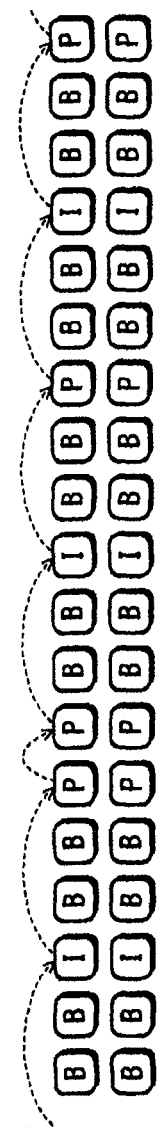
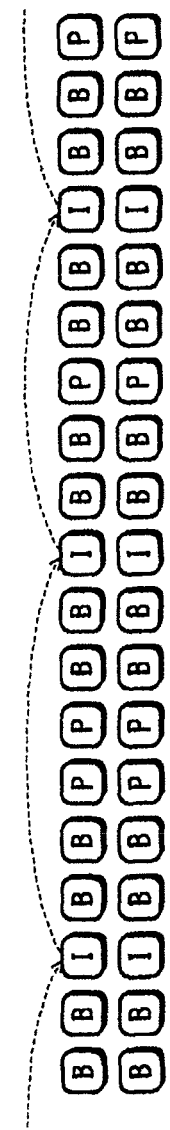
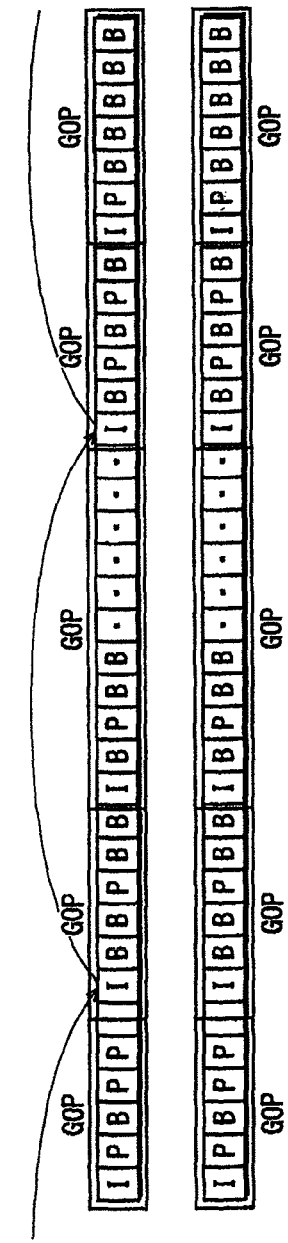
FIG. 28A 1x speed
FIG. 28B 2x speed
FIG. 28C 4x speed
FIG. 28D 10x speed □ ··· 8-bit area (storing pixel code representing YCrCbα)

| Y value | Cr value | Cb value | Transparency α |

□ ··· Transparent pixel  Expressed by pixel code indicating transparent color
■ ··· Colored pixel  Expressed by pixel code other than transparent color Shifted 15 pixels to the right Shifted 15 pixels to the left

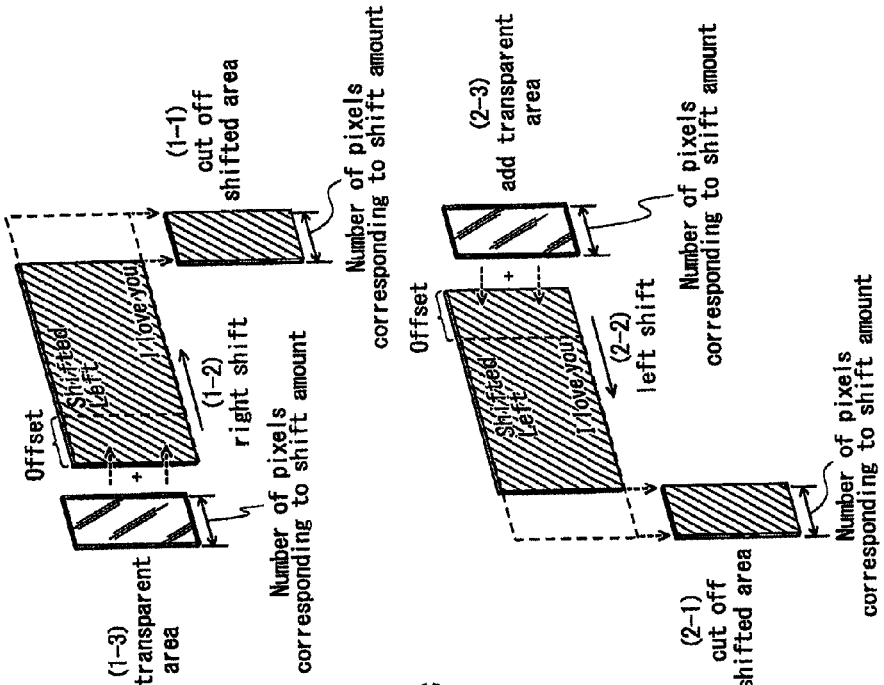
FIG. 40B
FIG. 40C
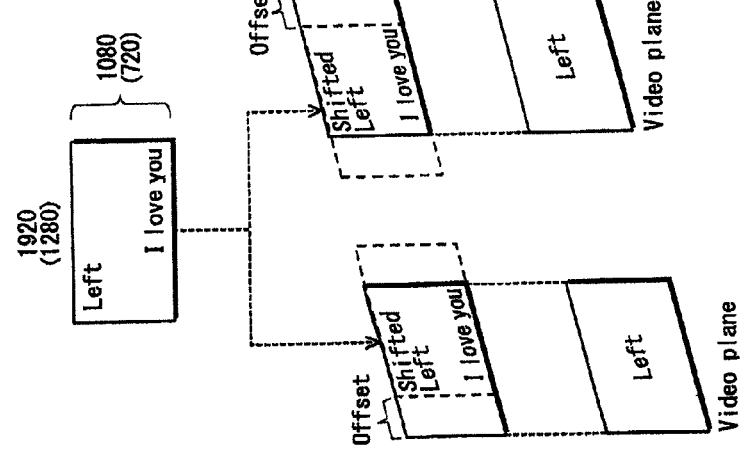
FIG. 40A

FIG. 41

| 0001 | 0002 | 0003 | 0004 | ... | 07A5 | 07A6 | 07A7 | 07A8 |
|---|---|---|---|---|---|---|---|---|
| (0,0) | (1,0) | (2,0) | (3,0) | ... | (1916,0) | (1917,0) | (1918,0) | (1919,0) |

| 07A9 | 07AA | 07AB | 07AC | ... | 0EE9 | 0EEA | 0EEB | 0EEC |
|---|---|---|---|---|---|---|---|---|
| (0,1) | (1,1) | (2,1) | (3,1) | ... | (1916,1) | (1917,1) | (1918,1) | (1919,1) |

| 0EED | 0EEE | 0EEF | 0EF0 | ... | 1677 | 1678 | 1679 | 1680 |
|---|---|---|---|---|---|---|---|---|
| (0,2) | (1,2) | (3,2) | (4,2) | ... | (1916,2) | (1917,2) | (1918,2) | (1919,2) |

| 1681 | 1682 | 1683 | 1684 | ... | 1DFD | 1DFE | 1DFF | 1E00 |
|---|---|---|---|---|---|---|---|---|
| (0,3) | (0,3) | (3,3) | (4,3) | ... | (1916,3) | (1917,3) | (1918,3) | (1919,3) |

Addresses of storage elements in plane memory
☐ : Storage element  (xx, yy) : Coordinates of pixel data stored in storage element

FIG. 42A

Shifted to the right by plane offset "3"

| 0001 | 0002 | 0003 | 0004 | 0005 | 0006 | 07A6 | 07A7 | 07A8 |
|---|---|---|---|---|---|---|---|---|
| Transparent color | Transparent color | Transparent color | (0, 0) | (1, 0) | (2, 0) | ... | (1914, 0) | (1915, 0) | (1916, 0) |
| 07A9 | 07AA | 07AB | 07AC | 07AD | 07AE | OEEA | OEEB | OEEC |
| Transparent color | Transparent color | Transparent color | (0, 1) | (1, 1) | (2, 1) | ... | (1914, 1) | (1915, 1) | (1916, 1) |
| OEED | OEEE | OEEF | OEF0 | OEF1 | OEF2 | 1678 | 1679 | 1680 |
| Transparent color | Transparent color | Transparent color | (0, 2) | (1, 2) | (3, 2) | ... | (1914, 2) | (1915, 2) | (1916, 2) |
| 1681 | 1682 | 1683 | 1684 | 1685 | 1686 | 1DFE | 1DFE | 1E00 |
| Transparent color | Transparent color | Transparent color | (0, 3) | (0, 3) | (3, 3) | ... | (1914, 3) | (1915, 3) | (1916, 3) |

FIG. 42B

Shifted to the left by plane offset "3"

| 0001 | 0002 | 0003 | 0004 | 07A5 | 07A6 | 07A7 | 07A8 |
|---|---|---|---|---|---|---|---|
| (3, 0) | (4, 0) | (5, 0) | (6, 0) | ... | (1919, 0) | Transparent color | Transparent color | Transparent color |
| 07A9 | 07AA | 07AB | 07AC | OEE9 | OEEA | OEEB | OEEC |
| (3, 1) | (4, 1) | (5, 1) | (6, 1) | ... | (1919, 1) | Transparent color | Transparent color | Transparent color |
| OEED | OEEE | OEEF | OEF0 | 1677 | 1678 | 1679 | 1680 |
| (3, 2) | (4, 2) | (5, 2) | (6, 2) | ... | (1919, 2) | Transparent color | Transparent color | Transparent color |
| 1681 | 1682 | 1683 | 1684 | 1DFD | 1DFE | 1DFE | 1E00 |
| (3, 3) | (4, 3) | (5, 3) | (6, 3) | ... | (1919, 3) | Transparent color | Transparent color | Transparent color | ured Markdown

PLAYBACK APPARATUS, INTEGRATED CIRCUIT, AND PLAYBACK METHOD CONSIDERING TRICKPLAY

This application claims the benefit of U.S. Provisional Patent Application No. 61/184,038, filed Jun. 4, 2009 and U.S. Provisional Patent Application No. 61/115,742, filed Nov. 18, 2008, each of which are incorporated herein by reference in their entirety.

BACKGROUND OF THE INVENTION (1) Field of the Invention

The present invention relates to the technical field of overlaying subtitles and graphics on stereoscopic video.

(2) Description of the Related Art

The above-mentioned overlaying technology (i) provides a playback apparatus with separate display planes for a video stream, subtitles, and graphics, (ii) overlays subtitles and graphics on each video frame in a high image quality video stream, and (iii) outputs the result to a device such as a connected display apparatus. This is a widespread form of technology for achieving highly realistic video.

It is predicted that, among display apparatuses connected to playback apparatuses, stereoscopic display apparatuses that allow viewers to enjoy not only flat video, but also video that seems to pop out of the screen, will grow in popularity in the near future. There are various methods used in stereoscopic display apparatuses, but a fundamental principle is a mechanism to show different pictures to the left eye and the right eye, using the parallax between eyes to create a pseudo-3D image.

For example, one often used method is to use shutter glasses. In this method, a viewer's right eye and left eye are alternately blocked at high speed by the glasses. By refreshing left-view images and right-view displayed by the display apparatus at high speed in sync with the operation of the glasses, it is possible for the glasses to make the left-view image shown by the display apparatus viewable only by the left eye, and conversely the right-view image viewable only by the right eye.

In order to show viewers a stereoscopic video at the same frame rate as an ordinary flat video, the display apparatus needs to have two times the ordinary response capability. For example, to show video with 60 frames per second, switching needs to be performed at 120 frames per second. Accordingly, the video stream to be shown needs to be encoded at 120 frames per second. One way of achieving a stereoscopic effect without increasing the frame rate is to encode a video stream with a side-by-side method as in Non-Patent Literature 1.

Another possibility is to use a checkered pattern as in Patent Literature 2.

Furthermore, technology for display of stereoscopic video during trickplay includes technology to allow continuous viewing of stereoscopic video even when a stereoscopic video is paused, as in Patent Literature 3.

Technology for overlaying and displaying multiple layers includes technology which, in rendering graphics when a multi-screen display has exceeded a predetermined number of screens, skips frames during the graphics rendering period for at least one or more input images determined to have low priority, as in Patent Literature 4.

PRIOR ART LITERATURE

[Patent Literature 1] WO 2005/119675 pamphlet
[Patent Literature 2] US Patent Application Publication No. 2008/0036854 Specification
[Patent Literature 3] Japanese Patent Application Publication No. 2002-95017
[Patent Literature 4] Japanese Patent Application Publication No. 2003-298938
[Non-Patent Literature 1] Foundations of the Stereoscopic Cinema: A Study in Depth (by Lenny Lipton)

SUMMARY OF THE INVENTION

Problems to be Solved by the Invention

At present, a method of allowing viewers to enjoy a digital stream stereoscopically is mainly used at theaters and the like. However, as recited in the above-mentioned patent literature, it is expected that it will be common for viewers to enjoy stereoscopic digital streams with use of household playback apparatuses in the future.

Of course, to generate a 3D video, the digital stream needs to support 3D video.

Even if a digital stream supports 3D video, however, if a playback apparatus does not support 3D digital streams, it cannot generate a 3D video. Also, even when a digital stream supports 3D video, the user may want to play back the digital stream in 2D.

In other words, it can be problematic if a playback apparatus determines whether to play back a digital stream in 3D or in 2D only by whether the digital stream supports 2D video or 3D video.

It is an object of the present invention to provide a playback apparatus that can appropriately play back a stream even when the digital stream and the playback apparatus differ with regards to whether they support 3D video.

Means for Solving the Problems

The problems above can be resolved by a playback apparatus, a playback mode of which can be switched between 3D mode to show a user video frames stereoscopically and 2D mode to show the user video frames monoscopically, the playback apparatus comprising: a read unit operable to read a digital stream that includes a left-view video stream and a right-view video stream from a recording medium; a mode storage unit storing a current playback mode; a dimension determining unit operable to determine whether the digital stream read from the recording medium supports 3D mode; a demultiplexer operable, when (i) the digital stream supports 3D mode and (ii) the current playback mode is 3D mode, to separate both the left-view video stream and the right-view video stream from the digital stream, and when condition (i) or (ii) is not met, to separate one of the left-view video stream and the right-view video stream from the digital stream; and a video decoder operable to obtain video frames to show stereoscopically or monoscopically by decoding the separated video stream Advantageous Effects of the Invention A playback apparatus with the above-described structure determines both whether the digital stream supports 2D or 3D playback, and whether the playback apparatus is set to 2D or 3D playback. By ultimately deciding whether to play back the digital stream in 2D or in 3D, the playback apparatus can appropriately produce stereoscopic video.

When a stereoscopic video stream is played back on a playback apparatus for home use, there is of course the possibility that trickplay such as fast forward or rewind will be performed. To create the illusion of stereoscopic video, however, it is necessary to decode both a left-view and a right-view video stream and to alternately switch output between the two streams. As compared to monoscopic processing, the processing load increases. Accordingly, when trickplay is performed by a playback apparatus for playing back a stereoscopic video stream, it is possible that 3D processing will not be able to keep up with the trickplay playback speed.

To solve such a problem, it is preferable that the playback apparatus be constructed as follows.

In other words, it is preferable that the playback apparatus further comprise a playback control unit operable to cause the video decoder to perform processing to repeatedly output a same video frame two times or more while maintaining the playback mode in 3D mode when trickplay is requested while the current playback mode is 3D mode, wherein a video frame for repeated output is a video frame obtained by decoding one of the left-view video stream and the right-view video stream separated from the digital stream, and the repeatedly output video frame is written in a left-view video plane and a right-view video plane. This configuration can prevent the 3D processing from not being able to keep up with the trickplay playback speed when a playback apparatus that plays back a stereoscopic video stream performs trickplay.

When a video stream is shown in 3D, images are displayed in one of two ways: closer or further back. When a video stream is displayed closer in 3D, combination with the 2D graphics stream can cause the problem of the 2D graphics stream being blocked from view.

Accordingly, this problem can be resolved by making the graphics stream displayable as well in 3D.

Making the graphics stream also displayable in 3D has the additional effect of allowing users to enjoy a variety of stereoscopic videos.

When the display mode changes from 3D to 2D or from 2D to 3D, the playback apparatus notifies the display apparatus that the display mode has been switched. After receiving this notification, the display apparatus notifies the playback apparatus that preparations for display in the mode after switching are complete once such preparations to display in the mode after switching are in fact complete. During the interval between when the display apparatus is notified that the display mode has been switched and when the display apparatus notifies the playback apparatus that preparations for display in the mode after switching are complete, it is possible to write in the plane, but the display device enters a state in which it cannot display (blackout). Accordingly, during this interval, the display apparatus does not display what is written in the plane.

An application is a program for a user's enjoyment that provides, for example, a game or the like that uses video from the main feature. Furthermore, the game or the like may play back, for example, animation in accordance with the video and audio of the main feature. Thus, an application that renders graphics images constituting animation needs to render graphics images on an interactive graphics plane in sync with the video stream that is the video for the main feature.

It follows from the above that an application may end up proceeding with processing to render graphics images by writing graphics images on the interactive graphics plane during the interval between when the display apparatus is notified that the display mode has been switched and when the display apparatus notifies the playback apparatus that preparations for display in the mode after switching are complete.

In this case, the application can no longer synchronize the graphics stream and the video stream.

To resolve such a problem, it is preferable that the playback apparatus be constructed as follows. The above-described playback apparatus should further comprise: a platform unit operable to execute a bytecode application; and a transmission unit operable to transmit video frames to a display apparatus connected to the playback apparatus, thereby causing the display apparatus to output video frames, wherein when the playback mode stored in the mode storage unit is switched from 2D mode to 3D mode or vice-versa, the transmission unit performs reauthentication of the display apparatus, and after the reauthentication, if the platform unit receives notification of a capability to output in accordance with a mode after switching, the platform unit notifies a bytecode application executed by the platform unit of the capability to output in accordance with the mode after switching.

A mechanism can be provided to notify an application that the display apparatus has completed preparations for display in the mode after switching, so that the application will not proceed with processing by writing graphics images on the interactive graphics plane during the interval between when the display apparatus is notified that the display mode has been switched and when the display apparatus notifies the playback apparatus that preparations for display in the mode after switching are complete. In this way, it is possible to have the application render graphics images on the interactive graphics plane in sync with the video stream.

BRIEF DESCRIPTION OF THE DRAWINGS

These and the other objects, advantages and features of the invention will become apparent from the following description thereof taken in conjunction with the accompanying drawings which illustrate specific embodiments of the invention.

In the drawings:

FIG. 3 shows a usable configuration, in the form of a concrete electrical appliance, of a playback apparatus provided with the means to solve the technical problem in the present application.

FIG. 6 shows concrete entries in a PlayList file that specifies a 2D PlayList.

FIG. 7 is an example of a PlayList file that specifies a 3D PlayList.

FIG. 9 shows a schematic view of sample contents of a register set 12.

FIG. 27 shows how the decoding contents in the playback apparatus and the display contents in the display apparatus 400 change when switching from regular playback to fast forward and vice-versa.

FIGS. 28A, 28B, 28C, and 28D show an example of variable speed playback that adjusts speed depending on (i) which pictures in a GOP, i.e. an I picture, B picture, and P picture, are selected for playback and (ii) which of a plurality of closed-GOPs and open-GOPs constituting a video stream are selected for playback.

FIGS. 40A, 40B, and 40C show plane shift procedures for the image plane 8.

FIG. 41 shows pixel data stored in a graphics plane.

FIGS. 42A and 42B show the contents stored in the graphics plane after being shifted.

DESCRIPTION OF THE PREFERRED EMBODIMENT

Embodiments of a playback apparatus provided with the above-described means to solve the technical problem are described below with reference to the drawings.

(Embodiment 1)

Figure 1:
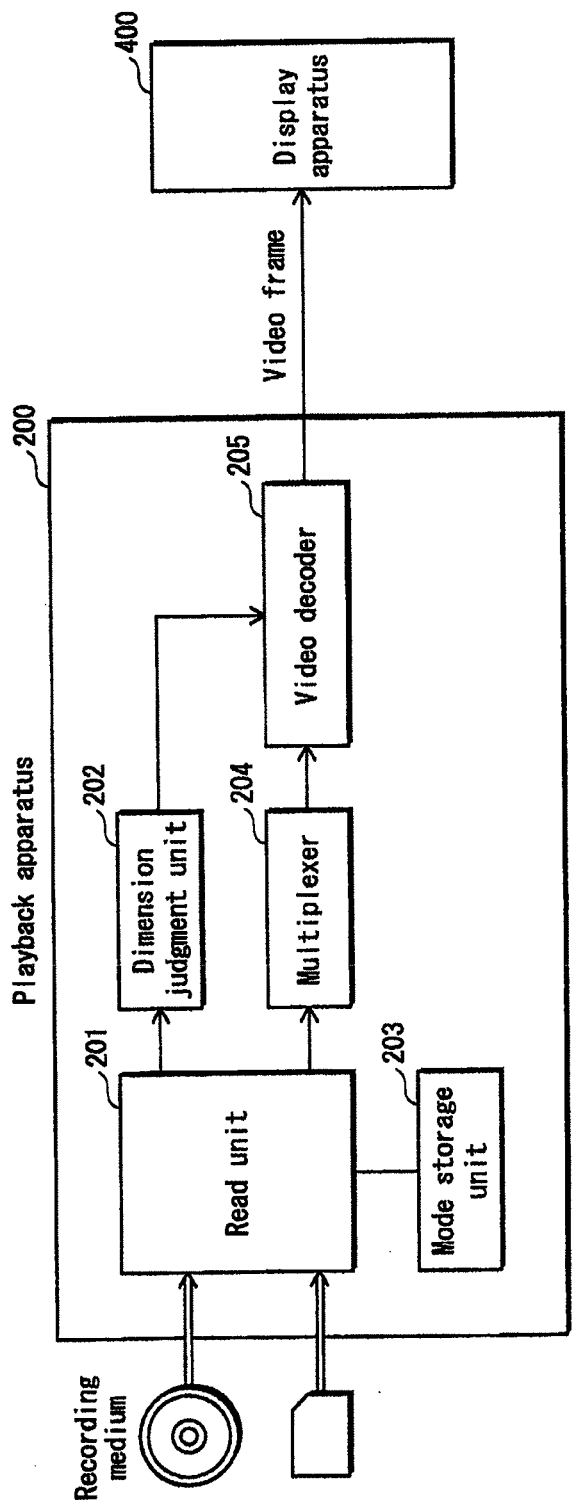
FIG. 1 shows the inner structure of the most basic playback apparatus provided with the means to solve the technical problem in the present application.

FIG. 1 shows the inner structure of the most basic playback apparatus provided with the above-mentioned means to solve the technical problem in the present application. Except for the above-mentioned means to solve the technical problem, the playback apparatus shown in FIG. 1 has been stripped of all unnecessary elements, and thus it is composed of: a read unit 201, a dimension judgment unit 202, a mode storage unit 203, a multiplexer 204, and a video decoder 205.

Figure 2:
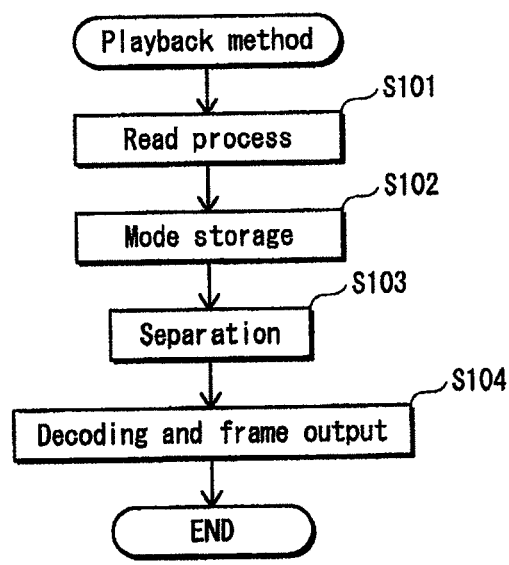
FIG. 2 is a flowchart showing the most basic playback method provided with the means to solve the technical problem in the present application.

FIG. 2 is a flowchart showing the most basic playback method provided with the above-mentioned means to solve the technical problem in the present application. The playback method shown in FIG. 2 is composed of: a read step S101, which is a time-oriented element corresponding to the above-mentioned means to solve the technical problem; a mode storage step S102; a separation step S103; and a decoding and frame output step S104.

FIG. 3 shows a usable configuration of a playback apparatus provided with the above-mentioned means to solve the technical problem in the form of a concrete electrical appliance. As shown in FIG. 3, a BD-ROM 100, an example of a recording medium, and a playback apparatus 200 constitute a useable home theater system together with a remote control 300, a display apparatus 400, and liquid crystal glasses 500.

The BD-ROM 100 supplies the home theater system with, for example, a movie.

The playback apparatus 200 is connected to the display apparatus 400 and plays back the BD-ROM 100. Both 2D videos and 3D videos can thus be played back. In a 2D video, the display screen of the display apparatus is taken as an X-Y plane on which an image, also referred to as a monoscopic image, is represented through pixels.

This contrasts with 3D video, in which depth is added in the Z axis direction to the pixels in an image on the X-Y plane on the screen of the display apparatus. In 3D video, left-video images seen by the left eye and right-video images seen by the right eye are played back together to produce a stereoscopic effect for users to view. Pixels in a 3D image that have a positive Z axis coordinate value are perceived by users to appear closer than the screen of the display apparatus, whereas pixels with a negative Z axis coordinate value are perceived as being further back than the screen.

The remote control 300 is a device both to accept from users a variety of operations related to playback control and to accept from users operations for a hierarchical GUI. To accept these kinds of operations, the remote control 300 is provided with a menu key to call a pop-up menu, an arrow key to move the focus for GUI components constituting the pop-up menu, an enter key to perform determined operations on the GUI components constituting the pop-up menu, a return key to return to a position above the hierarchical pop-up menu, and numeric keys.

The display apparatus 400 displays the playback video for the movie and provides users with an interactive operation environment by displaying menus and the like.

The liquid crystal glasses 500 are composed of liquid crystal shutters and a control unit and represent a stereoscopic view using the parallax between a user's eyes. The liquid crystal shutters in the liquid crystal glasses 500 use liquid crystal lenses that have a property whereby the amount of light transmitted changes as applied voltage changes. The control unit in the liquid crystal glasses 500 receives a synchronized signal from the playback apparatus indicating switching of output between a left-eye image and a right-eye image and switches between condition 1 and condition 2 in accordance with the synchronized signal.

In condition 1, applied voltage is adjusted so that the liquid crystal lens corresponding to the right eye does not allow light to pass through, whereas applied voltage is adjusted so that the liquid crystal lens corresponding to the left eye allows light to pass through. A left-eye image is provided for viewing in this condition.

In condition 2, applied voltage is adjusted so that the liquid crystal lens corresponding to the right eye allows light to pass through, whereas applied voltage is adjusted so that the liquid crystal lens corresponding to the left eye does not allow light to pass through. A right-eye image is provided for viewing in this case.

In general, there is a slight difference between the images seen by the left eye and by the right eye, due to the difference in position of the right eye and left eye. The mind uses this difference to recognize visual images as three-dimensional. Therefore, the liquid crystal glasses 500 can cause a user to perceive a two-dimensional image as three-dimensional by synchronizing the switching of condition 1 and condition 2 with the timing of the switching of output of a right-view image and a left-view image. Next, an explanation is provided for the time interval when displaying left-eye video and right-eye video.

Specifically, the two-dimensional right-eye images and left-eye images differ by an amount corresponding to the difference in how people perceive images. Displaying these images while switching between them after a short time interval makes it seem as though a three-dimensional image were being displayed.

This short time interval needs to be short enough for the above-described switching of the display to produce the illusion of a three-dimensional image.

This concludes the description of the home theater center.

Figure 4:
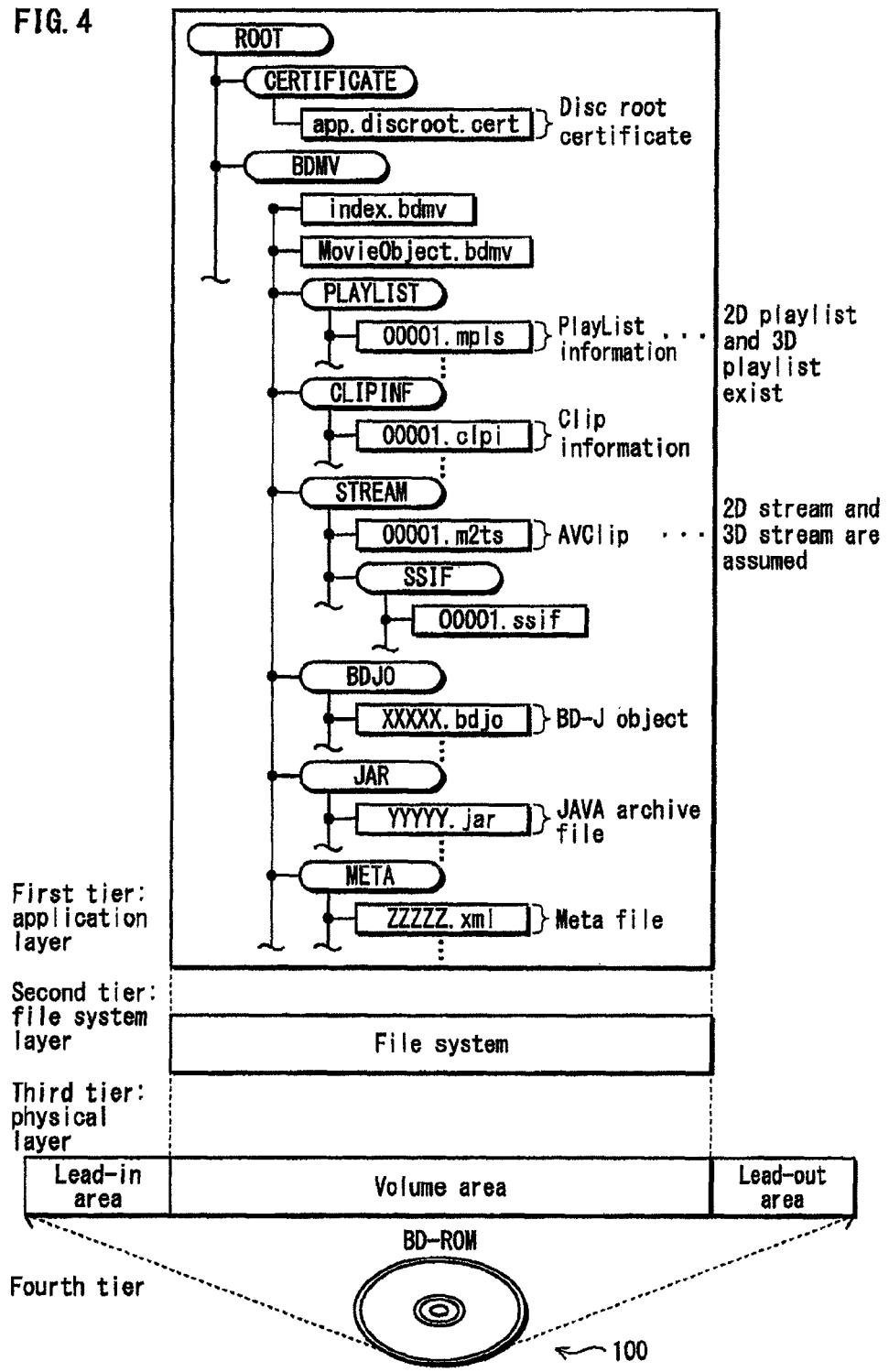
FIG. 4 shows the inner structure of a BD-ROM 100.

Next, the recording medium for the playback apparatus 200 is described. A BD-ROM 100 is played back by the playback apparatus 200. FIG. 4 shows the inner structure of the BD-ROM 100.

Tier 4 of FIG. 4 shows a BD-ROM, and tier 3 shows a track on the BD-ROM. Although the track spirals outwards from the inner circumference of the BD-ROM, it is extended horizontally in the depiction in FIG. 2. This track consists of a lead-in area, a volume area, and a lead-out area. Also, in the lead-in area a special area called a BCA (Burst Cutting Area) that can be read only by a drive exists. Since this area cannot be read by an application, this area is often used in copyright protection technology or the like.

The volume area in the present figure has a layer model having a file system layer and an application layer. Application data such as image data starting with file system information is stored in the file system layer. The file system is UDF, ISO9660, or the like. In the file system, it is possible to read logic data recorded in the same manner as a normal PC, with use of a directory or a file structure. Also, a file name or a directory name consisting of 255 characters can be read. The first tier of FIG. 4 shows an application layer format (application format) of the BD-ROM expressed using a directory structure. As shown in the first tier, in the BD-ROM, a CERTIFICATE directory and a BDMV directory exist below a Root directory.

Below the CERTIFICATE directory, a file of a root certificate (app.discroot.cert) of a disc exists. This app.discroot.cert is a digital certificate used in a process that checks whether an application has been tampered with, or identifies the application (this process hereinafter referred to as signature verification) when executing a program of a Java™ application that performs dynamic scenario control using a Java™ virtual machine.

The BDMV directory is a directory in which data such as AV content and management information used in the BD-ROM are recorded. Six directories called "PLAYLIST directory," "CLIPINF directory," "STREAM directory," "BDJO directory," "JAR directory," and "META directory" exist below the BDMV directory. Also, two types of files, i.e. INDEX.BDMV and MovieObject.bdmv, are arrayed.

The STREAM directory is a directory storing a file that is a so-called transport stream body. A file (00001.m2ts) to which an extension "m2ts" is given exists in the STREAM directory.

A file (00001.mpls) to which an extension "mpls" is given exists in the PLAYLIST directory.

A file (00001.clpi) to which an extension "clpi" is given exists in the CLIPINF directory.

A file (XXXXX.bdjo) to which an extension "bdjo" is given exists in the BDJO directory.

A file (YYYYY.jar) to which an extension "jar" is given exists in the JAR directory.

An XML file (ZZZZZ.xml) exists in the META directory.

These files are described below.

<Index.bdmv>

The file index.bdmv (index table) contains management information of the entire BD-ROM. After a disc is inserted into the playback apparatus, the index.bdmv file is first read, and the disc is thus uniquely recognized by the playback apparatus. The index.bdmv file defines the association of individual titles that constitute the title structure of the optical disc with operation mode objects that define the operation mode. The title structure refers to the following: first, a title that includes a warning for viewers, the content provider's logo, etc., i.e. the first play title, is played back when an optical disc is loaded. After playback of the first play title, general titles that constitute the main title of a movie (general titles that are identified by serial numbers, e.g. "1," "2," "3") are played back. Once playback of the main title is finished, a title that accepts title selection (menu title) is played back and the playback apparatus awaits user selection of a general title.

Allocating operation mode objects that define an operation mode to the first play title, general title, and menu title for each title on the optical disc defines in detail the operation mode in which each title is operated.

<MovieObject.bdmv>

The MovieObject.bdmv file stores a movie object. A movie object is a type of operation mode object, specifically a batch job program that, during command base operation mode (referred to as HDMV mode), provides the playback apparatus with a plurality of navigation commands as a batch job and causes the playback apparatus to function based on these navigation commands. Concretely, a movie object includes a mask flag that defines whether to mask one or more commands and menu calls or title calls to the GUI when a user performs these calls. A navigation command is a control command written in a so-called interpreted language. A plurality of navigation commands are deciphered as a batch job by an interpreter (job control program) and the CPU is made to execute the desired jobs. A navigation command consists of an opcode and an operand. With an opcode, the playback apparatus can be commanded to separate, play back, or calculate a title, or perform a similar such operation. An operand is a number of a PlayList or a title and can indicate a target of operation.

<m2ts File>

The file to which the extension "m2ts" is given is a digital AV stream in the MPEG-TS (Transport Stream) method and is acquired by multiplexing a video stream, one or more audio streams, and subtitle data. The video stream represents the moving part of the movie, and the audio stream represents the audio part of the movie. A transport stream that only includes a stream for 2D video is referred to as a "2D stream," and a transport stream that includes a stream for 3D video is referred to as a "3D stream."

In a 3D stream, data for both the left-view and the right-view can be can be included in one m2ts file, or separate m2ts files can be prepared for the left-view and the right-view. To reduce the volume used in the stream, it is preferable to use a codec (e.g. MPEG4-AVC MVC) that cross-references the left-view video stream and the right-view video stream. A video stream that is compression encoded with this sort of codec is called an MVC video stream.

<PlayList Information>

The file to which the extension "mpls" is given is a file storing PlayList (PL) information. The PlayList information defines a PlayList referring to an AV clip.

The BD-ROM has a dimension identifying flag that identifies whether a stream to be played back is for 2D playback or 3D playback. In the present embodiment, the dimension identifying flag is embedded in the PlayList (PL) information. In the present embodiment, the existence of a stream for 3D playback in the stream to be played back can be determined from the structural format of the PlayList (PL) on the BD-ROM. It is possible to start AV playback by having a Java™ application for playback control instruct a Java™ virtual machine to generate a JMF (Java Media Framework) player instance that plays back the PlayList information. A JMF player instance refers to actual data generated on a heap memory of the virtual machine based on the JMF player class.

Furthermore, the term 2D PlayList is defined to as only including a stream for 2D playback, whereas a 3D PlayList is defined to include a stream for 3D viewing in addition to the 2D stream.

The file to which the extension "clip" is given is Clip information that is in one to one correspondence with the AVclips. Since the Clip information is management information, the Clip information has information on the encoding format of the stream in the AVClip, frame rate, bit rate, resolution, etc., as well as an EP_map showing the starting point of GOPs. The Clip information and PlayList information are classified as "static scenario."

<BD-J Object>

A BD-J object is an operation mode object that causes the playback apparatus to operate in the operation mode (referred to as BD-J mode) of the bytecode application base. A bytecode application refers to an application generated by an object-oriented compiling language, e.g. Java™. BD-J objects, which regulate the operations of a playback apparatus using a "compiler language" such as Java™ or the like, are in sharp contrast with movie objects, which are described by commands in an interpreted language. A BD-J object includes the following "application management table."

(Application Management Table)

An application management table includes a plurality of entries. These entries include a "control code," an "application ID," and "detailed application information." The "control code" indicates the startup method for an application in a title, i.e. whether the application is to be started automatically (AutoStart) or whether it should wait to start until it is called by another application (Present). The "application ID" indicates the targeted application using five digits that become the file name for the JAR file.

For each application, the "detailed application information" stores a "priority level" for when the application is loaded, "binding information" indicating whether the application is title unbound or not and whether it is disc unbound or not, a "language code" indicating to which language the application belongs, and an "icon locator" indicating the location of an icon associated with the application. By managing titles in existence intervals, the application management table can manage the consumption of memory resources and the like by each application in partitions of a title, which is a playback unit. In this way, even if a plurality of applications compete for use of resources during playback of a title causing deadlock, if the user selects a different title, the applications are all terminated, and thus the deadlock is forcibly resolved. Also, even if a runaway application hoards memory during playback of a title, if a user selects a different title, the pressure on the memory capacity is forcibly resolved. In this way, memory resources are not consumed unnecessarily, permitting stable management of memory resources. Since stable management of memory resources is possible, such management is even more valuable when implemented in an electric appliance with limited memory resource capacity. A bytecode application whose operations are defined by the application management table in the BD-J object is referred to as a "BD-J application."

The Java™ archive file (YYYYY.jar) stored in the JAR directory under the BDMV directory in FIG. 2 is what actually corresponds to this Java™ application.

The application is, for example, a Java™ application, and is composed of one or more xlet programs loaded in the heap area (also called "work memory") of the virtual machine.

In the meta file (ZZZZZ.xml) included in the META directory, various pieces of information relating to the movie in the disc are stored. Examples of pieces of information stored in the meta file include a name of the disc and an image of the disc, information on who created the disc, a title name for each title, etc. This concludes the description of the BD-ROM 100. The meta file is not a prerequisite, and some BD-ROMs do not include this meta file.

This concludes the description of the BD-ROM, the target of playback by the playback apparatus. Next, the PlayList information is described in detail.

PlayList information, which implements a 3D view and a 2D view, is structured as follows. A "PlayList" typically refers to a playback path that is defined by defining playback sections along the AV stream time axis and logically designating the playback order of these playback sections. A PlayList has the function of regulating which playback section plays back which part of the AV stream, and regulating in what order scenes unfold. The PlayList information stored in the MPLS file defines the "format" for such a PlayList. A PlayList path defined by PlayList information is a so-called "multi-path." A multi-path bundles together a playback path (main-path) defined for the main AV stream and a playback path (sub-path) defined for the sub stream. Chapter positions are defined in the playback time axis of such a multi-path. By making the playback apparatus refer to these chapter positions, the playback apparatus can be made to randomly access an arbitrary point in time in the time axis of the multi-path. To define such a multi-path, the PlayList information includes playback attribute information, main-path information, sub-path information, and PlayListMark information.

1) By defining one or more pairs of a point in time that is an In_Time and a point in time that is an Out_Time along the playback time axis of the base-view video stream, the main-path information defines a logical playback section and includes an STN_table (stream number table). This main-path information corresponds to playback data information.

2) PlayListMark information includes a designation of a point in time that is a chapter in a portion of the video stream designated by a combination of In_Time information and Out_Time information.

3) Sub-path information is composed of one or more pieces of SubPlayItem information. A piece of SubPlayItem information includes an indication of a dependent view stream that should be played back in sync with the base-view video stream, as well as a combination of In_Time information and Out_Time information along the playback time axis of the dependent view stream.

With the above-described data structure, it is possible to define a multi-path that bundles together a playback section on a left-view video stream and a playback section on a right-view video stream. This sort of multi-path definition makes it possible to define a playback section in which 3D playback is possible without losing compatibility with the existing data structure on the BD-ROM.

Figure 5:
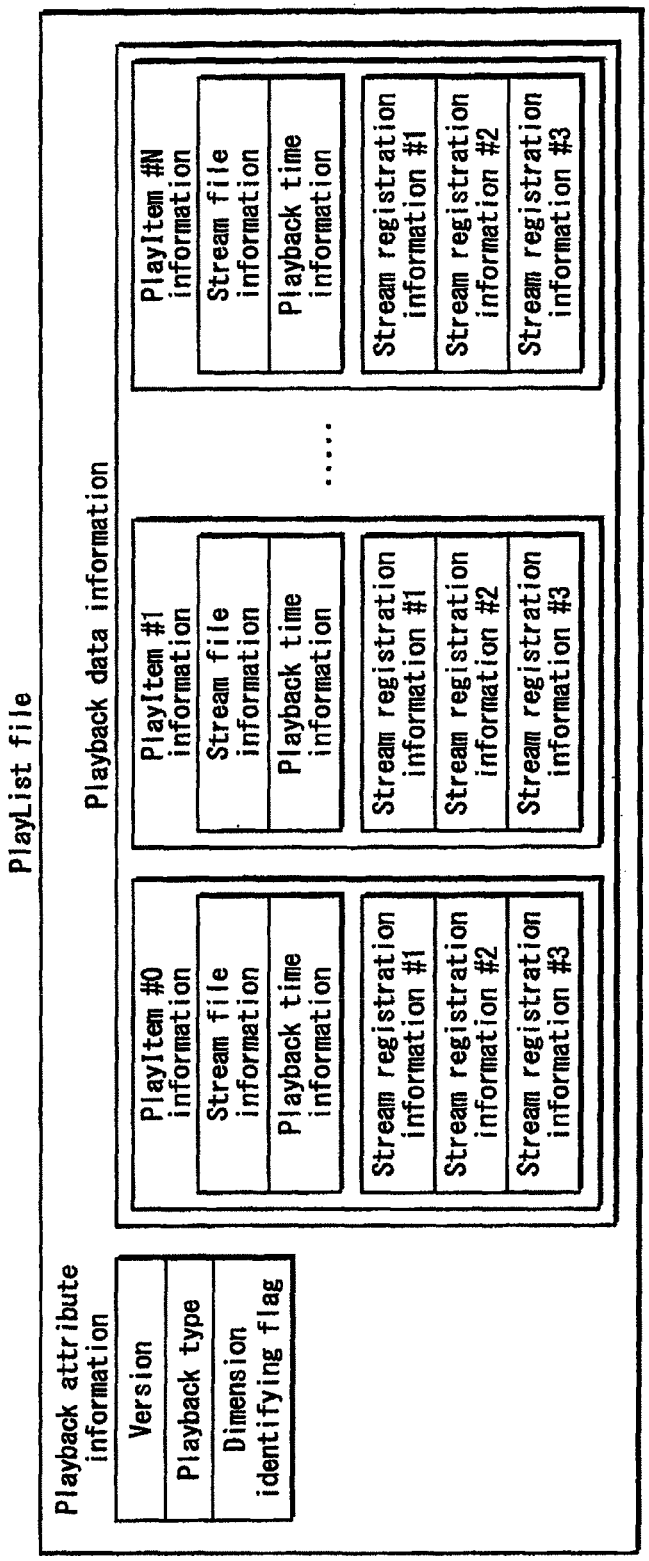
FIG. 5 shows, among the inner structure of a PlayList file, the detailed inner structure of "playback attribute information" and "playback data information."

FIG. 5 shows, among the inner structure of a PlayList file, the detailed inner structure of "playback attribute information" and "playback data information."

"Playback attribute information" includes the following: the "version" of the standard on which the PlayList file is based; a "playback type" indicating whether the PlayList file is a movie or a slideshow, and whether the individual PlayItems constituting the PlayList file are played back sequentially or randomly; and a "dimension identifying flag" that indicates whether the PlayList is a 2D PlayList or a 3D PlayList.

"Playback data information" is composed of N+1 pieces of PlayItem information (PlayItem information #0 through PlayItem information #N in FIG. 5). Each piece of PlayItem information includes the following: "stream file information" indicating the transport stream to which the PlayItem corresponds; "playback time information" indicating the playback length of the stream file; and "stream registration information" indicating, for each packetized elementary stream, what kind of packetized elementary streams are permitted to be played back in this PlayItem information.

The "dimension identifying flag" indicates that the PlayList is a 3D PlayList when the digital stream in the transport stream referred to by the PlayList file is a digital stream that supports 3D video, whereas the "dimension identifying flag" indicates that the PlayList is a 2D PlayList when the digital stream in the transport stream referred to by the PlayList file is a digital stream that only supports 2D video.

The following is an illustration of a concrete example of a PlayList file. FIG. 6 shows concrete entries in a PlayList file that specifies a 2D PlayList.

In the example in FIG. 6, the "version information" is 2.00. As for the playback type for the PlayList file, the PlayItem information in the Playback data information is a "movie" that is set to "sequential," meaning that the stream file designated by the PlayItem information is played back in order from the top.

The dimension identifying flag indicates that the example is a stream configuration capable of 2D display.

Information regarding video, audio, and subtitle data is recorded in the playback data information.

In the example in FIG. 6, the stream file that the PlayItem #0 uses is 00001.m2ts in the STREAM directory, and the playback time for PlayItem #0 is indicated as 0x002932E0. The three pieces of stream registration information in PlayItem #0 indicate details regarding three packetized elementary streams that are identified by three logical stream numbers, i.e. video #1, audio #1, and subtitle #1.

Specifically, the logical stream number video #1 indicates that the corresponding packetized elementary stream is a video stream composed of a TS packet having the packet identifier 0x02.

The logical stream number audio #1 indicates that the corresponding packetized elementary stream is a video stream composed of a TS packet having the packet identifier 0x80 and that the language is Japanese.

The logical stream number subtitle #1 indicates that the corresponding packetized elementary stream is subtitle data composed of a TS packet having the packet identifier 0x92, that the language is Japanese, and that the size is regular.

FIG. 7 is an example of a PlayList file that specifies a 3D PlayList.

In the example in FIG. 7, the "version information" is 2.00. As for the playback type for the PlayList file, the PlayItem information in the playback data information is a "movie" that is set to "sequential," meaning that the stream file designated by the PlayItem information is played back in order from the top.

One PlayItem exists in the playback data information, i.e. the PlayItem #0, which indicates that the stream file it uses is the file 00001.m2ts in the STREAM directory. The playback time for PlayItem#0 is 0x002932E0, and four pieces of stream registration information exist in PlayItem #0 indicating details regarding four packetized elementary streams.

The following is clear from the pieces of stream registration information.

The packetized elementary stream to which the logical stream number video #1 is assigned is composed of a TS packet having the packet identifier 0x02, and its visual attribute is a left-view.

The packetized elementary stream to which the logical stream number video #2 is assigned is composed of a TS packet having the packet identifier 0x02, and its visual attribute is a right-view.

The packetized elementary stream to which the logical stream number audio #1 is assigned is an audio stream composed of a TS packet having the packet identifier 0x80, and its language attribute is Japanese.

The packetized elementary stream to which the logical stream number subtitle #1 is assigned is subtitle data composed of a TS packet having the packet identifier 0x92. The language attribute of the subtitle data is Japanese, and the size is regular.

This concludes the explanation of the PlayList information. Next follows a detailed explanation of the playback apparatus.

Figure 8:
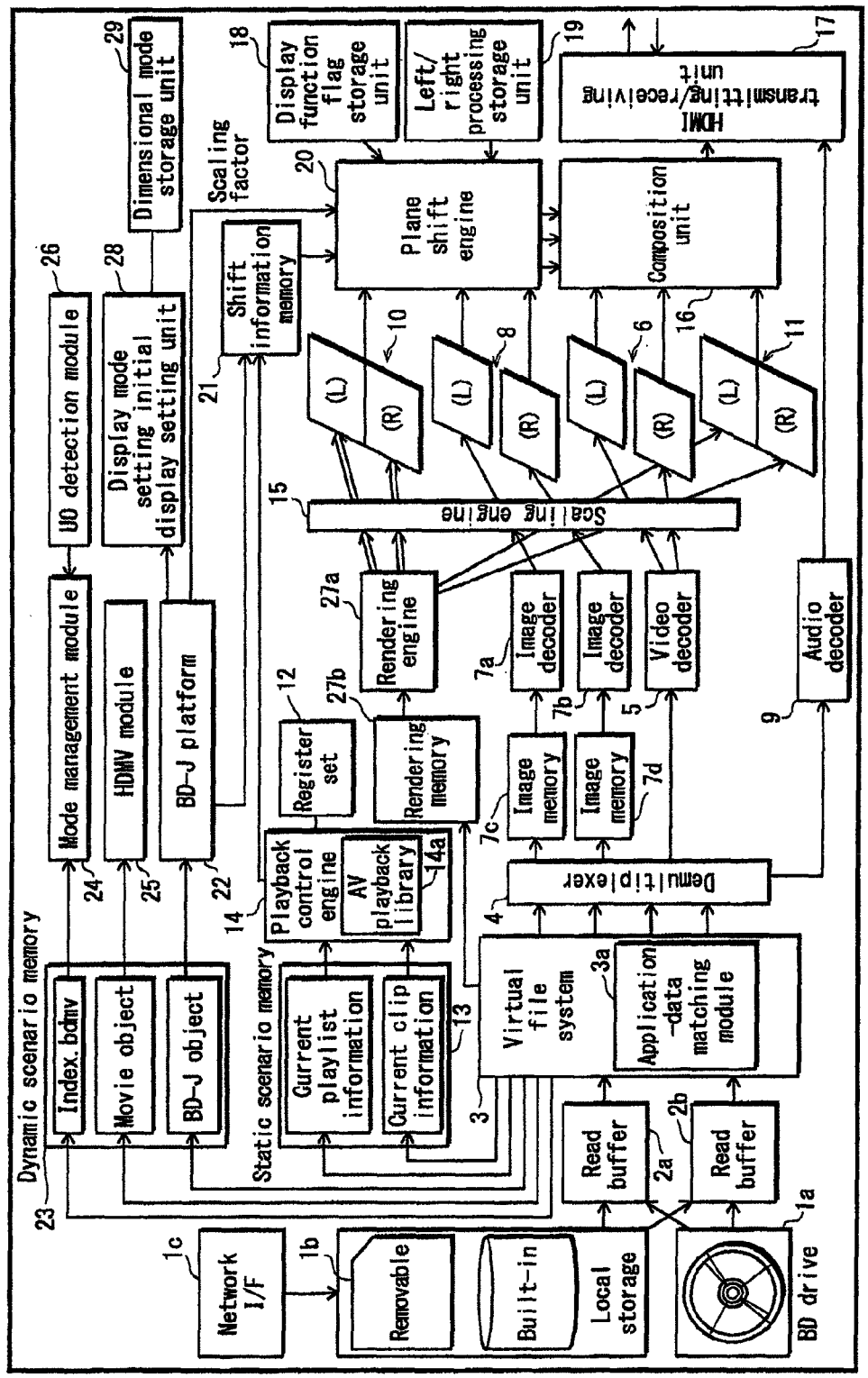
FIG. 8 shows the inner structure of a playback apparatus provided with the means to solve the technical problem in the present application.

The following is a detailed explanation of the structural elements of a playback apparatus. FIG. 8 shows the inner structure of a playback apparatus. As shown in this figure, the playback apparatus is composed of the following: BD drive 1*a*, network device 1*b*, local storage 1*c*, read buffers 2*a* and 2*b*, virtual file system 3, demultiplexer 4, video decoders 5*a* and 5*b*, video plane 6, image decoders 7*a* and 7*b*, image memories 7*c* and 7*d*, image plane 8, audio decoder 9, interactive graphics plane 10, background plane 11, register set 12, static scenario memory 13, playback control engine 14, scalar engine 15, composition unit 16, HDMI transmitting/receiving unit 17, display function flag storage unit 18, left/right processing storage unit 19, plane shift engine 20, shift information memory 21, BD-J platform 22, dynamic scenario memory 23, mode management module 24, HDMV module 25, UO detection module 26, rendering engine 27*a*, rendering memory 27*b*, display mode setting initial display setting unit 28, and dimensional mode storage unit 29.

In the video stream input into a playback apparatus 200 according to Embodiment 1, a left-view and a right-view exist separately, whereas in the subtitle/GUI stream, the input data is shared by the left-view and the right-view. In the description of Embodiment 1, it is assumed that a left-view stream and a right-view stream have been pre-embedded in a single stream file. This is to suppress, insofar as possible, the amount of calculation that has to be performed by a device with limited memory and graphics resources (such as a CE device).

(BD Drive 1*a*)

The BD drive 1a comprises a semiconductor laser, collimate lens, beam splitter, object lens, condenser lens, and optical head that has an optical detector. The optical beam that is discharged by the semiconductor laser traverses the collimate lens, beam splitter, and object lens and is condensed on the information surface of the optical disc. The condensed optical beam is reflected/diffracted on the optical disc, traverses the object lens, beam splitter, and collimate lens, and is condensed in the optical detector. According to the amount of light condensed in the optical detector, a playback signal is generated. By demodulating this playback signal, the various types of data recorded on the BD can be decoded.

(Network Interface 1*b*)

The network interface 1*b* is for communication with entities external to the playback apparatus, and it can access servers accessible via the Internet, as well as access servers connected through a local network. For example, the network interface 1*b* is used when downloading supplemental BD-ROM contents released on the Internet, or used to permit playback of contents that utilize a network function by performing data communication with a server on the Internet as designated by the contents. Supplemental BD-ROM contents are contents not on the original BD-ROM, such as supplemental sub-audio, subtitles, extra video, applications, etc. The network interface 1*b* can be controlled from the BD-J platform, and the supplemental contents released on the Internet can be downloaded into the local storage 1*c*.

(Local Storage 1*c*)

The local storage 1*c* is constituted by built-in media and removable media and is used for storing data and the like used by downloaded supplemental contents and applications. The storage area for the supplemental contents is separate for each BD-ROM, as is the area useable by an application for data storage. Merge management information, in which merge rules are recorded, is also stored in this built-in media and removable media. Merge rules indicate how the downloaded supplemental contents are merged with the data on the BD-ROM.

Built-in media is, for example, a writable recording medium such as a hard disc drive, memory, etc. internal to the playback apparatus.

Removable media is, for example, a portable recording device, preferably a portable semiconductor memory card such as an SD card or the like.

To illustrate with an example in which the removable media is a semiconductor memory card, the playback apparatus is provided with a slot (not shown in the figures) to mount the removable media, as well as an interface (e.g. a memory card I/F) for reading the removable media mounted in the slot. Inserting a semiconductor memory into the slot electronically connects the removable media and the playback apparatus, and by using the interface (e.g. a memory card I/F), it is possible to convert the data recorded on the semiconductor memory into an electronic signal and thus read the data.

(Read Buffer 2*a*)

The read buffer 2*a* temporarily stores the source packets constituting the extents that compose the left-view stream read by the BD drive 1*a*. After adjusting the transmission rate, the read buffer 2*a* transmits these source packets to the demultiplexer 4.

(Read Buffer 2*b*)

The read buffer 2*b* temporarily stores the source packets constituting the extents that compose the right-view stream read by the BD drive 1*a*. After adjusting the transmission rate, the read buffer 2*b* transmits these source packets to the demultiplexer 4.

(Virtual File System 3)

Based on the merge management information downloaded on the local storage 1*c* along with the supplemental content, the virtual file system 3 merges the supplemental contents stored in the local storage with the contents on the BD-ROM and constructs a virtual BD-ROM (virtual package). In order to construct the virtual package, the virtual file system 3 has an "application-data matching module 3*a*" to generate and update application matching information. Application-data matching information is information to match an application with information in the local storage, based on the file system information on the BD-ROM disc and on aliased access information set by the application.

The HDMV module, the main actor in HDMV mode, and the BD-J platform, the main actor in BD-J mode, can refer to the virtual package and the original BD-ROM without distinction. During playback of the virtual package, the playback apparatus performs playback control using both the data on the BD-ROM and the data in the local storage.

(Demultiplexer 4)

The demultiplexer 4 is composed of a source depacketizer and a PID filter, and receives an indication of a packet identifier corresponding to a stream to be played back, the stream being included on the mounted BD-ROM and the local storage corresponding to the mounted BD-ROM. The demultiplexer 4 performs packet filtering based on the packet identifier and outputs the TS packets obtained as a result to the decoder. During packet filtering, the demultiplexer 4 can sort video frames in the left-view video stream and video frames in the right-view video stream using the stream's header information. When outputting data to the display apparatus, the present playback apparatus alternately outputs left-view video images and right-view video images.

In accordance with the output format, when output of both video images is necessary at the same time, the demultiplexer alternately processes video frames in the left-view video stream and video frames in the right-view video stream and outputs both the left-view video frames and the right-view video frames when decoding of these video frames is complete. Furthermore, the hardware is configured to output a left-view video frame and a right-view video frame separately when there is double output.

(Video Decoder 5)

The video decoder 5 decodes the TS packets constituting the left-view video stream output from the demultiplexer 4 and writes video frames in uncompressed format on the left-view video plane 6 (indicated by an (L) in the video plane 6 in FIG. 8). Conversely, the video decoder 5 decodes the TS packets constituting the right-view video stream output from the demultiplexer 4 and writes video frames in uncompressed format on the right-view video plane 6 (indicated by an (R) in the video plane 6 in FIG. 8).

(Video Plane 6)

The video plane 6 is a plane memory that can store, at for example a resolution of 1920×2160 (1280×1440), picture data constituting a video frame. The video plane 6 has a left-view plane (indicated by an (L) in the video plane 6 in FIG. 8) with a resolution of 1920×1080 (1280×720) and a right-view plane (indicated by an (R) in the video plane 6 in FIG. 8) with a resolution of 1920×1080 (1280×720).

(Image Decoders 7a, 7b)

The image decoders 7a and 7b decode the TS packets that are output by the demultiplexer 4 and that constitute the subtitle data written in the image memories 7c and 7d. The image decoders 7a and 7b then write graphics subtitles in uncompressed format on the image plane 8. The subtitle data decoded by the image decoders 7a and 7b is data representing subtitles compressed by run-length encoding and is defined by a pixel code indicating a Y value, Cr value, Cb value, and a value, and by the run-length of the pixel code.

(Image Plane 8)

The image plane 8 is a graphics plane that can store, at for example a resolution of 1920×1080 (1280×720), graphics data (e.g. subtitle data) obtained by decoding subtitle data. The image plane 8 has, for example, a left-view plane (indicated by an (L) in the image plane 8 in FIG. 8) having a storage area capable of storing data with a resolution of 1920×1080 (1280×720) and a right-view plane (indicated by an (R) in the image plane 8 in FIG. 8) having a storage area capable of storing data with a resolution of 1920×1080 (1280×720).

(Audio Decoder 9)

The audio decoder 9 decodes the audio frames output from the demultiplexer 4 and outputs audio data in an uncompressed format.

(Interactive Graphics Plane 10)

The interactive graphics plane 10 is a graphics plane having a recording area capable of storing, at for example a resolution of 1920×1080 (1280×720), graphics data that a BD-J application renders uses a rendering engine 27a. The interactive graphics plane 10 has, for example, a left-view plane (indicated by an (L) in the interactive graphics plane 10 in FIG. 8) having a storage area capable of storing data with a resolution of 1920×1080 (1280×720) and a right-view plane (indicated by an (R) in the interactive graphics plane 10 in FIG. 8) having a storage area capable of storing data with a resolution of 1920×1080 (1280×720).

The "graphics data" stored in the interactive graphics plane 10 is graphics in which each pixel is defined by an R value, G value, B value, and a value. The graphics written on the interactive graphics plane 10 are images and widgets with the main purpose of being used to constitute a GUI. While there is a difference in the data representing pixels, image data and graphics data are both encompassed in the expression "graphics data." There are two types of graphics planes that are the target of the present application: the image plane 8 and the interactive graphics plane 10. Referring to "graphics plane(s)" is defined as referring to either the image plane 8 or the interactive graphics plane 10, or to both.

(Background Plane 11)

The background plane 11 is a plane memory that can store, at for example a resolution of 1920×1080 (1280×720), still image data that will become a background image. Concretely, the background plane 11 has a left-view plane (indicated by an (L) in the background plane 11 in FIG. 8) with a resolution of 1920×1080 (1280×720) and a right-view plane (indicated by an (R) in the background plane 11 in FIG. 8) with a resolution of 1920×1080 (1280×720).

(Register Set 12)

The register set 12 is a collection of registers including a playback state register storing the playback condition of a PlayList, a playback setting register storing configuration information indicating the configuration of the playback apparatus, and a generic register capable of storing arbitrary information used by the contents. The playback condition of the PlayList indicates conditions such as which type of AV data information among the AV data stored in the PlayList is being used, which position (time) in the PlayList is being played back, etc.

When the playback condition of a PlayList changes, the playback control engine 14 stores the change in the register set 12. Also, it is possible to store a value indicated by an application and to transmit a stored value to an application based on instructions from the HDMV module, the main actor in HDMV mode, or the Java platform, the main actor in BD-J mode.

(Static Scenario Memory 13)

The static scenario memory 13 is a memory for storing current PlayList information and current Clip information. Current PlayList information indicates which piece of PlayList information is currently being processed from among the plurality of pieces of PlayList information that can be accessed on the BD-ROM, built-in media drive, and removable media drive. Current Clip information indicates which piece of Clip information is currently being processed from among the plurality of pieces of Clip information that can be accessed on the BD-ROM, built-in media drive, and removable media drive.

(Playback Control Engine 14)

The playback control engine 14 executes AV playback functions and the PlayList playback functions. AV playback functions are a function group inherited from DVD players and CD players, i.e. processing such as starting and stopping playback, pause, unpause, cancel still picture function, fast forward at an indicated playback rate, rewind at an indicated playback rate, audio switching, sub-video switching, angle switching, etc. By issuing a processing request to the playback control engine 14, a movie object that is executed by an HDMV module or a BD-J application that is executed by a BD-J platform can cause the playback control engine to perform not only playback control for regular playback, i.e. starting and stopping playback, but also trickplay such as pause, unpause, cancel still picture function, fast forward at an indicated playback rate, rewind at an indicated playback rate, audio switching, and sub-video switching. PlayList playback functions refer to starting or pausing playback in accordance with the current PlayList information and current Clip information constituting the current PlayList. AV stream playback may be triggered to start by user operation (e.g. a play button), or may be triggered to start automatically by some sort of event in the terminal.

The middleware in the playback apparatus provides BD-J applications with APIs for causing the playback control engine to execute functions. The library of APIs for causing the playback control engine to execute functions is an "AV playback library 14a." Each API in the "AV playback library 14a" includes a variety of member functions, and by designating arguments and calling a member function (method) in the AV playback library, each API can make the playback control engine execute the functions of these member functions. On the other hand, a movie object can make the playback control engine execute processes that correspond to these APIs by issuing a navigation command corresponding to member functions.

To provide an example, "selectPlayList" is an API for a BD-J application to command switching of the PlayList. The arguments for calling this API become a BD-J locator. A BD-J locator is a locator, for exclusive use by a BD-J application, that can designate the PlayList to be selected using a title_id, playlist_id, and PlayItem_id. By using the file body of the PlayList file in the BDMV/PLAYLIST directory, the BD-J locator can designate the PlayList that is to become a playback target.

The results of function performance by the playback control engine are notified to the BD-J application by an event. Accordingly, when using the AV playback library, it is necessary to register an event listener in the BD-J application so as to be able to receive the event indicating the performance results.

(Scaling Engine 15)

The scaling engine 15 can reduce, expand, or maintain the video images in the image plane 8 and the video plane 6. If a value is set in the plane shift engine 20 when the image data and video frame are decoded, the scaling engine 15 assumes that scaling will occur and scales the decoded graphics before they are stored in the video plane.

(Composition Unit 16)

The composition unit 16 performs layer composition of the interactive graphics plane 10, image plane 8, video plane 6, and background plane 11. The interactive graphics plane 10, image plane 8, video plane 6, and background plane 11, which are plane memories, form a layer model. The layer composition by the composition unit 16 is completed by performing processing to superimpose pixel values for pixel data stored in the plane memories of layers for all combinations of layers in the layer model.

Processing to superimpose layers is as follows: the pixel values in units of lines in the plane memory located in a particular layer are multiplied by a weight of a transmission factor α, and the pixel values in units of lines in the plane memory located below the particular layer are multiplied by a weight of (1−transmission factor α). The pixel values that have undergone these weightings are then added, and the result becomes the pixel value for the pixels in units of lines in the particular layer. This superimposition of layers is repeatedly performed in units of lines for pixels located in two layers in the layer model in order to perform the above-mentioned layer composition.

When contents are presumed to have subtitles or a pop-up menu for the image plane data, the image plane is always overlaid on the video plane. In other words, even if the contents of the video plane are 3D, when subtitles or pop-up menus without depth overlap with the 3D video, display of the image needs to be prioritized. Otherwise, the graphics portion would be embedded in the video and would appear unnatural.

(HDMI Transmitting/Receiving Unit 17)

The HDMI transmitting/receiving unit 17 includes an interface that conforms, for example, with the HDMI (High Definition Multimedia Interface) standard. The HDMI transmitting/receiving unit 17 performs transmitting and receiving between the playback apparatus and the apparatus to which the HDMI connects (in this example, the display apparatus 400) in conformity with the HDMI standard, and transmits picture data stored in the video plane and uncompressed audio data decoded by the audio decoder 9 to the display apparatus 400. The display apparatus 400 stores, for example, information on whether the display apparatus 400 supports stereoscopic display, information on the resolution possible in monoscopic display, and information on the resolution possible in stereoscopic display. When requested by the playback apparatus via the HDMI transmitting/receiving unit 17, the display apparatus 400 returns the requested information to the playback apparatus (e.g. information on whether the display apparatus 400 supports stereoscopic display, information on the resolution possible in monoscopic display, or information on the resolution possible in stereoscopic display). In this way, it is possible to obtain from the display apparatus 400, via the HDMI transmitting/receiving unit 17, information on whether the display apparatus 400 supports stereoscopic display.

(Display Function Flag Storage Unit 18)

The display function flag storage unit 18 stores a 3D display function flag indicating whether or not the playback apparatus supports 3D display.

(Left/Right Processing Storage Unit 19)

The left/right processing storage unit 19 stores whether the current output processing is left-view output or right-view output. The flag in the left/right processing storage unit 19 indicates whether the output to the display apparatus (a television in FIG. 1) connected to the playback apparatus shown in FIG. 1 is left-view output or right-view output. During left-view output, the flag in the left/right processing storage unit 19 is set to indicate left-view output. Similarly, during right-view output, the flag in the left/right processing storage unit 19 is set to indicate right-view output.

(Plane Shift Engine 20)

The plane shift engine 20 includes an area to store image plane shift information. After determining whether the current processing target in the left/right processing storage unit 19 is a left-view video image or a right-view video image, the plane shift engine 20 uses the plane offset indicated in the stored image plane shift information to calculate the shift amount of the image plane's horizontal axis and then shift the image plane. By changing the shift amount of the horizontal axis of the subtitles/GUI, the depth accordingly changes. For example, a visual effect can be achieved wherein the further the left-view subtitles and right-view subtitles are shifted in a certain direction, the closer they will appear, whereas the further they are shifted in the opposite direction, the further back they will appear.

(Shift Information Memory 21)

The shift information memory 21 is a module to temporarily store a value when the user or an application requests updating of the image plane shift information. Image plane shift information is, for example, an integer between −255 and 255 indicating depth (255 being the closest, and −255 the deepest). The image plane shift information is converted into pixel coordinates indicating the final shift amount.

(BD-J Platform 22)

The BD-J platform 22 is a Java platform, the main actor in BD-J mode, in which Java 2 Micro Edition (J2ME) Personal Basis Profile (PBP 1.0) and Globally Executable MHP Specification (GEM 1.0.2) for Package Media Targets are fully mounted. By reading a bytecode from a class file existing in the JAR archive file, the BD-J platform 22 boots a BD-J application. It also converts the bytecode constituting the BD-J application and the bytecode constituting the system application into native code and causes the MPU to execute the native codes.

(Dynamic Scenario Memory 23)

The dynamic scenario memory 23 stores the current dynamic scenario and accompanies processing by the HDMV module, the main actor in HDMV mode, and the BD-J platform, the main actor in BD-J mode. The current dynamic scenario refers to the current target of execution from among Index.bdmv, BD-J objects, and movie objects recorded on the BD-ROM, built-in media, or removable media.

(Mode Management Module 24)

The mode management module 24 stores the Index.bdmv read from the BD-ROM, built-in media, or removable media and performs mode management and branching control. Mode management by the mode management module 24 refers to module allocation that determines to cause either the BD-J platform 22 or the HDMV module 25 to execute a dynamic scenario.

(HDMV Module 25)

The HDMV module 25 is a DVD virtual player that becomes the main actor in HDMV mode and is the execution object in HDMV mode. This module is provided with a command interpreter and performs control in HDMV mode by deciphering and executing navigation commands that constitute a movie object. Since navigation commands are written in similar syntax to a DVD-Video, playback control resembling a DVD-Video can be implemented by executing such navigation commands.

(UO Detection Module 26)

The UO detection module 26 accepts user operations for the GUI. Such user operations accepted by the GUI include title selection, subtitle selection, and audio selection to select from among titles recorded on the BD-ROM. In particular, a user operation proper to stereoscopic playback is to accept a depth level for the stereoscopic video. For example, three different depth levels, e.g. far, regular, and close, may be accepted, as may a depth level input by a numerical value, e.g. a depth in centimeters or millimeters.

When the UO detection module 26 accepts a command, from operation of the remote control, a button on a device, etc., to change the scaling of the image plane, the module in the device directly issues the scaling command.

(Rendering Engine 27*a*)

The rendering engine 27*a* is provided with basic software such as Java 2D and OPEN-GL, decodes JPEG data/PNG data in accordance with a request from a BD-J application, attains images and/or widgets, and writes the images and/or widgets on the interactive graphics plane and the background graphics plane. The image data obtained by decoding JPEG data becomes the wallpaper for the GUI and is pasted on the background graphics plane. The image data obtained by decoding PNG data is written on the interactive graphics plane and can achieve display of buttons that accompany animation. The images and widgets obtained by decoding this JPEG data/PNG data are used (i) by a BD-J application to display a pop-up menu for accepting selection of titles, subtitles, or audio, and (ii) to constitute part of the GUI for operating a game interlocked with playback of the stream. Additionally, when a BD-J application accesses a website, the images and widgets are used to constitute a browser window for the website.

(Rendering Memory 27*b*)

The rendering memory 27*b* is a memory into which the PNG data and JPEG data that are to be decoded by the rendering engine are read. When a BD-J application executes live display mode, it secures a cache area in the rendering memory 27*b*. Live display mode is a combination of a browser window for a website existing on a network and stream playback via the BD-ROM. The cache area is a cache memory for caching the current browser window and the immediately preceding browser window during live display mode. The cache area consists of uncompressed PNG data or uncompressed JPEG data, and the data constituting the above-mentioned browser windows are stored within.

(Display Mode Setting Initial Display Setting Unit 28)

Based on the BD-J object in the current title provided by the BD-J platform unit, the display mode setting initial display setting unit 28 sets the playback mode and the resolution.

(Dimensional Mode Storage Unit 29)

The dimensional mode storage unit 29 stores the playback mode and stereo mode. When the 3D display function flag for the playback apparatus indicates that 3D display is possible, it is possible to switch the playback mode, a terminal setting stored in the dimensional mode storage unit 29, between 2D and 3D. Hereinafter, a condition indicating that the playback mode is "3D" is referred to as "3D mode," whereas a condition indicating that the playback mode is "2D" is referred to as "2D mode." This concludes the description of the structural elements of the playback apparatus. The following is a detailed description for achieving stereoscopic playback.

(Necessary Elements to Produce Stereoscopic Video)

To produce 3D video, a playback apparatus and a display apparatus themselves also need to be capable of producing 3D video. Also, creation of contents and mounting on a playback apparatus become more convenient by informing the contents of whether the apparatuses have such a capability, and by having a setting in the playback apparatus for whether the contents themselves request to be operated in 2D or in 3D. This is to prevent the contents or the playback apparatus from unnaturally superimposing video and graphics. The register set 12 can be offered as an example of storing setting information on the capability of the playback apparatus and on the contents.

FIG. 9 shows a schematic view of sample contents of the register set 12. The register set 12 is composed of "playback state registers (0)-(127)" and "generic registers (0)-(4096)." The playback state registers are a collection of numbered storage locations for storing values. For example, the identifier for the PlayList currently being played back may be inserted in a storage location with a certain number, and the identifier for the audio in use may be inserted in a storage location with a different number. The playback control engine 14, HDMV module 25, or the BD-J platform 22 insert the values. Via the HDMV module 25 or the BD-J platform 22, the contents can retrieve or store values corresponding to an indicated number from the playback state registers and generic registers.

Among the playback state registers, the top three bits of the 14$^{th}$ register (playback state register (14)) are allocated to a setting indicating whether the contents request to be operated in 2D or in 3D.

Among the playback state registers, the last three bits of the 29$^{th}$ register (playback state register (29)) are allocated to a setting indicating capability of the playback apparatus to produce 3D video.

(Achieving a Stereoscopic View with Simply the Graphics Plane)

Before explaining 3D video output processing, it is preferable to explain the subtitles/GUI that achieve a stereoscopic view. The data handled by the playback apparatus 200 according to the present embodiment includes subtitle/GUI data. To decrease eyestrain, the subtitle/GUI data needs to be displayed closer than the video stream.

One way of displaying the subtitle/GUI stream closer is to combine and output the results of shifting the subtitle/GUI stream horizontally when producing left-view and right-view video images. By changing the shift amount of the horizontal axis of the subtitle/GUI, the depth accordingly changes. For example, a visual effect can be achieved wherein the further the left-view subtitles and right-view subtitles are shifted in a certain direction, the closer they will appear, whereas the further they are shifted in the opposite direction, the further back they will appear.

The playback mode that performs plane shifting based on the plane offset and achieves a stereoscopic view in one graphics plane as described above is called a "1 plane+Offset mode." The plane shift engine 20 implements this 1 plane+Offset mode.

The difference between the coordinates of the original pixel data and the coordinates of each piece of pixel data when shifted to the right or to the left is called the "shift amount." In a stereoscopic view, this shift amount is to be calculated according to a depth value, which indicates how much depth to provide in the image plane 8 or the interactive graphics plane 10. Moreover, during stereoscopic playback, the shift amount can be derived from a parameter that can be used as the parallax between eyes.

Furthermore, a parameter only for shifting the pixel data in the graphics plane to the left and right by the above-described shift amount is called a "plane offset." While the shift amount is a scalar amount, the plane offset is a vector with a positive value. The plane offset indicates how far to shift the coordinates of the pixel data from their current condition and in which direction, i.e. to the right or to the left.

In the present embodiment, the creator of the contents embeds information on the depth at which to display the subtitles/GUI in the PlayList information. In this way, while the playback apparatus 200 plays back the stream associated with the PlayList information, it continually displays the subtitles/GUI stereoscopically in front of the video stream based on the embedded information. The pixel shift amount and the pixel shift direction that are to be used as the plane offset are not only provided in the PlayList information, but are also provided from outside the playback apparatus, e.g. from a recording medium or from user operation. Information that forms the basis for the plane offset and that is a combination, provided from outside the playback apparatus, of the pixel shift amount and the pixel shift direction is referred to as "image plane shift information."

The value recorded in the image plane shift information can be used as the shift amount as is, though it is also possible to use the results of calculation, such as multiplying or combining the value with a value set beforehand in the terminal in the image plane shift information.

Depending on the resolution and the size of the display apparatus, the shift amount in the image plane may be too large, and the eyes may be unable to follow the image, making the image appear doubled. In this case, the subtitles and graphics can be adjusted not to appear too close by obtaining the shift amount through a combination of information on the resolution and the size of the display apparatus, based on the value recorded in the image plane shift information.

The following is an explanation of what kind of video contents are played back in the 1 plane+Offset mode.

Figure 10:
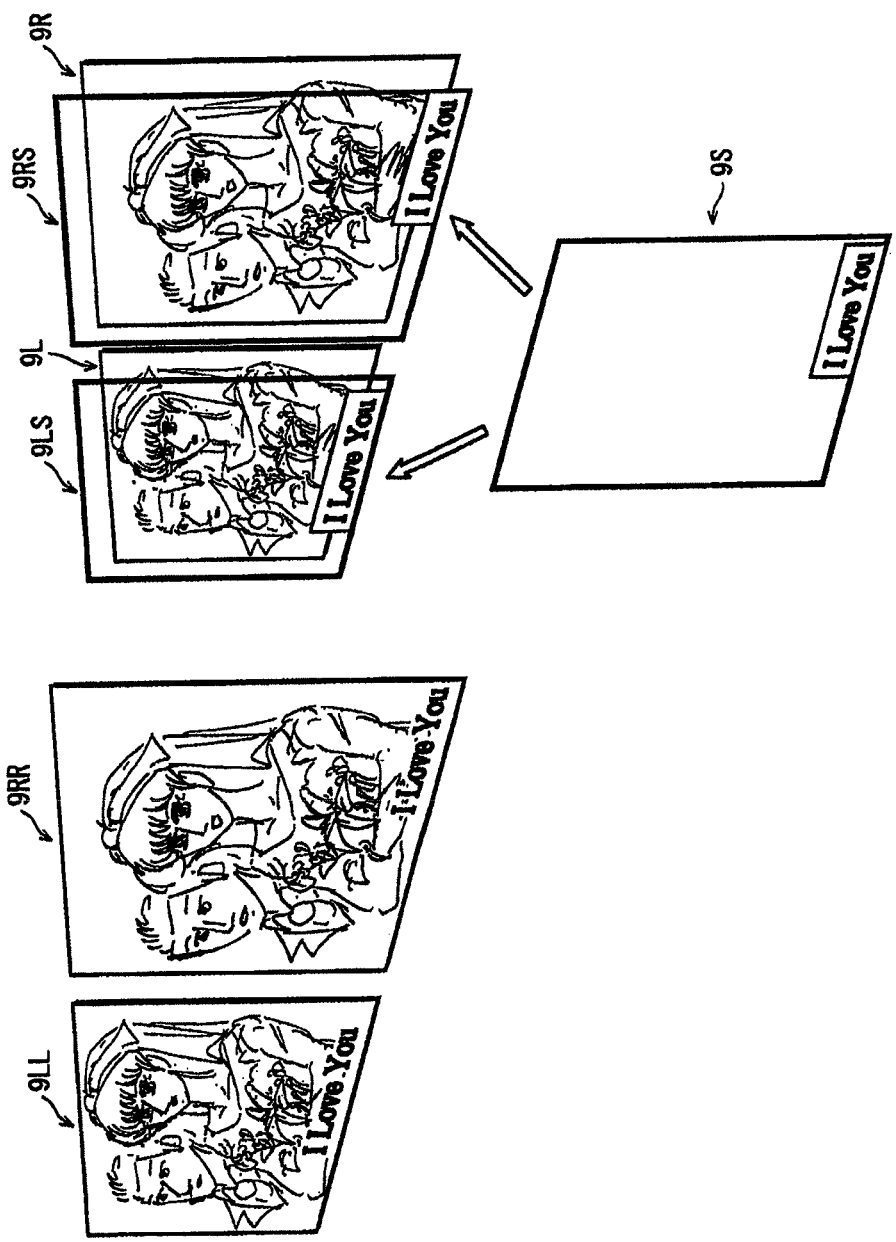
FIG. 10 shows a video frame in which plane shifted image planes have been combined.

FIG. 10 shows a video frame in which plane shifted image planes have been combined.

9L and 9R show examples of video frames stored in the video plane by the decoder. The differences in the woman's position and the direction she faces reveal that the left-view stream and the right-view stream were photographed from different angles.

9S shows the contents of the graphics plane before plane shifting. 9LS is a snapshot of the image plane when the subtitle "I love you" is shifted to the left. 9RS is a snapshot of the image plane when the subtitle "I love you" is shifted to the right.

9LL is a composite video image in which the left-view video frame and the image shifted to the left are combined. 9RR is a composite video image in which the right-view video frame and the image shifted to the right are combined.

It is clear that in the left-view video image in 9LL, the subtitle "I love you" is shifted to the left and combined, whereas in the right-view video image in 9RR, the subtitle "I love you" is shifted to the right and combined. If looking at the television without wearing the liquid crystal glasses, the video images 9LL and 9RR appear to overlap, as in FIG. 3.

Figure 11:
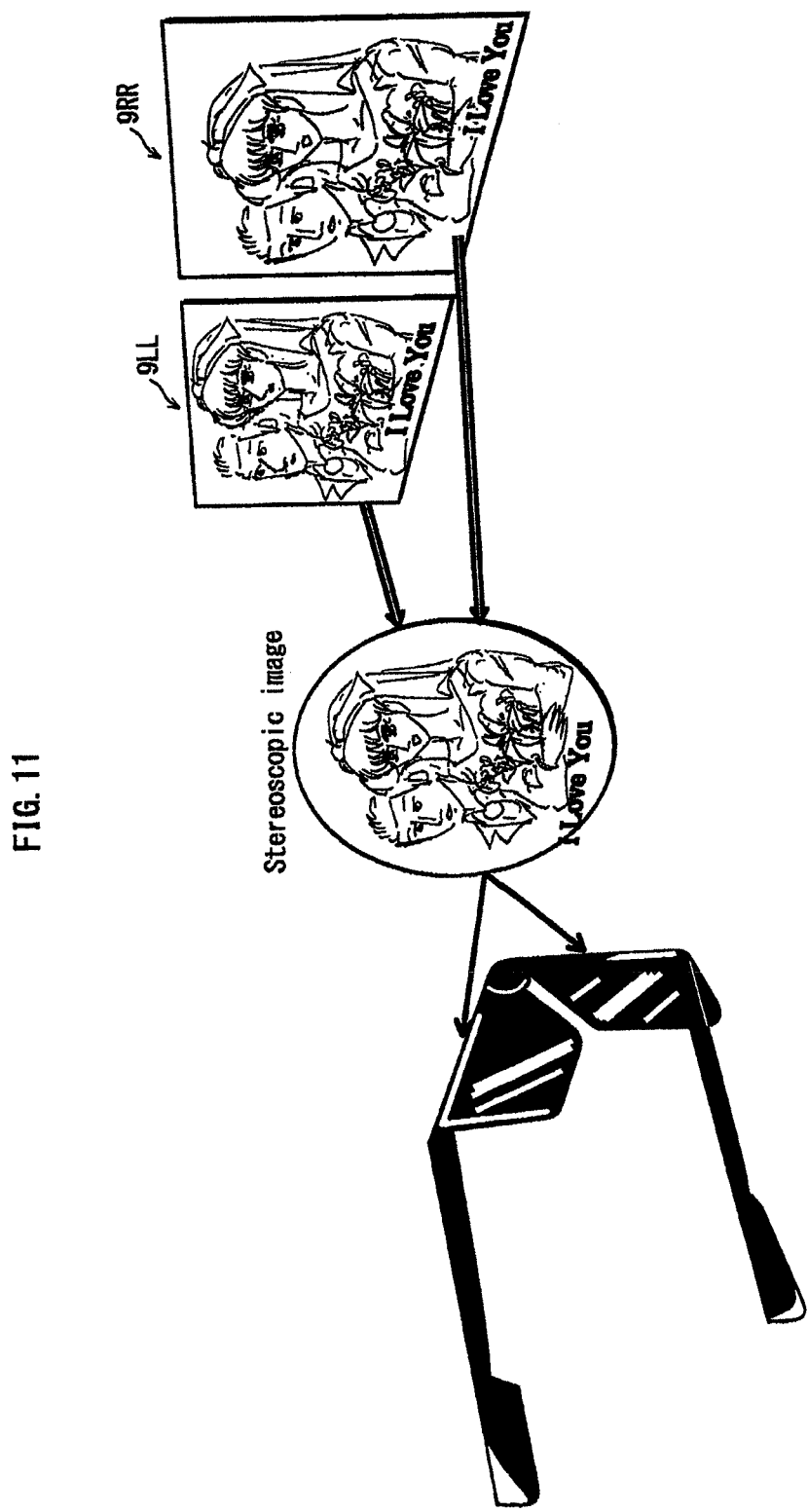
FIG. 11 shows the stereoscopic image that appears by viewing, through liquid crystal glasses 500, an image plane after being plane shifted to the left, and an image plane after being plane shifted to the right.

FIG. 11 shows the stereoscopic image that appears by viewing, through liquid crystal glasses 500, an image plane after being plane shifted to the left, and an image plane after being plane shifted to the right.

The right-view and the left-view video images are filtered by, for example, the liquid crystal glasses 500 shown in FIG. 1, and a different video image is shown to each eye. What is important to note here is that not only are the left and right images in the video stream superimposed and made stereoscopic, but also the subtitle "I love you" is accordingly shifted horizontally. That is, the subtitle has been provided with depth (in the present embodiment, displayed closer). In this way, it is possible to play back a stereoscopic video and subtitles that reduce eyestrain for viewers.

The explanation for FIGS. 9 and 10 uses subtitles in connection with the video stream, but it is also possible to provide graphics such as buttons with depth by performing processing via a similar method.

Figure 12:
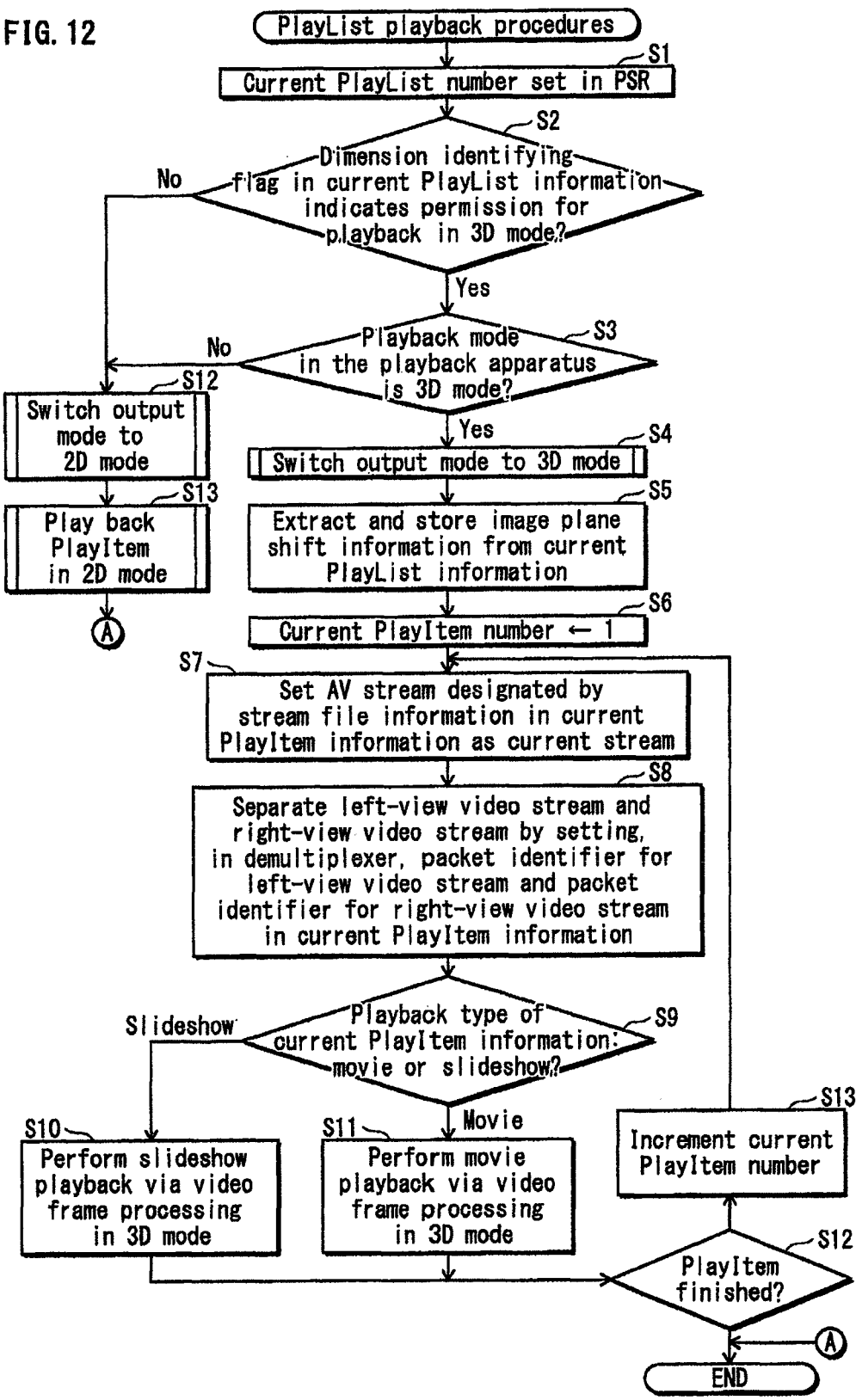
FIG. 12 is a flowchart showing the procedure whereby the playback apparatus 200 reads the above-mentioned PlayList, i.e. video data, and displays a 3D video with 3D subtitles and 3D graphics superimposed thereon.

FIG. 12 is a flowchart of when the playback apparatus 200 in Embodiment 1 reads the above-mentioned PlayList, i.e. video data, and displays a 3D video with 3D subtitles and 3D graphics superimposed thereon.

A PlayList playback request is triggered by an instruction from the contents or by user operation (i.e. a play button). Besides these cases, a title switch request, such as when a disc is inserted or when selecting from a menu, may also act as a trigger.

When playback of the PlayList begins, the static scenario memory 13 extracts the PlayList and the transport stream currently targeted for playback processing from among the plurality of PlayLists and streams on the BD-ROM disc and sets the extracted PlayList and transport stream in the current PlayList information (step S1).

The determination steps S2 and S3 follow, and if the determination results from these steps are affirmative, the playback mode is switched to 3D in step S4. The static scenario memory 13 then extracts from the current PlayList information the value (hereinafter, the image plane shift information) indicating the depth at which to display the subtitles/GUI and stores the value in the storage area within the plane shift engine 20 (step S5).

Step S2 determines whether the dimension identifying flag in the current PlayList information indicates that playback in 3D mode is permitted. Step S3 determines whether the playback mode in the playback apparatus is 3D mode. These determinations are made referring to the flag (2D or 3D) stored in the dimensional mode storage unit 29. The value stored in the dimensional mode storage unit 29 is assumed to be switched beforehand by, for example, user operation or instruction from an application.

If the result of either of these steps is negative, the playback mode is switched to 2D playback mode in step S12, and PlayItem playback is performed in 2D mode (step S13).

After steps S4 and S5 are performed, processing proceeds to the loop from step S6 to step S13.

In the loop from step S6 to step S13, step S6 initializes the current PlayItem number to 1, after which the processing between steps S7 and S13 is repeated until step S12 is determined to be "yes." The termination condition for the loop is that the PlayItem is the last number in the PlayList. As long as this condition is not fulfilled, the current PlayItem number is incremented (step S13).

The processing repeated in the loop is as follows: the AV stream designated by the stream file information in the current PlayItem information is set as the current stream (step S7); the left-view video stream and the right-view video stream are separated by setting, in the demultiplexer, the packet identifier for the left-view video stream and the packet identifier for the right-view video stream in the current PlayItem information (step S8); the playback apparatus determines whether the playback type of the current PlayItem information is a movie or a slideshow (step S9); if the playback type is a slideshow, slideshow playback is performed via video frame processing in 3D mode (step S10); if the playback type is a movie, movie playback is performed via video frame processing in 3D mode (step S11).

Figure 13:
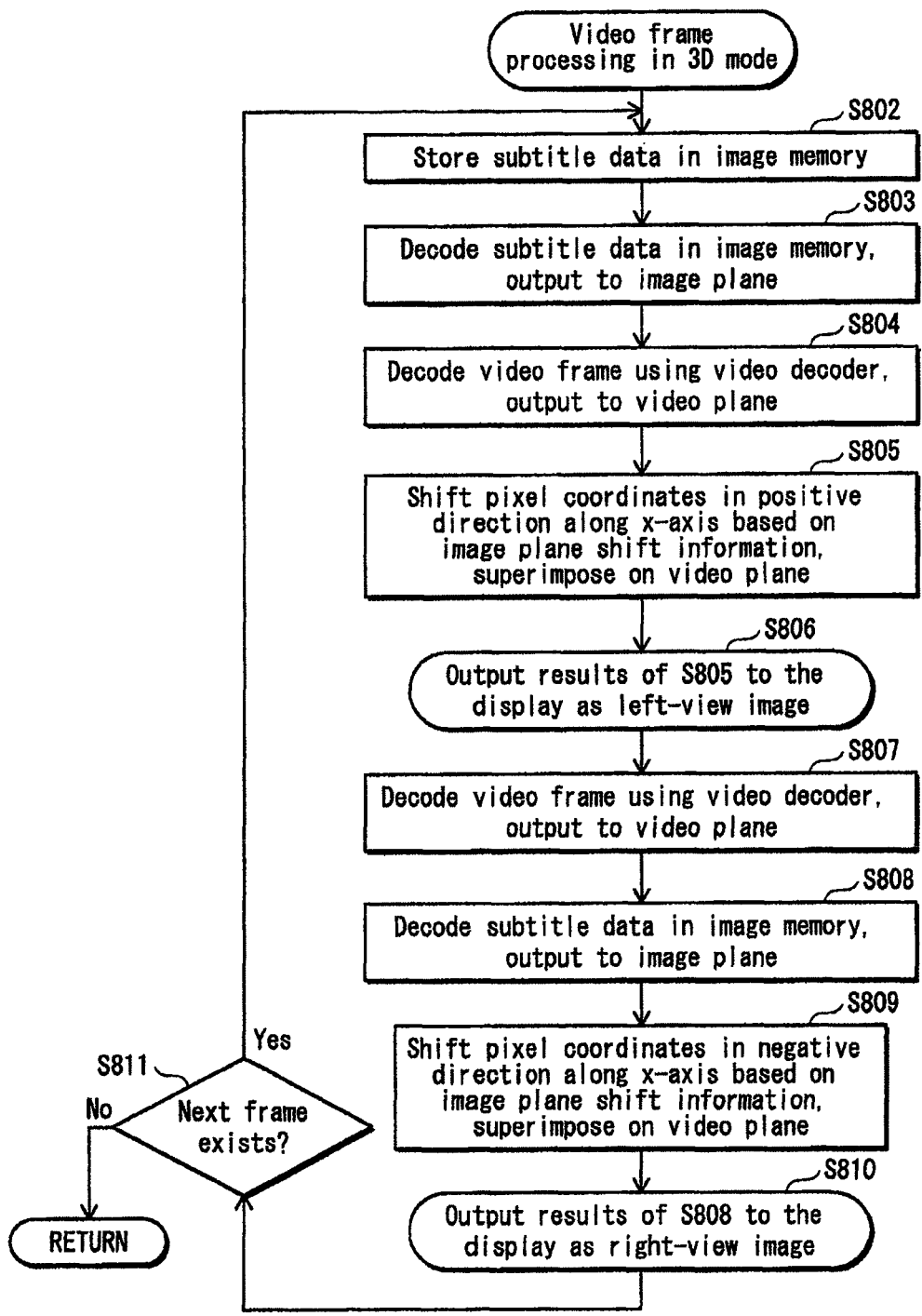
FIG. 13 is a flowchart showing the procedures for video frame processing in 3D mode.

FIG. 13 is a flowchart showing the procedures for video frame processing in 3D mode.

First, the demultiplexer 4 demultiplexes the transport stream on the disc and stores the graphics stream in the image memories 7c and 7d (step S802). Next, the image decoders 7a and 7b decode the graphics stream and the like stored in the image memories 7c and 7d and write them on the image plane 8 (step S803). Subsequently, the demultiplexer 4 demultiplexes the transport stream on the disc and, based on the flag in the left/right processing storage unit 19, extracts the corresponding video stream and stores video decoded by the video decoder 5 in the video plane (step S804). In Embodiment 1, the flag in the left/right processing storage unit 19 is set by default to left-view processing. The order of steps S802-S804 is just an example, and these steps may be performed in any order.

After storage in the image plane is finished, based on the image plane shift information stored in step S5, the plane shift engine 20 refers to the flag in the left/right processing storage unit 19 and shifts the image plane in a particular direction. The composition unit 16 combines the video plane 6 with the shifted image in the graphics plane 9 (step S805).

The direction in which the plane shift engine 20 shifts data in step S805 differs according to whether the image plane is displayed closer to or further away from the viewer. In Embodiment 1, it is assumed that left-view video images are shifted to the right, i.e. closer to the viewer.

The final video image combined by the composition unit 16 in step 5805 is output to the display apparatus 400 as a left-view video image (step S806). As soon as this output is complete, the playback apparatus switches the flag in the left/right processing storage unit 19. That is, when the flag was set to left-view processing, it is switched to right-view processing, and vice-versa.

Next, the demultiplexer 4 demultiplexes the transport stream on the disc and, based on the flag in the left/right processing storage unit 19, extracts the corresponding video stream and stores video decoded by the video decoder 5 in the video plane (step S807). In this example, this step is right-view processing, and thus the right-view video stream is extracted.

The image decoders 7a and 7b decode the graphics stream and the like stored in the image memories 7c and 7d and write them on the image plane 8 (step S808). The plane shift engine 20 refers to the flag in the left/right processing storage unit 19 and shifts the image plane in a particular direction, and the composition unit 16 combines the video plane 6 with the shifted image in the graphics plane 9 (step S809). Since left-view processing was performed in step S805, the image plane was shifted to the right, but since this step performs right-view processing, shifting is performed in the opposite direction, i.e. to the left. The final video image combined by the composition unit 16 in step S809 is output to the display apparatus 400 as a right-view video image (step S810).

As soon as this output is complete, the playback apparatus switches the flag in the left/right processing storage unit 19. That is, when the flag was set to left-view processing, it is switched to right-view processing, and vice-versa.

As long as a next frame exists after step S810 is complete, the playback apparatus 200 repeats the processing between steps S802 and S810.

(2D Playback Mode)

Since 2D playback mode presumes high image quality during 2D playback, when the target stream for playback is 2D, always switching the playback mode to 2D makes it possible to continually provide viewers with the highest image quality. When the target stream for playback is 3D, the current playback mode is maintained. Since switching the playback mode causes a delay before images are output, drastically reducing the switching of the playback mode in the way makes it possible to shorten the time until AV playback begins.

Figure 14:
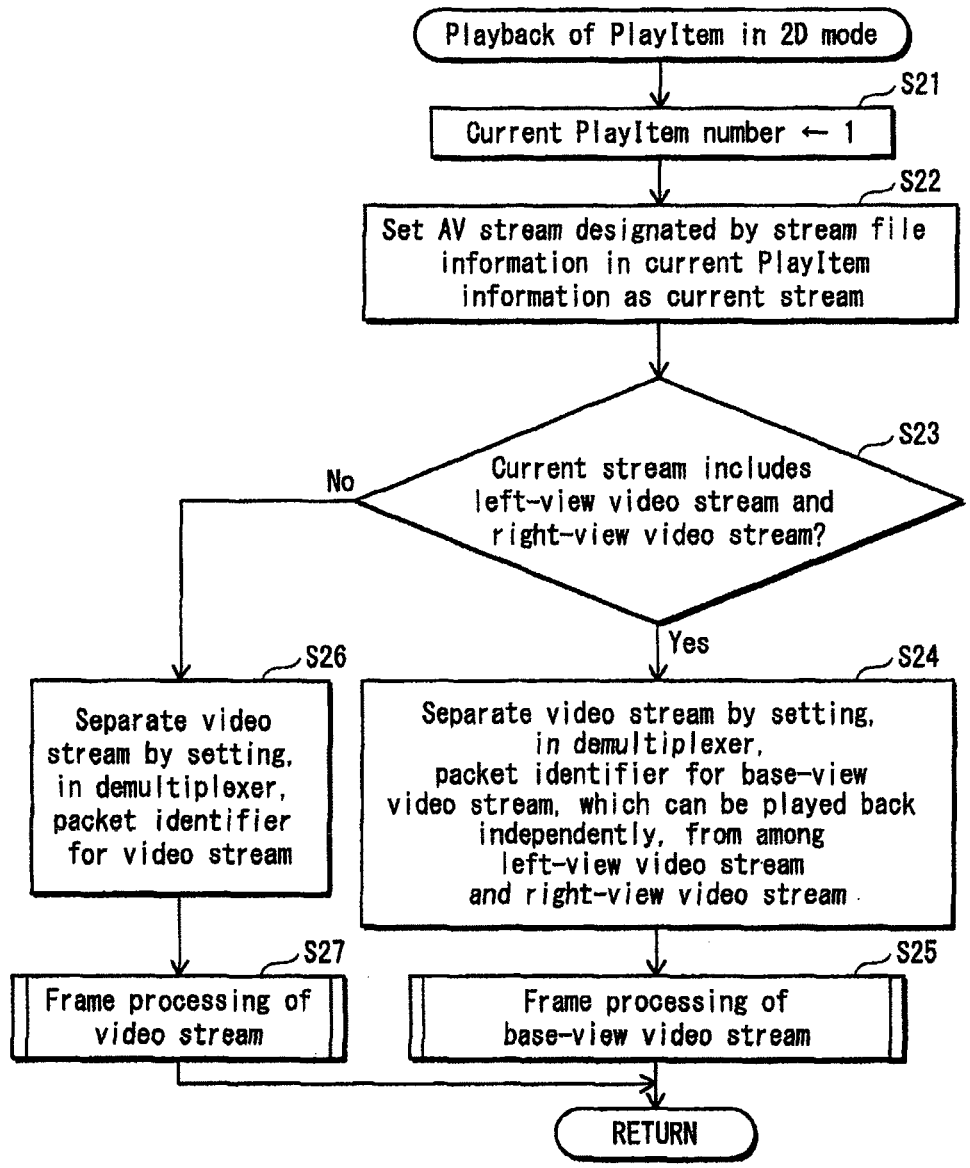
FIG. 14 is a flowchart showing the procedures for playback of a PlayList in 2D mode.

FIG. 14 is a flowchart showing the procedures for playback of a PlayList in 2D mode.

First, the current PlayItem number is set to 1 (step S21), then the AV stream designated by the stream file information in the current PlayItem information is set as the current stream (step S22), and subsequently, in accordance with the results of the determining step S23, the processing in steps S24-S25 and steps S26-S27 is selectively performed. Step S23 determines whether the current stream includes a left-view video stream and a right-view video stream. When these streams are included, the packet identifier for the base-view video stream, which can be played back independently, is set in the demultiplexer to separate the video stream (step S24). Afterwards, frame processing is performed on the base-view video stream (step S25).

When a left-view video stream and a right-view video stream are not included, the packet identifier for the video stream is set in the demultiplexer to separate the video stream (step S26), and frame processing is performed on the video stream (step S27).

Figure 15:
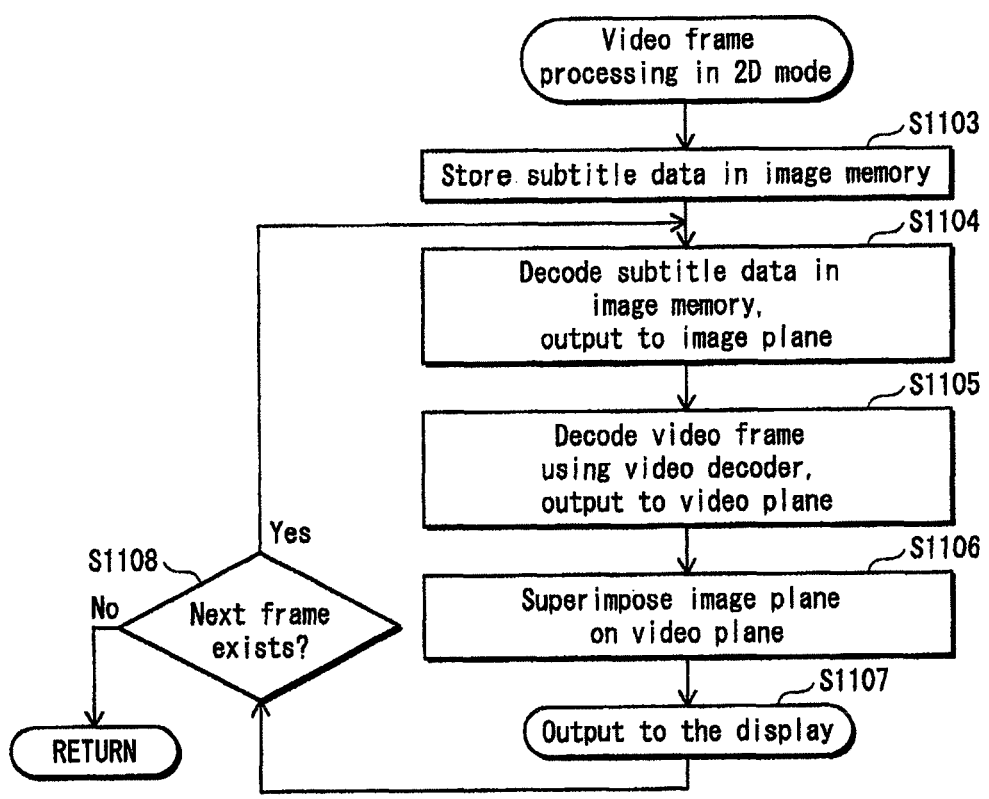
FIG. 15 is a flowchart showing procedures for video frame processing of a 2D stream in 2D mode.

FIG. 15 is a flowchart showing procedures for video frame processing of a 2D stream in 2D mode.

The demultiplexer 4 demultiplexes the transport stream on the disc and stores the graphics stream in the image memories 7c and 7d (step S1103).

Next, the image decoders 7a and 7b decode the graphics stream and the like stored in the image memories 7c and 7d and write them on the image plane 8 (step S1104).

Subsequently, the demultiplexer 4 demultiplexes the transport stream on the disc, extracts the video stream, and stores the video decoded by the video decoder 5 in the video plane (step S1105).

Next, the composition unit 16 combines the video plane 6 with the image in the graphics plane 9 (step S1106). The final video image combined by the composition unit 16 in step S1106 is output to the display apparatus 400 (step S1107). After the final video image is output to the display apparatus 400 in step S1107, the playback apparatus determines whether the frame was the first frame processed after switching of the playback mode (S1108). The final video image is output to the playback apparatus 400 in step S1108.

Figure 16:
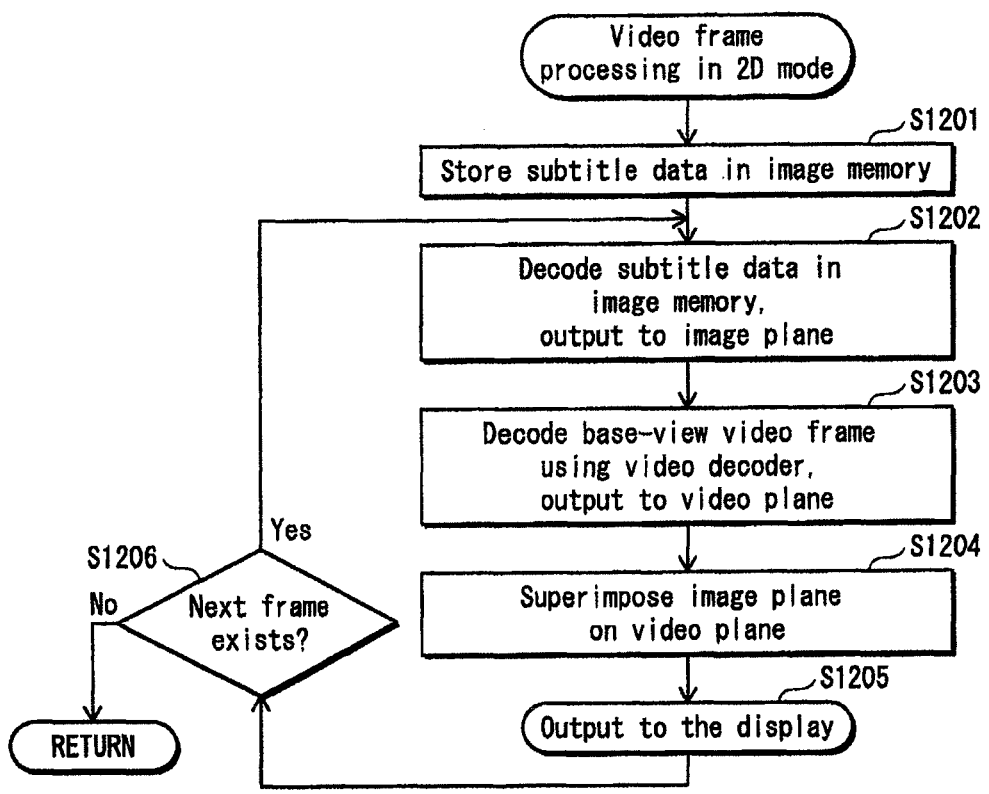
FIG. 16 is a flowchart showing procedures for video frame processing of a 3D stream in 2D mode.

FIG. 16 is a flowchart showing procedures for video frame processing of a 3D stream in 2D mode. The following is an explanation of 2D video output processing with reference to the flowchart in FIG. 16.

First, the demultiplexer 4 demultiplexes the transport stream on the disc and stores the graphics stream in the image memories 7c and 7d (step S1201).

Next, the image decoders 7a and 7b decode the graphics stream and the like stored in the image memories 7c and 7d and write them on the image plane 8 (step S1202).

Subsequently, the demultiplexer 4 demultiplexes the transport stream on the disc, extracts the left-view video stream, and stores video decoded by the video decoder 5 in the video plane (step S1203).

Next, the composition unit 16 combines the video plane 6 with the image in the graphics plane 9 (step S1204). The final video image combined by the composition unit 16 in step S1204 is output to the display apparatus 400 (step S1205). Note that though the left-view video stream was extracted in step S1203, the right-view video stream may be extracted and combined in step S1204. In this way, even when the transport stream is 3D (step S2: 3D), if the terminal setting in the playback apparatus 200 is set to 2D mode (step S3: 2D), it can output 2D video.

In the above-described way, a playback apparatus according to the present embodiment determines both whether the digital stream supports 2D or 3D video as well as whether the playback apparatus is set to 2D playback or 3D playback in order to ultimately decide whether to play back the video stream in 2D or in 3D, thereby appropriately producing stereoscopic video.

(Embodiment 2)

Embodiment 1 was composed of two planes, an image plane and a video plane. When there is a video plane and two or more graphics planes, the number of image memories and image planes is increased accordingly, and planes are shifted and superimposed in accordance with the image plane shift information for each image plane.

Figure 17:
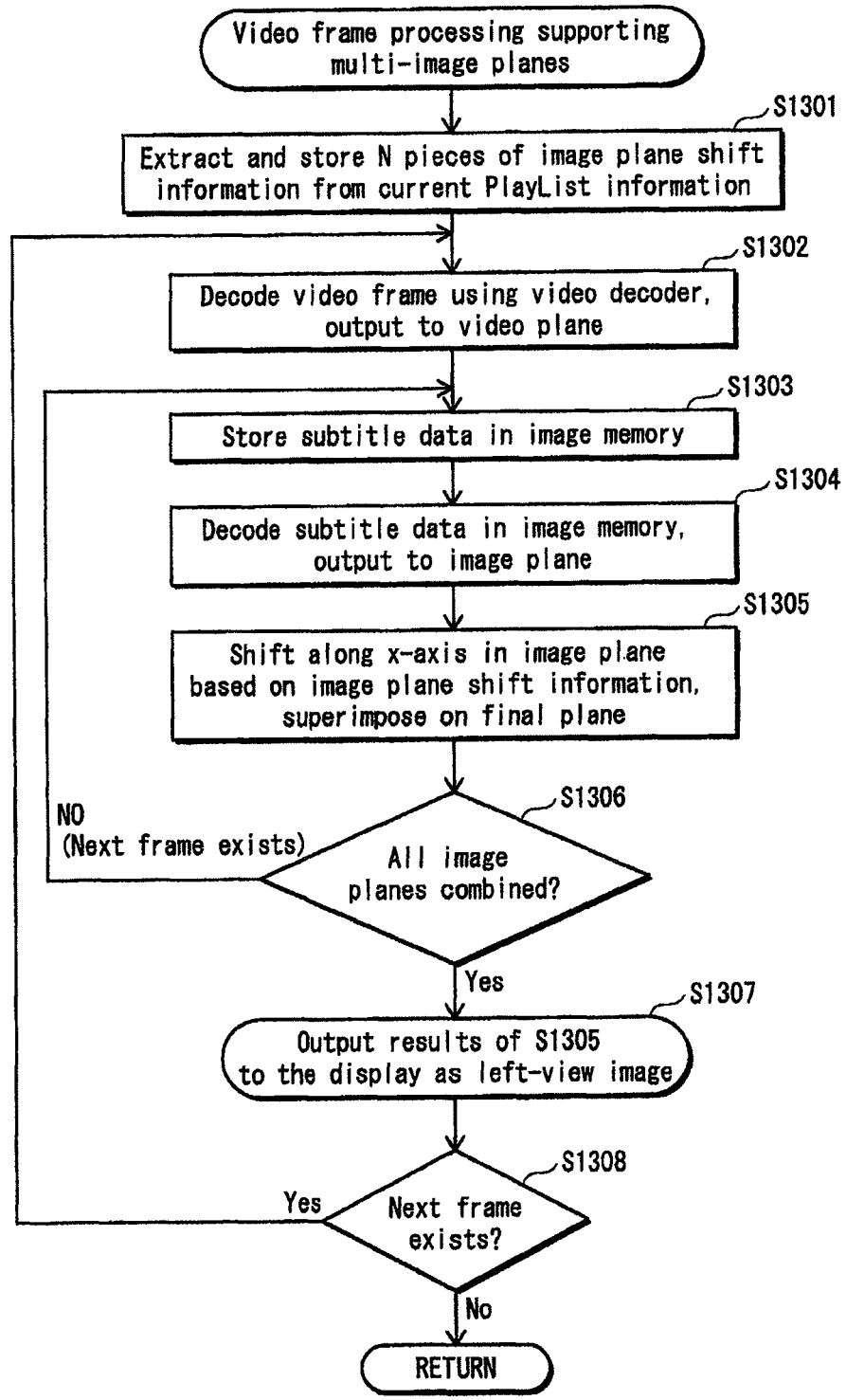
FIG. 17 is a flowchart showing procedures for playback processing of a PlayList that supports multi-image planes.

FIG. 17 is a flowchart showing procedures for playback processing of a PlayList that supports multi-image planes. The playback apparatus 200 extracts pieces of image plane shift information from the current PlayList information in the static scenario memory 13 for the number of image planes and stores the pieces of information in the plane shift engine 20 as a sequence (step S1301). Next, the demultiplexer 4 demultiplexes the transport stream on the disc, extracts the left-view video stream, and stores video decoded by the video decoder 5 in the video plane (step S1302). Next, the demultiplexer 4 demultiplexes the transport stream on the disc and stores the graphics stream in the image memories 7c and 7d (step S1303). Subsequently, the image decoders 7a and 7b decode the graphics stream and the like stored in the image memories 7c and 7d and write them on the image plane 8 (step S1304).

Next, the plane shift engine 20 shifts the image plane in a certain direction based on the top value in the sequence of image plane shift information stored in step S1301, and the composition unit 16 combines the video plane 6 with the shifted image in the graphics plane 9 (step S1305). Note that when step S1305 is performed from the second time on, the composition unit does not combine the video plane with the shifted image in the graphics plane 9, but rather superimposes a new image plane on the image combined in the previous step S1305. Furthermore, when step S1305 is performed from the second time on, the corresponding second or subsequent piece of image shift information in the sequence of image shift information is used as a reference.

Next, the playback apparatus 200 determines whether all of the image planes have been combined, based on whether or not processing for both eyes has been performed for all of the pieces of image plane shift information in the sequence (step S1306). When not all of the image planes have been combined (step S1306: No), then processing for the next image plane is performed by repeating the processing in steps S1303-S1305 using the next piece of image plane shift information. When all of the image planes have been combined (step S1306: Yes), then the final video image combined by the composition unit 16 in step S1305 is output to the display apparatus 400 (step S1307). After outputting a left-view video image in step S1307, the same processing as for a left-view video image is performed for a right-view video image (steps S1302-S1307). However, during right-view processing, the image planes that were shifted to the right during in step S1305 are all shifted to the left. Also, whereas an image was output to the display apparatus in step S1307 as a left-view video image, the image combined in right-view processing is output as a right-view video image. Once a left-view video image and a right-view video image are complete, the next frame is processed.

(Embodiment 3)

In the present embodiment, it is assumed that a Java™ Xlet, controlled by the application manager in the platform via an Xlet interface, is used as the BD-J application. The Xlet interface has four states, "loaded," "paused," "active," and "destroyed," and is event driven, i.e. changes state and performs control in accordance with events. A key event that triggers operation of an application is prerecorded in the Xlet interface. Registration of a key event that acts as a trigger for operation is performed in this way by an event listener.

Since a BD-J application is event driven, operations by a BD-J application differ as compared to a movie object in the following way. When a command interpreter, the execution object of a command in HDMV mode, is ordered for example to play back a ten-minute long digital stream, it provides no response whatsoever for ten minutes. After ten minutes have passed, it responds for the first time. Since a BD-J application is event driven, however, the Java virtual machine responds to a BD-J application immediately after deciphering a playback command and issuing instructions to a lower level. Operation by an execution object in this way differs for each operation mode, and thus during operation by a BD-J application in BD-J mode, it is necessary to promote appropriate operation of the virtual machine by presetting, in a significant location in the control, an event that is to be notified, and preregistering, in the Xlet interface in the class file, an event listener to receive this key event. For example, when switching the playback mode in the playback apparatus from 2D to 3D or vice-versa, in addition to outputting an event to indicate this switching, if an event listener to receive this event is registered in the Xlet interface in the BD-J application, it is possible to switch processing of the BD-J application in accordance with the above-mentioned changes in the playback mode.

In the present embodiment, when the playback mode is switched, this switch in mode of the playback apparatus is notified to the display apparatus. When the playback apparatus receives notification from the display apparatus that the display apparatus is capable of output according to the mode after switching, the playback apparatus (i) outputs an event to the above-mentioned application indicating that output according to the mode after switching is possible, and (ii) prompts the BD-J application to perform corresponding operations.

Figure 18:
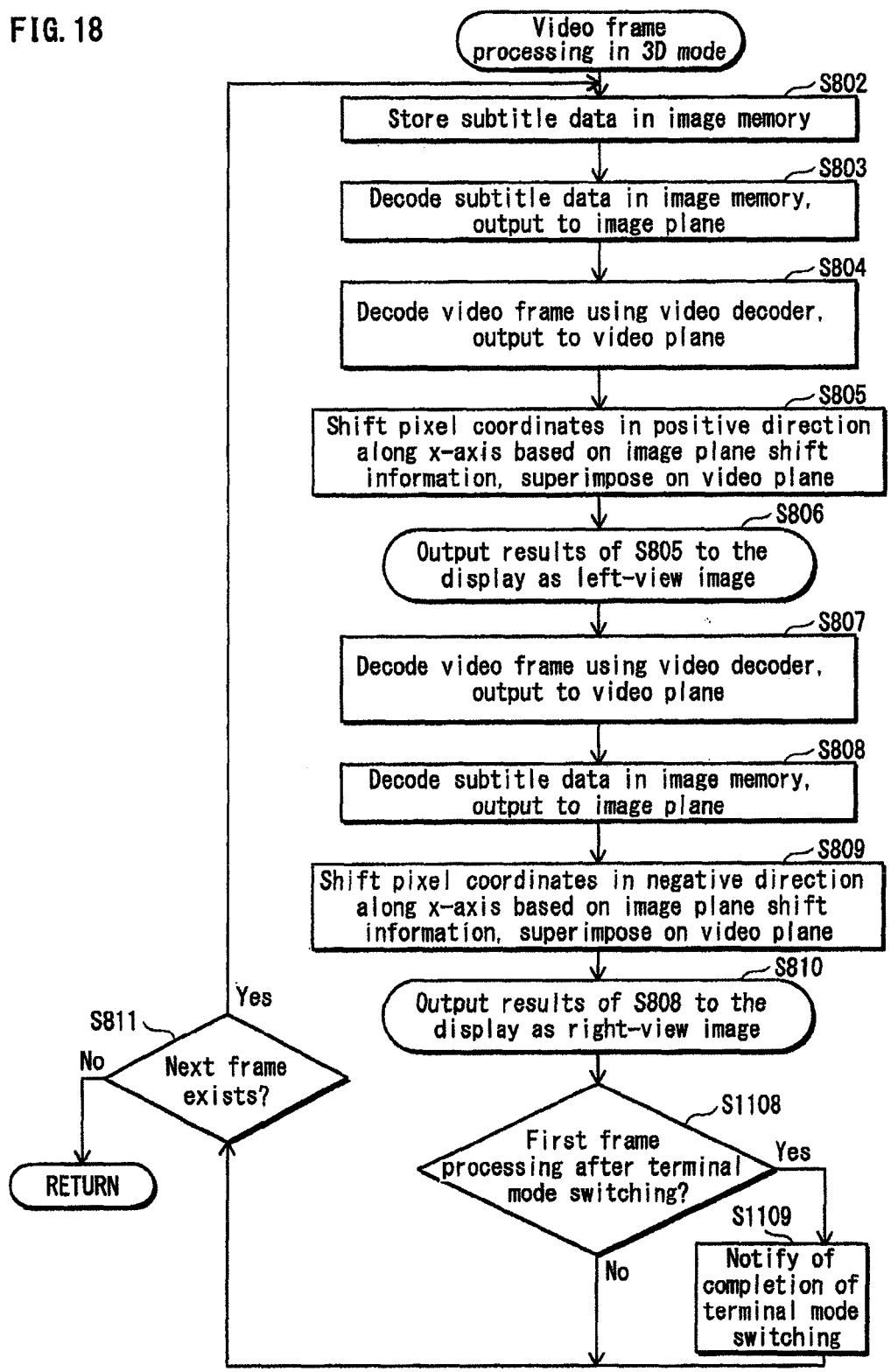
FIG. 18 is a flowchart showing procedures for video frame processing in 3D mode, incorporating a procedure to output an event to notify of completion of display mode switching.

FIG. 18 is a flowchart showing procedures for video frame processing in 3D mode, incorporating a procedure to output an event to notify of completion of playback mode switching. This figure was created based on FIG. 13 and differs from FIG. 13 by including, between steps S810 and S811, additional steps S1108 and S1109.

Step S1108 determines whether the frame is the first frame after playback mode switching. When the frame is the first frame, notification of completion of playback mode switching of the terminal is provided to the application (step S1109). In this way, when the transport stream that is the playback target is 2D, and the terminal is set to 2D mode, the playback apparatus 200 can switch between 2D and 3D mode by being able to perform 2D video output processing.

Figure 19:
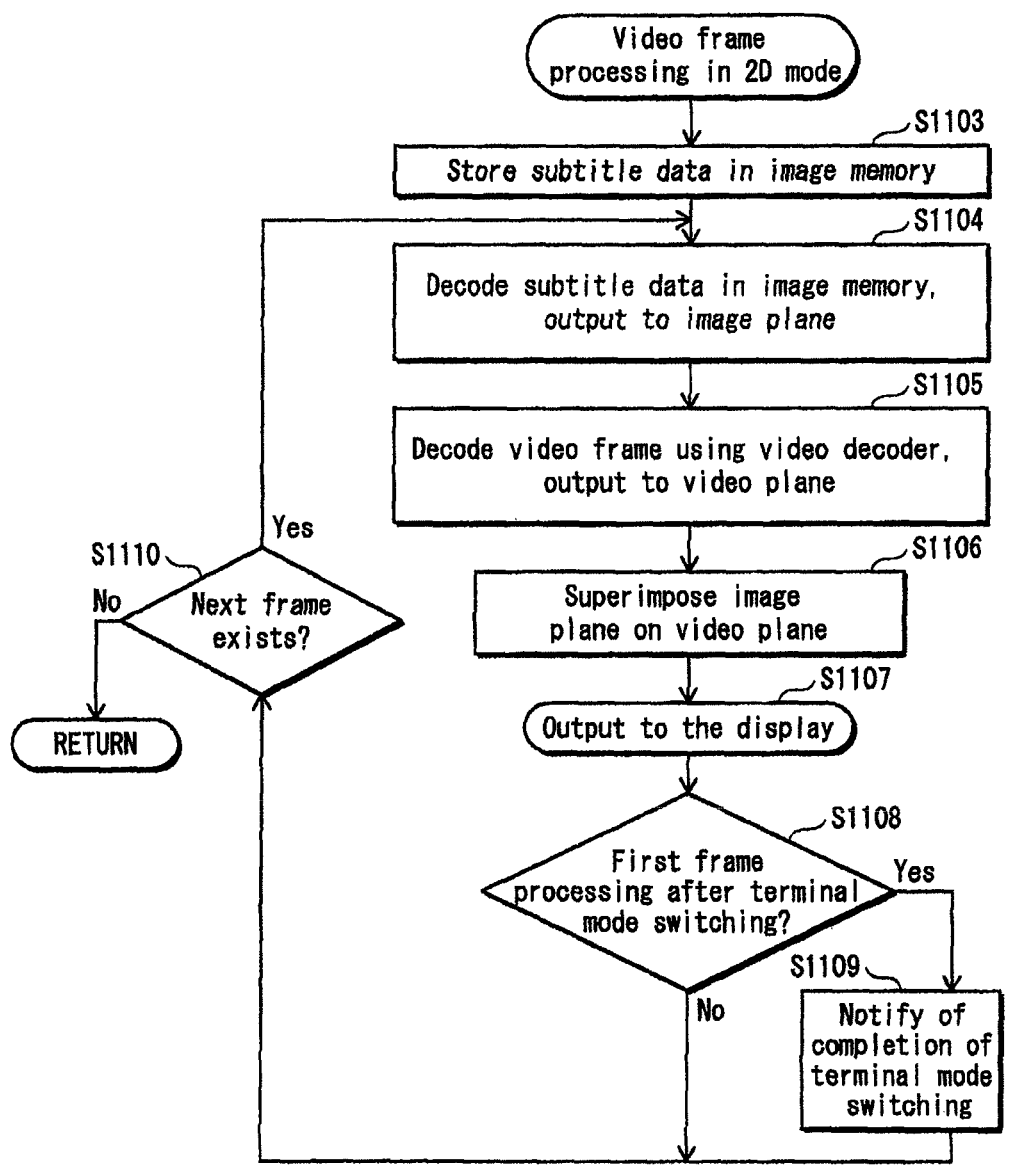
FIG. 19 is a flowchart showing procedures for video frame processing in 2D mode, incorporating a procedure to output an event to notify of completion of display mode switching.

FIG. 19 is a flowchart showing procedures for video frame processing in 2D mode, incorporating a procedure to output an event to notify of completion of playback mode switching. This figure was created based on FIG. 15 and differs from FIG. 15 by including, between steps S1107 and S1110, additional steps S1108 and S1109. Step S1108 determines whether the frame is the first frame after playback mode switching. When the frame is the first frame, notification of completion of playback mode switching of the terminal is provided to the application (step S1109). In this way, when the transport stream that is the playback target is 2D, and the terminal is set to 2D mode, the playback apparatus 200 can switch between 2D and 3D mode by being able to perform 2D video output processing.

Since a playback apparatus according to the present embodiment outputs an event to prompt a BD-J application provided with an event driven Xlet interface to perform appropriate rending for 3D mode, when the video contents switch from 2D to 3D or vice-versa, graphics rendering by the BD-J application can also be switched from 2D to 3D or vice-versa.

(Embodiment 4)

In the previous embodiments, explanation has been provided as to how stereoscopic playback is achieved during normal playback. In the present embodiment, on the other hand, explanation is provided of how to achieve stereoscopic playback when a user requests trickplay.

Figure 20:
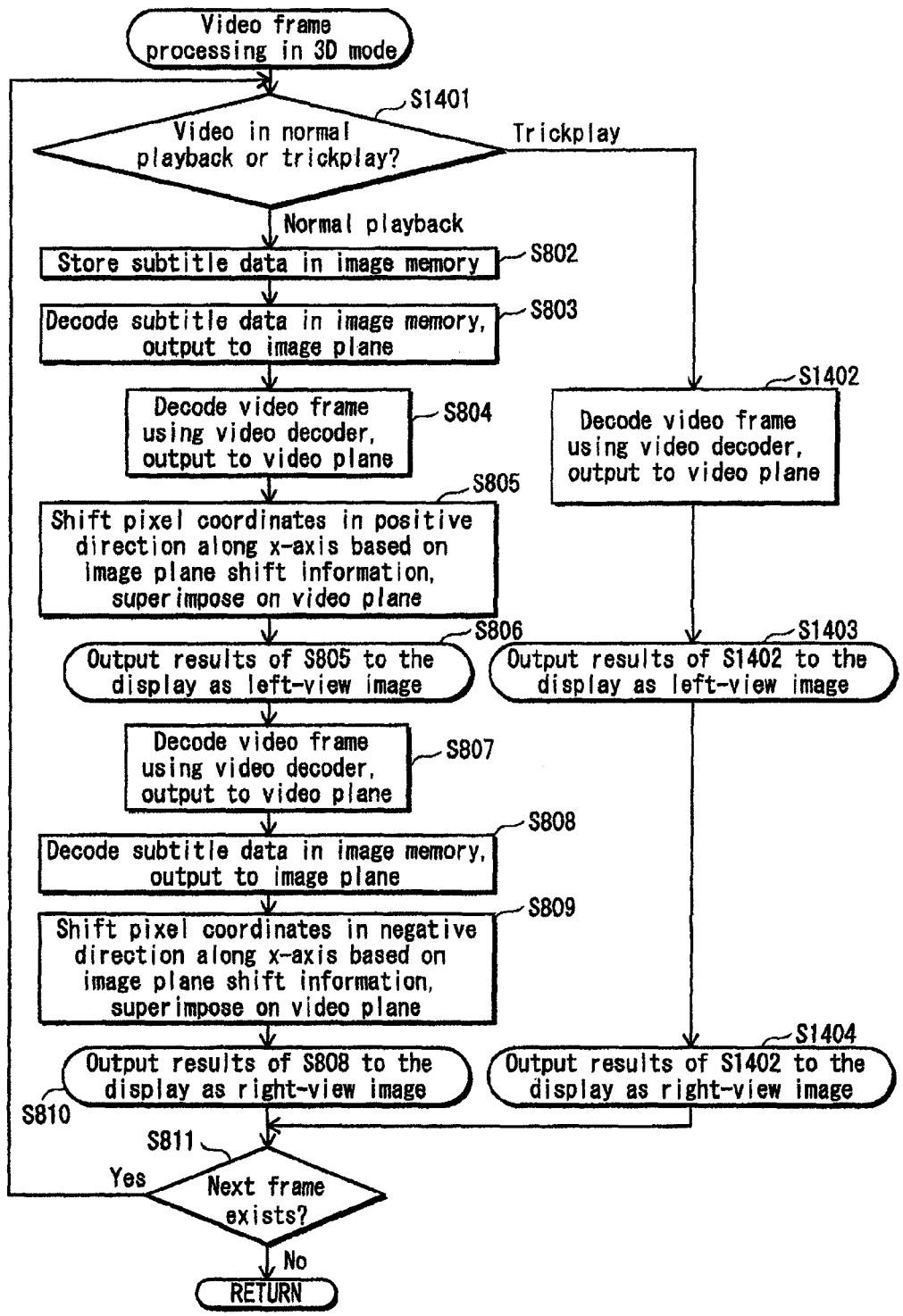
FIG. 20 is a flowchart showing procedures for video frame processing in 3D mode, taking trickplay into account.

FIG. 20 is a flowchart showing procedures for video frame processing in 3D mode, taking trickplay into account. This figure was created based on FIG. 13 and differs from FIG. 13 by including additional steps S1401-S1404.

Step S1401 determines whether the video currently being played back is in trickplay or in normal playback. For normal playback, the flowchart shows an example with both video and subtitles in displayed in 3D.

When step S1401 indicates trickplay, the demultiplexer 4 demultiplexes the transport stream on the disc and, based on the flag in the left/right processing storage unit 19, extracts the corresponding video stream and stores video decoded by the video decoder 5 in the video plane (step S1402). In Embodiment 4, the flag in the left/right processing storage unit 19 is set by default to left-view processing. The final video image combined by the composition unit 16 is output to the display apparatus 400 as a left-view video image (step S1403). As soon as this output is complete, the playback apparatus switches the flag in the left/right processing storage unit 19. That is, when the flag was set to left-view processing, it is switched to right-view processing, and vice-versa.

Next, a final video image combined by the composition unit 16 is output to the display apparatus 400 as a right-view video image (step S1404). As soon as this output is complete, the playback apparatus switches the flag in the left/right processing storage unit 19. That is, when the flag was set to left-view processing, it is switched to right-view processing, and vice-versa. As long as a next frame exists after step S1404 is complete, the playback apparatus 200 repeats the processing between steps S1401 and S1404.

When step S1401 indicates normal playback, 3D display of the subtitles/GUI and the video is continued, and steps S802-S810 as described above are performed in the processing flow in FIG. 8.

When continuous 3D display is difficult even when the video is paused, it is possible to output one video frame repeatedly, as during trickplay.

If playback is in trickplay, the video is switched to 2D display, and the subtitles are turned off. Even when the video is in trickplay such as fast-forward or rewind and only the right-view or left-view video can be decoded, it is possible to output video for both eyes. Thus, not only can flickering of the video be prevented, but also unnatural playback in which the video and subtitles do not align due to forcibly displaying the subtitles can be prevented.

(Method for Continual 3D Display)

When the video is stopped, paused, or in slide playback, processing for continual 3D display includes "continual 3D display via repeated display," "next frame setting," and "exceptions according to capability."

1. Continual 3D Display Via Repeated Display

For example, when a video is played back in 3D and, partway through, the video is stopped, paused, or put in slide playback by user operation or by the contents (a Java™ application or a MovieObject), 3D video is continually displayed by continuing to repeatedly display the left-view video frame, the right-view video frame, and the subtitle data for the position at which the video stopped.

In other words, by setting the next frame for next frame processing in FIG. 14 to always be the position of the video frame in the left-view video stream at the position where the video stopped, 3D display is continued. It may also be that only video is continually displayed in 3D, while subtitles are turned off. Similarly, when 3D display cannot be continued due to resource constraints such as memory, both the video and subtitles may be turned off.

In this way, by continuing 3D display insofar as possible, it is possible to suppress the occurrence of an unnatural stereoscopic gap insofar as possible, thereby diminishing an unpleasant sensation for viewers.

2. Next Frame Setting

By setting the next frame for next frame processing to always be the position of the video frame in the left-view video stream at the position where the video stopped, 3D display can be continued.

When 3D display cannot be continued due to resource constraints such as memory, both the video and subtitles may be turned off. In this way, by continuing 3D display insofar as possible, it is possible to suppress the occurrence of an unnatural stereoscopic gap insofar as possible, thereby diminishing an unpleasant sensation for viewers.

3. Exceptions According to Capability

Of course, when the playback apparatus 200 is high-performance, even during trickplay of a video such as fast forward, rewind, etc., 3D video may be continued by performing the processing in steps S802-S810.

(Embodiment 5)

Up until this point, behavior when trickplay is executed by user operation or by instructions from a BD-J application or movie object has been described. Image distortion or misalignment between the image and the subtitles, however, is caused in the first place by forcibly performing trickplay. Therefore, the following is an explanation of an improvement to prohibit trickplay in order to maintain 3D playback of subtitles/graphics and video.

Figure 21:
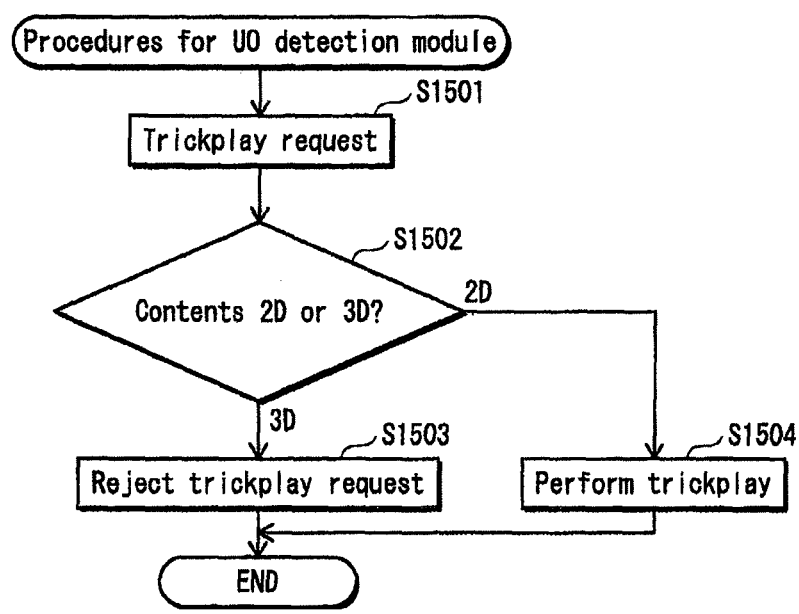
FIG. 21 shows an example flowchart for when trickplay is prohibited by user operation or by an instruction from a BD-J application or a movie object.

FIG. 21 shows an example flowchart for when trickplay is prohibited by user operation or by an instruction from a BD-J application or a movie object.

While the playback apparatus 200 is playing back subtitles/GUI and video, trickplay at a playback speed other than 1×, such as fast-forward, rewind, etc., is requested by user operation or by an instruction from a BD-J application or a movie object (step S1501). The playback control engine 14 acquires a dimension identifying flag 40111 from the current PlayList (PL) information in the static scenario memory 13 and determines whether the video is 2D or 3D (step S1502). When the video is determined to be 3D in step S1502, the trickplay request in step S1501 is rejected, and normal playback of the video is continued (step S1503). When the video is determined to be 2D in step S1502, the trickplay request in step S1501 is accepted, and the video playback is changed to special playback (step S1504).

3D display is made possible by thus preventing trickplay in which 3D display would be difficult.

(Embodiment 6)

In the present embodiment, explanation is provided for an improvement to apply a depth calculation method.

Figure 22:
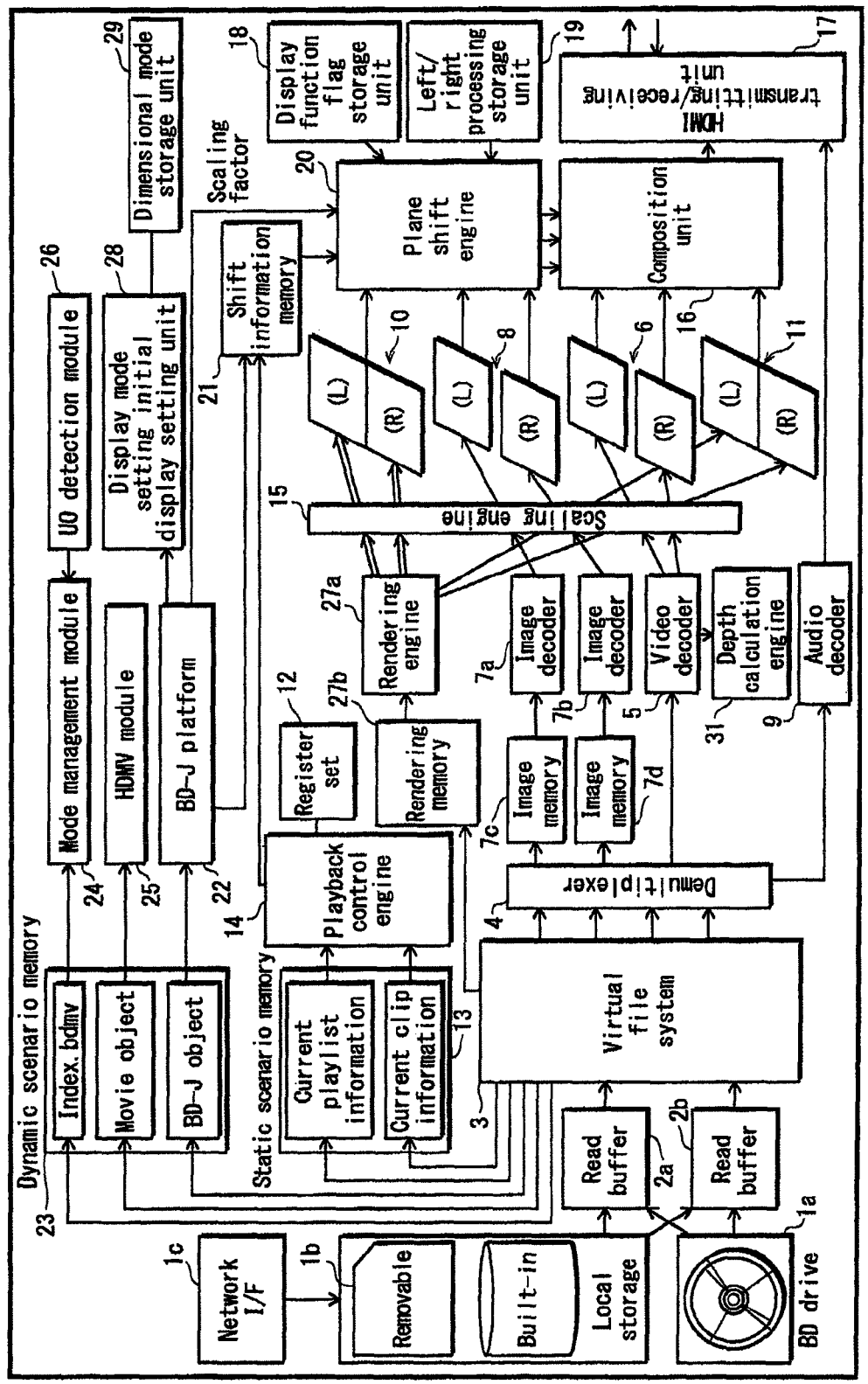
FIG. 22 is a block diagram showing the inner structure of a playback apparatus that applies a depth calculation method.

FIG. 22 is a block diagram showing the inner structure of a playback apparatus that applies a depth calculation method. As shown in FIG. 16, a depth calculation engine 24 has been added to the inner structure shown for Embodiment 1.

The depth engine 34 has the capability of calculating the depth from the video frame of the left-view subtitles/GUI stream. Depth is calculated by inputting a 2D video stream and a depth for each image plane pixel in each frame in the 2D video stream, and having the playback apparatus use this information to generate a left-view 3D video stream and a right-view 3D video stream. This method is disclosed in the specification of U.S. Pat. No. 5,929,859. The depth calculation method disclosed in U.S. Pat. No. 5,929,859 can also be used, by slightly changing the method shown in FIG. 15, to superimpose 3D subtitles/graphics on a 3D video stream.

Figure 23:
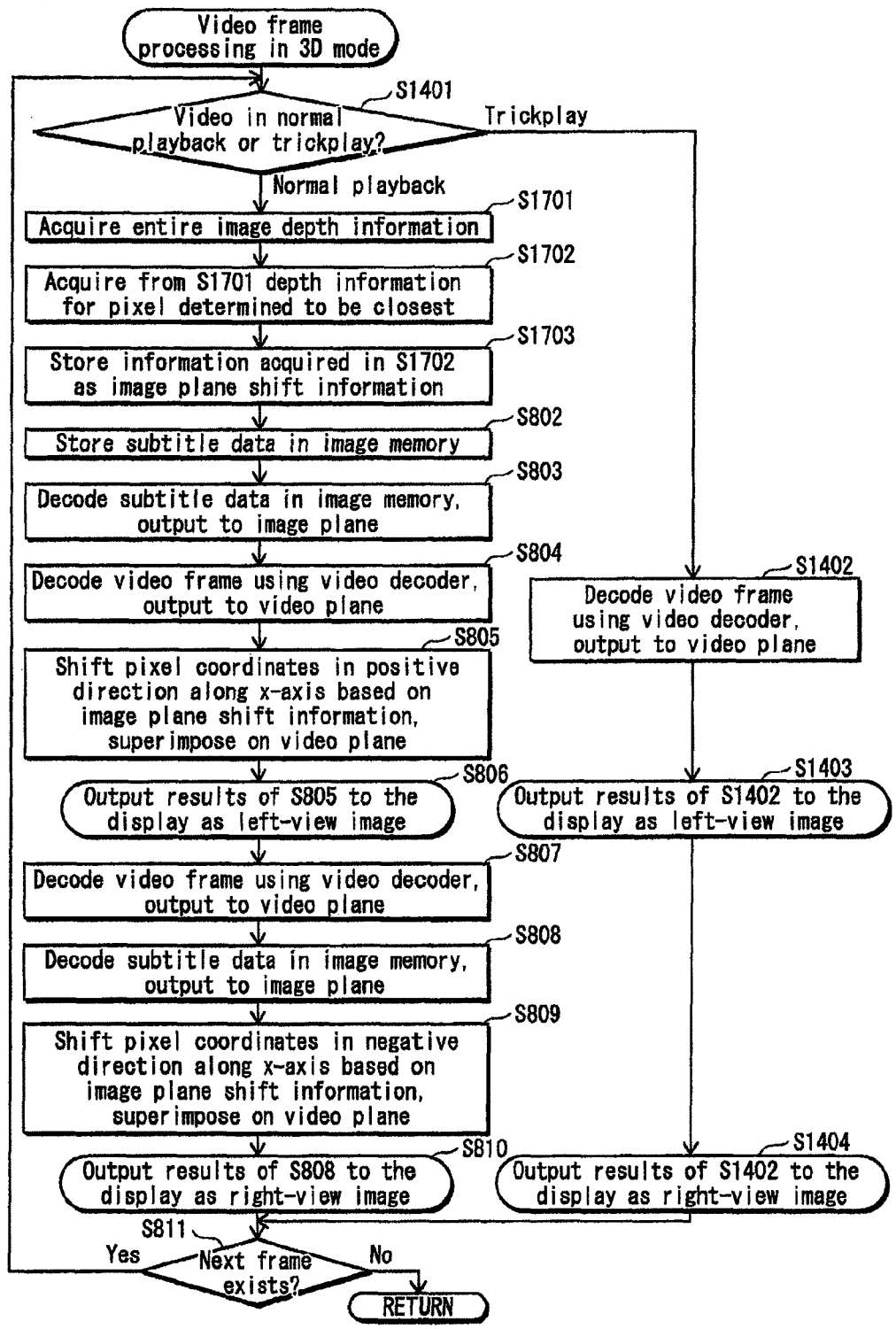
FIG. 23 is a flowchart showing procedures for video frame processing in 3D mode when using the depth calculation method.

FIG. 23 is a flowchart showing procedures for video frame processing in 3D mode when using the depth calculation method. This figure was created based on FIG. 20 and differs from FIG. 20 by including, between steps S1401 and S802, additional steps S1701-S1703.

In these additional steps, the depth calculation engine 34 extracts entire image plane depth information that indicates depth information for each pixel in the image plane (step S1701). Next, the depth calculation engine 34 extracts, from the entire image plane depth information extracted in step S1701, depth information corresponding to the pixel determined to be the closest to the viewer (step S1702). The depth calculation engine 34 stores the value extracted in step. S1702 in the storage area in the plane shift engine 20 (step S1703).

In order to display subtitles/graphics slightly closer than the closest point in the video in step S1703, in addition to the value extracted in step S1703, it is preferable to store, in the storage area in the plane shift engine 20, a value to bring the subtitles/graphics slightly closer.

Next, the playback apparatus performs processing in steps S802-S810 and S1401-S1404. Since a detailed explanation of the processing in steps S802-S810 and S1401-S1404 is provided in the explanation of FIGS. 8 and 14 in Embodiment 1, such explanation is omitted here. After the processing in steps S810 and S1404 is complete, the processing from step S1701 on is repeated as the next frame processing.

In this example, the video in steps S804 and S807 is not a left-view video stream and a right-view video stream acquired when the demultiplexer 4 demultiplexes the transport stream on the disc; rather, the target of steps S804 and S807 in FIG. 13 is a left-view video frame and a right-view video frame that have been processed in order to show an input 2D video stream in 3D.

In a playback apparatus according to the present embodiment, even when adopting a depth calculation method in which a 2D video stream and depth information for each pixel in the image plane are input, and when trickplay such as fast-forward, rewind, etc. is performed and a right-view video frame cannot be generated from the decoding of left-view video, it is possible to output video for both eyes. Thus, not only can flickering of the video be prevented, but also unnatural playback in which the video and subtitles do not align due to forcibly displaying the subtitles can be prevented.

Furthermore, playback whereby Embodiments 1 and 6 are combined is also possible. That is, when using the method in Embodiment 6 would permit continual 3D output even during trickplay, then it is possible to switch to the method in Embodiment 6 during trickplay and use the method in Embodiment 1 to play back the content during normal playback.

(Embodiment 7)

In the previous embodiments, no special mention was made of transmission between the display apparatus 400 and the playback apparatus. Such transmission is discussed in the present embodiment.

Data transmission between the playback apparatus and the display apparatus via HDMI is explained below.

The HDMI transmitting/receiving unit 17 transmits one line worth of uncompressed/plaintext pixel data in the picture data wherein layers have been compressed to the display apparatus at a high transmission rate, in accordance with the horizontal synchronization period in the display apparatus. On the other hand, the HDMI transmitting/receiving unit 17 transmits uncompressed/plaintext audio data to other apparatuses (not only the display apparatus, but also an amp, speakers, etc.) connected to the playback apparatus during the horizontal synchronization period and vertical blanking period in the display apparatus. By doing so, the devices connected to the playback apparatus via HDMI, such as the display apparatus, amp, speakers, etc., can receive uncompressed/plaintext picture data and uncompressed/plaintext audio data and can perform video and audio output. Since HDMI is for transmitting uncompressed/plaintext picture data and audio data, when a device is connected via HDMI, a strict determination is made as to whether the device is suitable for connection or not. During connection via HDMI, mutual authentication between the connected playback apparatus and display apparatus is performed. This mutual authentication is fundamentally performed when the frequency is changed. Therefore, when the above-mentioned mode is changed, mutual authentication between the playback apparatus and display apparatus is performed.

The following is an explanation of how mutual authentication is performed between the playback apparatus 200 and the display apparatus 400.

Figure 24:
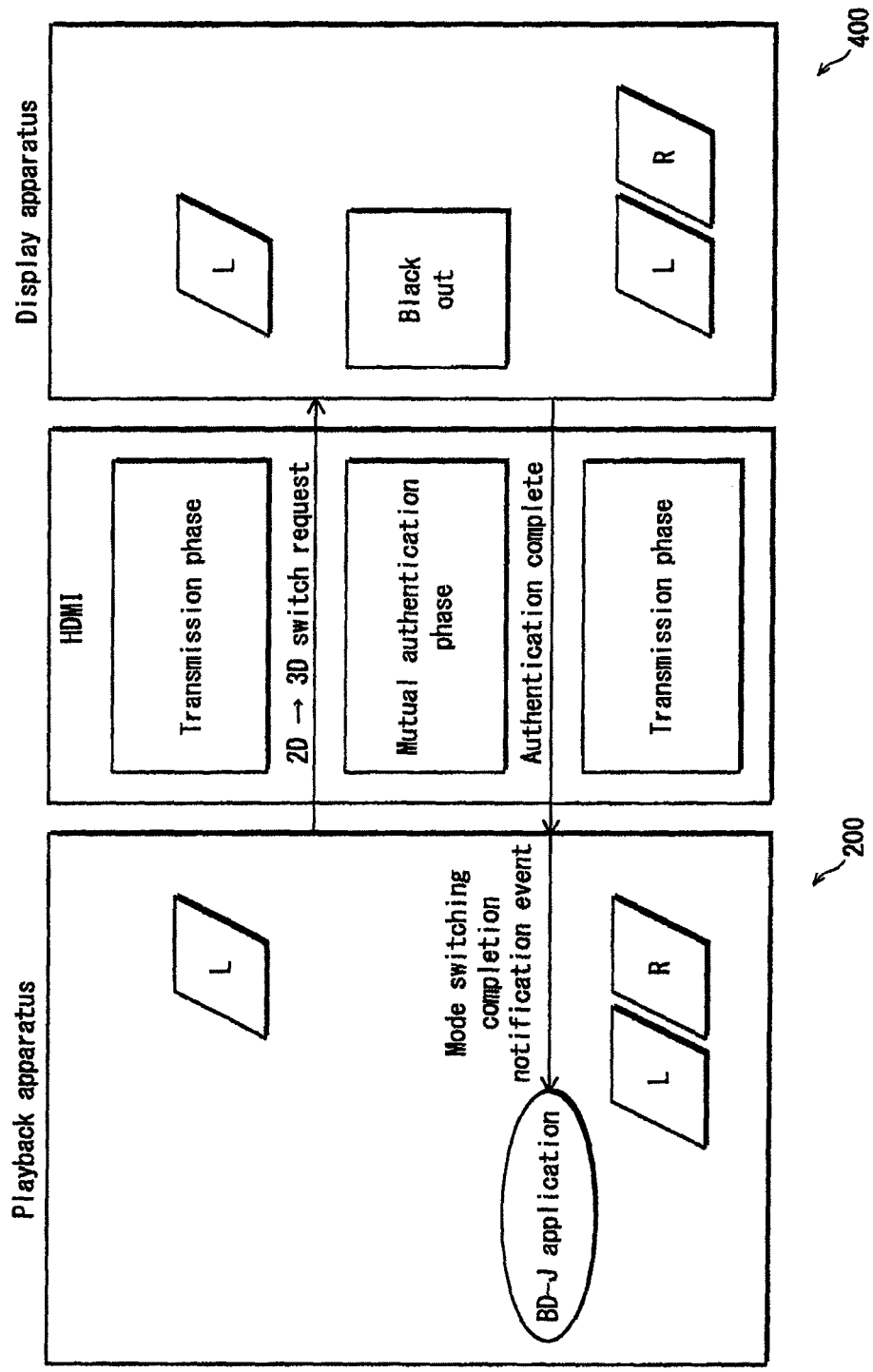
FIG. 24 shows the communication sequence between the playback apparatus 200 and a display apparatus 400.

FIG. 24 shows the communication sequence between the playback apparatus 200 and the display apparatus 400. The time axis in this figure is the vertical axis. The HDMI has three phases: a transmission phase, a mutual authentication phase, and a transmission phase.

Switching from a transmission phase to a mutual authentication phase is triggered by a 2D→3D switch request (or a 3D→2D switch request), whereas switching from a mutual authentication phase to a transmission phase is triggered by completion of authentication. That is, if a switch request is made when the playback apparatus decodes an L image and the display apparatus 400 displays output of the L image, mutual authentication begins. During authentication, the display apparatus 400 blacks out. In the authentication completion phase, an event is output to the BD-J application. Then the playback apparatus decodes the L image and R image, and the display apparatus 400 displays output of the L image and R image.

The above mutual authentication is performed when the HDMI interface attempts to switch the mode. An explanation is provided below for mode switching by the HDMI interface.

Figure 25:
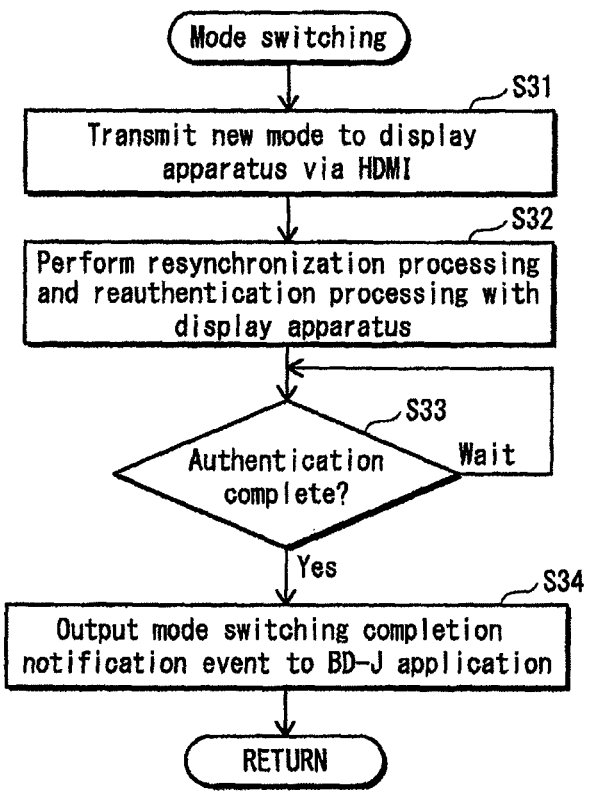
FIG. 25 is a flowchart showing the procedures for mode switching in the HDMI interface.

FIG. 25 is a flowchart showing the procedures for mode switching in the HDMI interface.

Through the HDMI, a new mode is output to the display apparatus 400 (step S31), and resynchronization processing and reauthentication processing are performed (step S32). The playback apparatus waits for authentication completion (step S33) and, after authentication is complete, outputs an event to the BD-J application (step S34).

Since content display by the display apparatus 400 is blacked out upon mutual authentication, it is necessary to take steps so that mode switching in the display apparatus 400 does not occur.

Since this mode switching is caused by a change in the frequency, in the present embodiment, two modes that do not invite switching of the frequency in the display apparatus 400 are adopted.

Among the left-view video streams and right-view video streams explained heretofore, a video stream for which independent playback is possible is called a base-view video stream. Conversely, a video stream composed of video frames that are compression encoded based on the correlation with each video frame constituting a base-view video stream is called a dependent-view video stream.

Additionally, in a ⅟48 second display cycle of video frames in the dependent-view stream, a mode in which frames are output alternately, i.e. output as "B"-"D"-"B"-"D," is called "B-D presentation mode."

"B-B presentation mode" refers to a playback type wherein a video frame in the base-view video stream and a video frame in the dependent-view video stream are not output alternately, but rather the playback mode is maintained in 3D mode, and processing is performed so that the same video frame is output to the left and right video plane (e.g. the areas labeled (L) and (R) respectively in the video plane 6 shown in FIGS. 8 and 22) repeatedly two times or more, and the video frames written on the video plane are used for playback. In B-B presentation mode, only the video frame in the base-view video stream, which can be played back independently, is repeatedly output, i.e. frames are output as "B"-"B"-"B"-"B."

Figure 26:
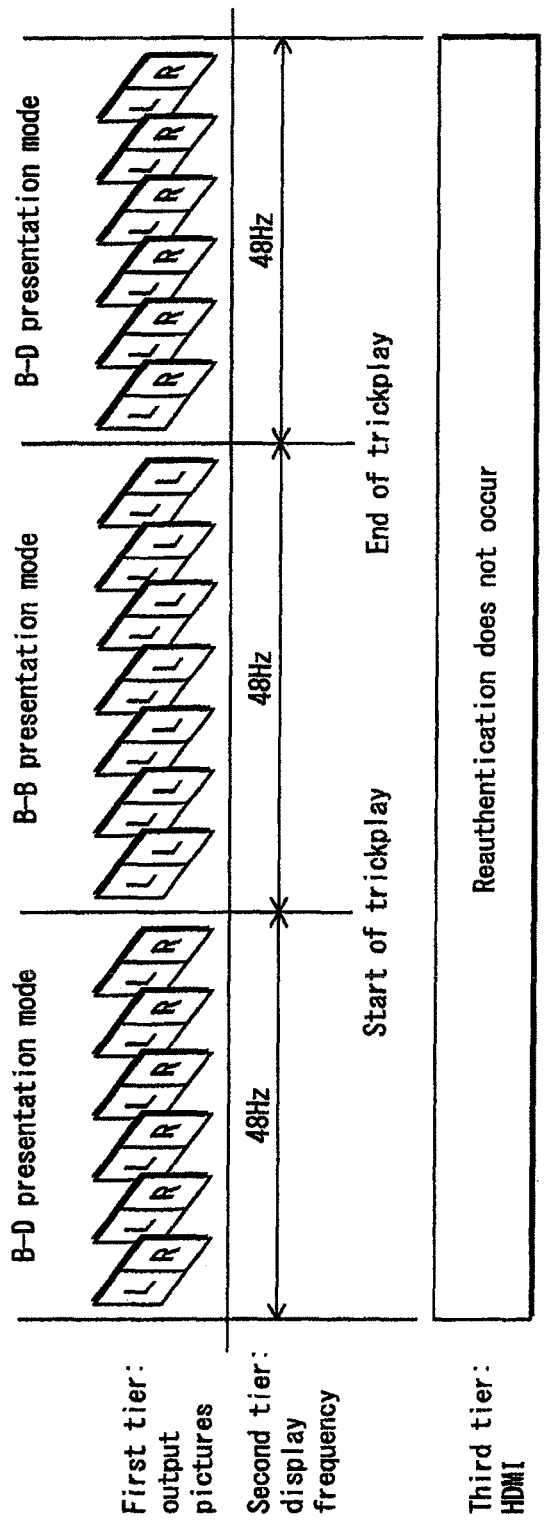
FIG. 26 shows how the output pictures, display frequency, and HDMI change when the display mode transitions as follows: B-D presentation mode, B-B presentation mode, B-D presentation mode.

FIG. 26 shows how the output pictures, display frequency, and HDMI change when the display mode transitions from B-D presentation mode to B-B presentation mode, then back to B-D presentation mode. The first tier shows the pictures output to the display apparatus 400, and the second tier shows the display frequency. This frequency is the frequency when left-view and right-view video frames are shown at the film material frequency, and has a value of 48 frames/second (2×24 frames/second). The third tier shows the HDMI state.

The transition from B-D presentation mode to B-B presentation mode occurs when an instruction to begin trickplay is given, and the transition from B-B presentation mode to B-D presentation mode occurs when trickplay ends. Thus, even when transitions between B-B presentation mode and B-D presentation mode occur, as shown in the second tier, the display frequency is maintained at 48 Hz, and as shown in the third tier, reauthentication does not occur in the HDMI.

FIG. 27 shows how the decode contents in the playback apparatus and the display contents in the display apparatus 400 change when switching from regular playback to fast forward and vice-versa. The time axis in this figure is the vertical axis and comprises three phases: a regular playback phase, a trickplay phase, and a regular playback phase.

In regular playback phase, the playback apparatus is in B-D presentation mode, and it decodes and outputs an L image and an R image. The display apparatus 400 alternately outputs an L image and an R image.

In trickplay phase, the playback apparatus is in B-B presentation mode. Assuming the left-view video stream is the base-view video stream, the playback apparatus decodes and outputs an L image and an L image. The display apparatus 400 alternately outputs an L image and an L image.

In regular playback phase, the playback apparatus is in B-D presentation mode, and it decodes and outputs an L image and an R image. The display apparatus 400 alternately outputs an L image and an R image.

Even when switching between these three display modes, no reauthentication occurs in the HDMI.

(Embodiment 8)

In the previous embodiments, trickplay was referred to without focusing on concrete processing. In the present embodiment, explanation is provided focusing on variable speed playback.

First, an explanation is provided for the MPEG4-AVC format, the foundation for an MVC video stream. A video stream in MPEG4-AVC format is composed of I pictures, B pictures, and P pictures. This is the same as a video stream in MPEG2 format.

There are two types of I pictures: IDR pictures, and non-IDR I pictures. Non-IDR I pictures, P pictures, and B pictures are compression encoded based on correlation with other pictures. B pictures are pictures formed from slice data in bi-directionally predictive (B) format, and P pictures are pictures formed from slice data in predictive (P) format. B pictures include reference B pictures and non-reference B pictures. An IDR picture and the B picture and P picture that follow this IDR picture form one closed-GOP. Conversely, a non-IDR picture and the B picture and P picture that follow this non-IDR picture form one open-GOP.

In terms of encoding order, an IDR picture is placed at the top of a closed-GOP. In terms of display order, the IDR picture is not at the top, but the pictures other than the IDR picture (the B picture and P picture) cannot depend on pictures existing in a GOP previous to a closed-GOP. In this way, a closed-GOP has the role of cutting off dependence.

The difference between encoding order and display order lies in how the order of an IDR picture, non-IDR I picture, and P picture are switched. In the display order, a B picture exists before a non-IDR I picture. The B picture before a non-IDR I picture depends on the previous GOP. Conversely, the pictures after a non-IDR I picture cannot depend on the previous GOP. In this way, an open-GOP can be dependent on a previous picture.

The relationship between (i) I pictures, P pictures, and B pictures and (ii) access units is that one access unit equals one picture. An audio stream is also composed of a plurality of audio frames, and similarly the relationship between these audio frames and access units is that one audio frame equals one access unit. Also, in the BD-ROM, one PES packet is limited to one frame. That is, if a video consists of frames, one PES packet equals one picture, whereas if the video consists of fields, one PES packet equals two pictures. Based on these relationships, PES packets store pictures and audio frames in a one-to-one proportion.

This concludes the GOP structure in MPEG4-AVC. It is possible to adjust the playback rate during variable speed playback via intermittent playback that selects, in this sort of GOP structure, which I pictures, B pictures, and P pictures in the GOP to play back, and which closed-GOPs and open-GOPs to play back from among the plurality of closed-GOPs and open-GOPs comprising the video stream. Additionally, during variable speed playback in 3D mode, the access burden is alleviated by only reading, from among the base-view video stream and the dependent-view video stream, the picture data constituting the base-view video stream on the BD-ROM and performing playback in B-B presentation mode.

FIGS. 28A, 28B, 28C, and 28D show an example of variable speed playback that adjusts speed depending on (i) which pictures in a GOP, i.e. an I picture, B picture, and P picture, are selected for playback and (ii) which of a plurality of closed-GOPs and open-GOPs constituting a video stream are selected for playback.

FIG. 28A shows normal playback that plays back picture data included in a plurality of GOPs in a base-view video stream and a plurality of GOPs in a dependent-view stream in order. FIG. 28B shows IP reading in which the B pictures in GOPs existing in a base-view video stream are skipped, while the I pictures and P pictures are read in order. In FIG. 28B, although the mode is 3D mode, it is clear that the dependent-view stream is not accessed.

FIG. 28C shows I reading in which the B pictures and P pictures in GOPs are skipped, while the I pictures are read in order. In FIG. 28C, although the mode is 3D mode, it is clear that the dependent-view stream is not accessed.

FIG. 28D shows skip reading in which a plurality of GOPs are skipped. In FIG. 28D, among I pictures included in a plurality of GOPs, an I picture in a GOP is played back, after which the reading position skips as shown by the arrow in the figure. The I picture several GOPs later is then played back. In FIG. 28D, although the mode is 3D mode, it is clear that the dependent-view stream is not accessed.

If IP reading as in FIG. 28B is performed, the playback apparatus plays back video at roughly 2× speed, and if IP reading as in FIG. 28C is performed, the playback apparatus plays back video at roughly 4× speed. Furthermore, if playback as in FIG. 28D is performed, the playback becomes 10× speed or faster. To reduce the access burden in 3D mode, only the GOPs in the left-view video stream, i.e. the base-view video stream, are accessed, and only the I pictures in this left-view video stream are played back in B-B presentation mode.

In the above-described way, the playback speed of a movie section is increased and decreased by adjusting the number of pieces of picture data that are to be skipped in accordance with the speed received from the remote control. This concludes the explanation of variable speed playback. Next, details are provided regarding the video decoder.

Figure 29:
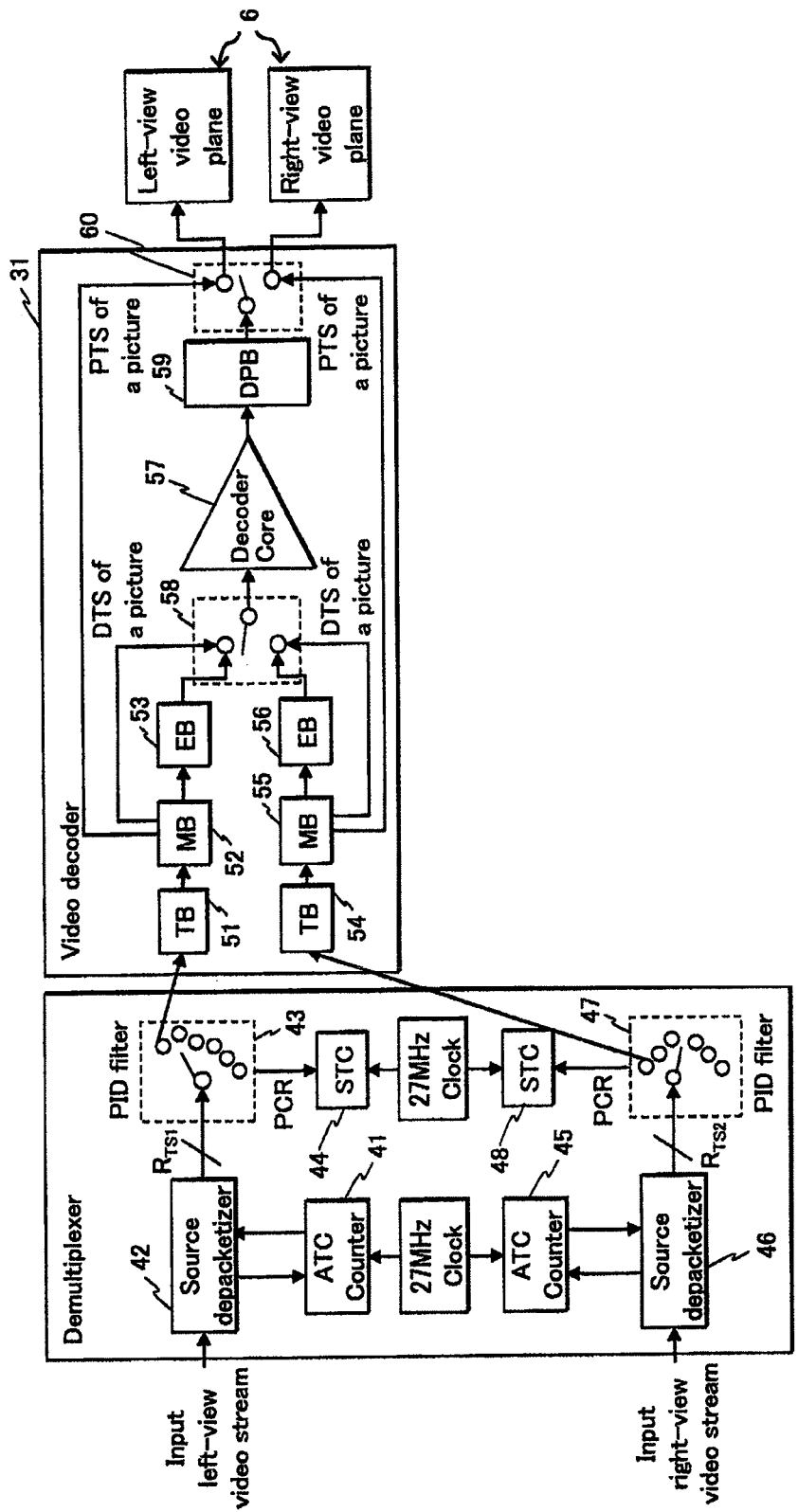
FIG. 29 shows the inner structure of a multiplexer and a video decoder.

FIG. 29 shows the inner structure of a multiplexer and a video decoder. As shown in FIG. 29, the demultiplexer 4 consists of an ATC counter 41, source depacketizer 42, PID filter 43, STC counter 44, ATC counter 45, source depacketizer 46, and PID filter 47.

The ATC counter 41 generates an Arrival Time Clock (ATC) and adjusts the timing of operations in the playback apparatus.

When source packets accumulate in the read buffer 2a, the source depacketizer 42 transmits only the TS packet to the PID filter, in accordance with the system rate of the AV clip, at the moment when the value of the ATC generated by the ATC counter and the ATS value of the source packet are identical. For this transmission, the input time to the decoder is adjusted according to the ATS in each source packet.

From among the TS packets output by the source depacketizer 22, the PID filter 43 sends TS packets whose PID matches the PID required for playback to each decoder in accordance with the PID.

The STC counter 44 generates a System Time Clock (STC) and adjusts the timing of each operation by the decoder.

The ATC counter 45 generates an Arrival Time Clock (ATC) and adjusts the timing of operations in the playback apparatus.

When source packets accumulate in the read buffer 2b, the source depacketizer 46 transmits only the TS packet to the PID filter, in accordance with the system rate of the AV clip, at the moment when the value of the ATC generated by the ATC counter and the ATS value of the source packet are identical. For this transmission, the input time to the decoder is adjusted according to the ATS in each source packet.

From among the TS packets output by the source depacketizer 26, the PID filter 47 sends TS packets whose PID matches the PID listed in the stream selection table for the current PlayItem to each decoder in accordance with the PID.

The video decoder 5 consists of a TB 51, MB 52, EB 53, TB 54, MB 55, EB 56, decoder core 57, buffer switch 58, DPB 59, and picture switch 60.

The Transport Buffer (TB) 51 is a buffer in which TS packets are temporarily accumulated as is when TS packets including a left-view video stream are output from the PID filter 43.

The multiplexed buffer (MB) 52 is a buffer in which PES packets are temporarily accumulated during output of a video stream from the TB to the EB. When data is transferred from the TB to the MB, TS headers are removed from the TS packets.

The elementary buffer (EB) 53 is a buffer in which encoded video access units are stored. When data is transferred from the MB to the EB, the PES headers are removed.

The transport buffer (TB) 54 is a buffer in which TS packets are temporarily accumulated as is when TS packets including a right-view video stream are output from the PID filter 47.

The multiplexed buffer (MB) 55 is a buffer in which PES packets are temporarily accumulated during output of a video stream from the TB to the EB. When data is transferred from the TB to the MB, TS headers are removed from the TS packets.

The elementary buffer (EB) 56 is a buffer in which encoded video access units are stored. When data is transferred from the MB to the EB, the PES headers are removed.

The decoder core 57 creates frame/field images by decoding each video access unit in the video elementary stream at a predetermined decoding time stamp (DTS). The compression encoding methods for the video stream multiplexed in an AV clip include MPEG2, MPEG4-AVC, VC1, etc. Therefore, the decoding method in the decoder core 57 switches in accordance with a stream's attributes. When decoding picture data constituting a base-view video stream, the decoder core 57 uses past or future picture data as reference pictures to perform movement compensation. When decoding picture data constituting a dependent-view video stream, the decoder core 57 uses pictures constituting the base-view video stream as reference pictures to perform movement compensation. After picture data is decoded in this way, the decoder core 57 transmits the decoded frame/field images to the DPB 59 and transmits the frame/field image corresponding to the timing of the presentation time stamp (PTS) to the picture switch.

The buffer switch 58 uses the decode switch acquired when the decoder core 57 decodes a video access unit to decide whether to extract the next access unit from the EB 53 or the EB 56. The buffer switch then transmits a picture accumulated in the EB 53 or the EB 56 to the decoder core 57 at the timing of the DTS allocated to the video access unit. The DTSs for the left-view video stream and the right-view video stream are set to occur alternately along the time axis in units of pictures. Therefore, if for example a video access unit is decoded in advance, ignoring the DTS, then it is preferable the video access unit be transmitted to the decoder core 57 in units of pictures.

The decoded picture buffer (DPB) 59 is a buffer for temporarily storing a decoded frame/field image. This buffer is used to refer to an already decoded picture when the decoder core 57 decodes a video access unit a P picture or B picture encoded by inter-picture predictive encoding.

When a decoded frame/field image transmitted from the decoder core 57 is written on the video plane, the picture switch 60 switches the plane that is written on between the left-view video plane and the right-view video plane. For the left-view stream, uncompressed picture data is written instantly on the left-view video plane, whereas for the right-view stream, uncompressed picture data is written instantly on the right-view video plane.

This concludes the explanation of the video decoder. Next, details are provided on how variable speed playback is performed.

During playback of a movie section, a video decoder with the above-described internal structure performs variable speed playback by reading while skipping picture data.

In the present embodiment, turning off of the subtitles/GUI and video and 2D/3D display determination processing are performed in accordance with the playback speed. For example, at a playback speed in which playback of the video, audio, and subtitles equivalent to 1× playback speed is possible (e.g. quick view requiring 1.3× playback speed, frame forward, or frame reverse), 3D display of the subtitles/GUI and video is maintained in the same way as regular playback in step S1401.

When 3D display of video can be maintained by simply not decoding the subtitles, 3D display of the video only is maintained. For playback speeds at which combination of video and subtitles is possible when the video is 2D, only the left-view or right-view video data is decoded, and the subtitles are decoded and then combined with the left-view or right-view video image without being shifted by the plane shift engine 20. In this way, video and subtitles are displayed in 2D. In even faster playback, when display is not even possible in 2D, neither the video nor the subtitles are displayed.

Figure 30:
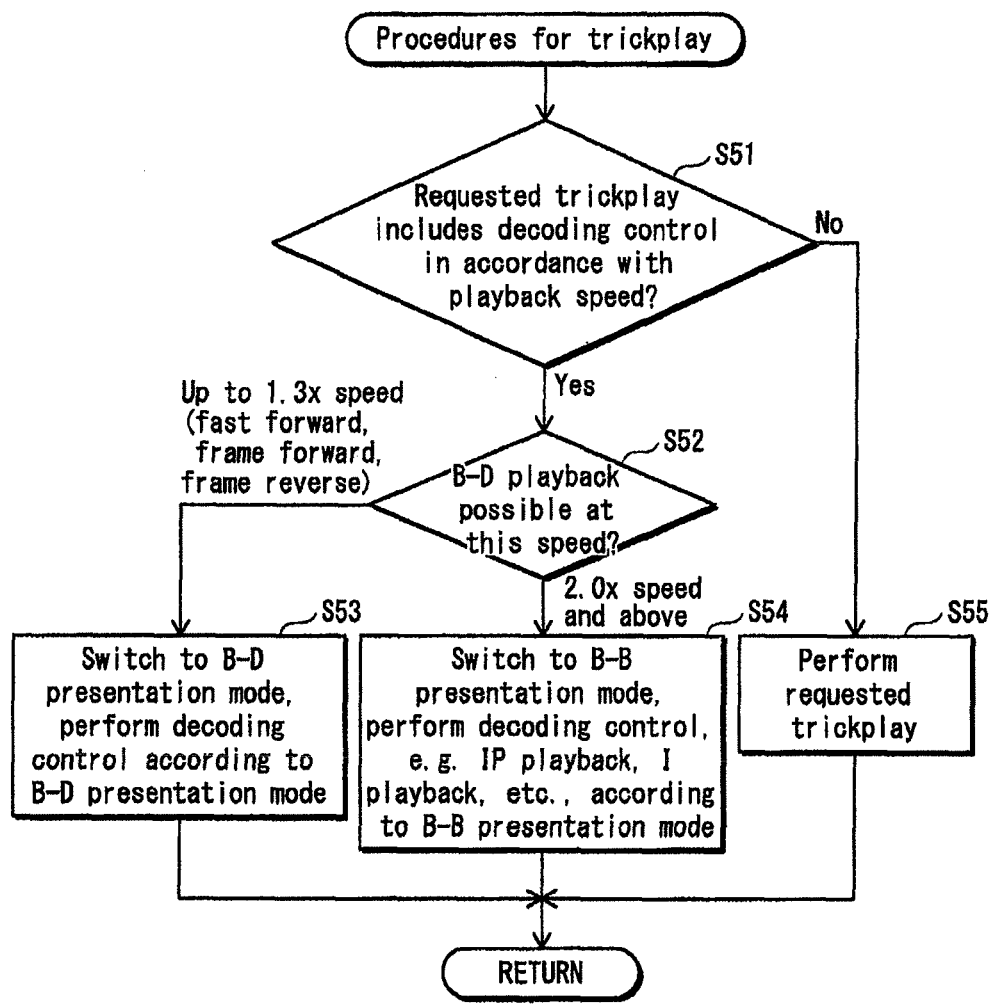
FIG. 30 is a flowchart showing procedures for trickplay that takes variable speed playback into account.

This sort of playback processing during trickplay can be achieved using the flowchart in FIG. 30.

FIG. 30 is a flowchart showing procedures for trickplay that takes variable speed playback into account. In this flowchart, steps S53, S54, and S55 are performed selectively in accordance with the determination results from steps S51 and S52. Step S51 is a determination as to whether or not the requested trickplay includes decoding control in accordance with the playback speed. Step S52 is a determination as to whether or not playback in B-D presentation mode is possible at the indicated speed.

For a speed up to 1.3×, processing proceeds to step S53, the mode switches to B-D presentation mode, and decoding control according to B-D presentation mode is performed. For speeds of 2× or faster, in step S54, the mode switches to B-B presentation mode, and decoding control according to B-B presentation mode such as IP playback, I playback, etc. is performed. When decoding control in accordance with the playback speed is not included, the requested trickplay is performed (step S55).

Step S52 is structured so that, for a playback speed of up to 1.3×, step S53 is executed, and for a playback speed of 2× or faster, step S54 is executed. No consideration is given to a playback speed that is faster than 1.3× and slower than 2×. This is because the playback apparatus is assumed not to have the capability of performing variable speed playback at a playback speed faster than 1.3× and slower than 2×. If, however, the playback apparatus were provided with the capability of performing trickplay at a playback speed faster than 1.3× and slower than 2× in addition to performing trickplay at a playback speed of 2× or faster, then for example step S52 could be changed to make step S54 be performed at a playback speed of 1.3× or faster.

(Embodiment 9)

In the previous embodiments, processing to return from 2D mode to 3D mode during a request for trickplay was a general rule. The present embodiment, however, proposes masking a request for trickplay by user operation of the remote control 300 with a PlayItem in the PlayList.

A UO mask table in the PlayItem is composed of the following flags.

chapter_search_mask flag

The chapter_search_mask flag is a flag to regulate whether or not to mask a playback control request from a user for a chapter search. In the present embodiment, a chapter search is playback control that receives a number input from a user and starts playback at the chapter indicated by the number.

time_search_mask flag

The time_search mask flag is a flag to regulate whether or not to mask a playback control request from a user for a time search. In the present embodiment, a time search is playback control that receives a playback time input from a user and starts playback at the indicated playback time.

skip_next_mask flag, skip_back_mask flag

The skip_next_mask flag and skip_back_mask flag are flags indicating whether or not to mask a request from a user to skip next or skip back.

play_mask flag

The play_mask flag is a flag indicating whether or not to mask a playback control request from a user to start playback.

stop_mask flag

The stop_mask flag is a flag indicating whether or not to mask a playback control request from a user to stop playback.

pause_on_mask flag

The pause_on_mask flag is a flag indicating whether or not to mask a playback control request from a user to pause playback.

pause_off_maskpause_flag

The pause_off_mask flag is a flag indicating whether or not to mask a playback control request from a user to unpause playback.

still_off_mask flag

The still_off_mask flag is a flag indicating whether or not to mask a playback control request from a user to turn still image mode off.

forward_play_mask flag, backward_play_mask flag

The forward_play_mask flag and backward_play_mask flag are flags indicating whether or not to mask a playback control request from a user to fast forward or rewind.

resume_mask flag

The resume_mask flag is a flag indicating whether or not to mask a playback control request from a user to resume playback.

audio_change_mask flag

The audio_change_mask flag is a flag indicating whether or not to mask a playback control request from a user to switch the audio.

PG_textST_change_mask flag

The PG_textST_change_mask flag is a flag indicating whether or not to mask a request from a user to switch between subtitles rendered by graphics (Presentation Graphics) and subtitles rendered by text.

angle_change_mask flag

The angle_change_mask flag is a flag indicating whether or not to mask a playback control request from a user to change the angle.

popup_on_mask flag

The popup_on_mask flag is a flag indicating whether or not to mask a playback control request from a user to call a popup menu.

popup_off_mask flag

The popup_off_mask flag is a flag indicating whether or not to mask a playback control request from a user to turn off display of a popup menu.

select_menu_language_mask flag

The select_menu_language_mask flag is a flag indicating whether or not to mask a playback control request from a user to select the language of the menus.

Note that only user operations are masked via the UO mask table; instructions for trickplay from a BD-J application or a movie object are not masked.

This concludes the explanation of the UO mask table. Video frame processing that uses this UO mask table is shown in FIG. 31.

Figure 31:
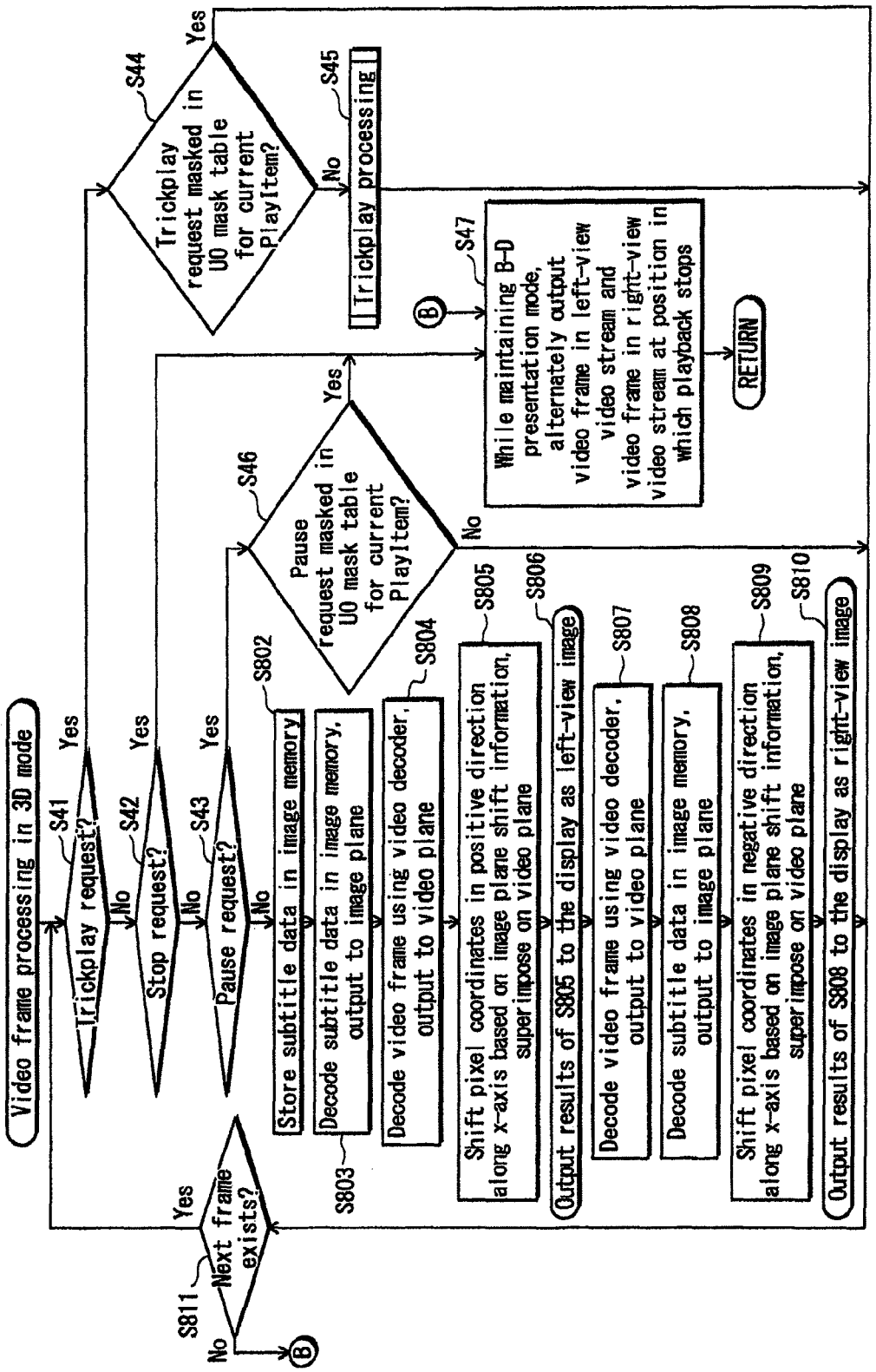
FIG. 31 is a flowchart showing procedures for video frame processing in 3D mode.

FIG. 31 is a flowchart showing procedures for video frame processing in 3D mode: The flow is a loop that repeats the processing in steps S41-S43, steps S802-S810, and step S811. The termination condition for the loop is a determination in step S811 that no next video frame exists.

Step S41 is a determination as to whether a user has requested trickplay. Steps 42 and 43 are, respectively, determinations as to whether a request to stop or pause playback was made.

Step S44 is a determination as to whether the trickplay request is masked in the UO mask table. If the request is not masked, trickplay is performed in step S45.

Step S42 is a determination as to whether a request to stop playback was made. If so, then in step S47, B-D presentation mode is maintained, the video frame in the left-view video stream and the video frame in the right-view video stream at the position in which playback stops are output alternately, and processing returns.

Step S43 is a determination as to whether a request to pause playback was made. If so, then step S46 determines whether the trickplay request is masked in the UO mask table in the current PlayItem. If the request is masked, then in step S47, the video frame in the left-view video stream and the video frame in the right-view video stream at the position in which playback stops are output alternately, and processing returns.

(Embodiment 10)

In the previous embodiments, the structure of contents necessary for 3D display of graphics, subtitles, and video, as well as the playback method thereof, were described. From here on, description will be provided for a playback method for contents when the playback condition of the video changes. Trickplay at a playback speed other than 1×, such as fast forward, rewind, skip, etc., as well as when the video is paused, played back as slides, or stopped are provided as examples of playback conditions of a video.

The following presents a problem with playback processing during trickplay. When video is played back in trickplay under the playback method for 3D contents explained for the figures, not only does decoding of the video frames become delayed, disrupting the video, but also decoding of the subtitle data, which is matched with the video frame, also becomes delayed, making the contents provided to the viewer unpleasant.

The following presents a problem with playback processing for pausing playback, showing slides, and stopping playback.

Additionally, when the video is paused, shown as slides, or stopped, and the last frame when the video stops is displayed, changing from 3D display to 2D display makes the eyes unable to adjust to the unnatural stereoscopic gap with the subtitles/GUI stream. The intended visual effect is lost, and as a result the video becomes less realistic, making for an unpleasant experience for viewers.

Figure 32:
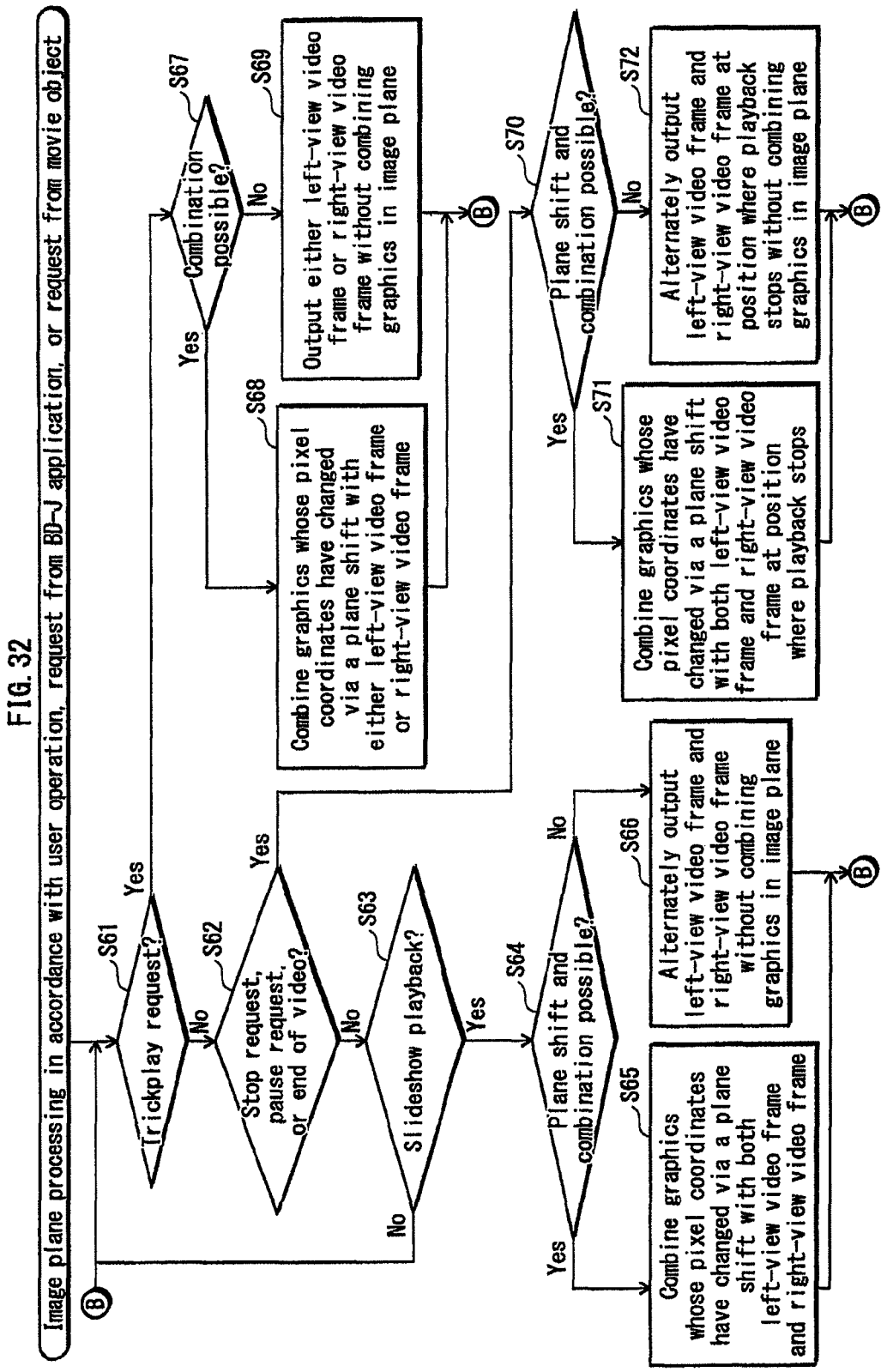
FIG. 32 is a flowchart showing procedures to process an image plane in accordance with user operation, a request from a BD-J application, or a request from a movie object.

FIG. 32 is a flowchart showing procedures to process an image plane in accordance with user operation, a request from a BD-J application, or a request from a movie object.

This flowchart is a loop repeating steps S61-S63. Step S61 determines whether the user initiated an instruction for trickplay, and step S62 determines whether a request was made to stop or pause playback and whether the video is at its end. Step S63 determines whether a slideshow is being played back.

As described above, the playback type of the PlayItem in a PlayList file indicates whether the stream file is played back as a slideshow. Therefore, when the current PlayItem switches to a PlayItem that indicates playback of a slideshow, then step S63 is determined to be "Yes."

If trickplay is requested, then step S67 determines whether combination with the image plane is possible. If so, graphics whose pixel coordinates have changed via a plane shift are combined with either the video frame in the left-view video stream or the video frame in the right-view video stream, and processing returns to the loop (step S68).

If combination is not possible, then in step S69 the graphics in the image plane are not combined, and either the video frame in the left-view video stream or the video frame in the right-view video stream is output.

If a request is made to stop or pause playback, or if the video is at its end, then step S70 determines whether plane shifting and combination is possible. If so, graphics whose pixel coordinates have changed via a plane shift are combined with both the video frame in the left-view video stream and the video frame in the right-view video stream at the position playback is stopped (step S71).

If plane shifting and combination is not possible, then in step S72 the graphics in the image plane are not combined, and the video frame in the left-view video stream and the video frame in the right-view video stream are output alternately.

(Embodiment 11)

The present embodiment is an improvement on the functions provided to a BD-J application.

In order to make a BD-J application not request trickplay, a function is added to cause the BD-J application to acquire the dimension identifying flag from the PlayList information.

The following is a description of acquisition of the display state and the register setting value by a BD-J application. A BD-J application is provided with functions to notify the contents of the display state when subtitles/GUI and video displayed in 3D are switched to 2D or turned off and to acquire the current display state. When doing so, the current display state can be recorded in the register set 12. With this improvement, it is possible for the contents themselves to exercise control to avoid an unnatural presentation, thereby diminishing an unpleasant sensation for viewers.

Next, explanation is provided for what kind of functions are provided to the BD-J application by the playback control engine. Processing to play back data output from the playback apparatus 200 to the display apparatus 400 is performed in accordance with requests issued by a BD-J application and is realized by commands from the BD-J platform 22 to the playback control engine. Detailed explanation is provided here regarding commands from the BD-J module 22 to the playback control engine 14 during processing to start playback.

Specifically, the playback control engine provides the BD-J application with the following three commands.

1. Playback Preparation Command

The playback preparation command is a command to suggest preparation. The playback preparation command is only a suggestion for preparation, and whether the playback control engine actually makes preparations based on a playback preparation command can be determined by acquiring a "playback preparation" property in the BD-J platform 22. When the "playback preparation" property is set to "yes," playback preparations are made upon a playback preparation command. The current PlayList is acquired, the playback mode of the current PlayList is determined, and the playback mode of the playback apparatus is determined. When the PlayList is 2D, the playback mode is switched. A playback request for the AV stream is issued via a synchronous start command.

When the "playback preparation" property is set to "no," playback preparations are not made upon a playback preparation command. Actually making preparations based on the playback preparation command has the positive effects of increasing independence from the BD-J module and making elaborate control possible. It may be impossible to provide for a playback preparation command due to the implementation of the player, however, and therefore this property has been established.

2. Synchronous Start Command

A synchronous start command is a command to synchronize the playback mode with the mode attribute of the AV stream. When the "playback preparation" property is set to "yes," the AV stream is 2D, and the playback mode is 3D, the playback mode is switched to 2D by a playback preparation command. When the "playback preparation" property is set to "no," the AV stream is 2D, and the playback mode is 3D, the playback mode is switched to 2D by a synchronous start command.

3. Playback Start Command

A playback start command is a consolidation of the two above-described commands and performs playback preparation and a synchronous start. Regardless of how the "playback preparation" property is set, the current PlayList is acquired, a playback request for the AV stream is issued, the playback mode of the current PlayList is determined, and the playback mode of the playback apparatus is determined. When the PlayList is 2D, the playback mode is switched. A playback request for the AV stream is subsequently issued.

(Embodiment 11)

The present embodiment describes a recording method for how to record a BD-ROM, the playback target for a playback apparatus, on a recording medium.

The recording method according to the present embodiment includes not only real-time recording, but also preformat recording. In real-time recording, the above-described files are created in real time and are written directly on the file system area of a recording device. In preformat recording, a complete image of the bit stream to be recorded in a file system area is created beforehand, a master disc is created based on the bit stream, and optical discs are mass produced by pressing the master disc. The recording method according to the present embodiment is specific to both a recording method via real time recording and a recording method via preformat recording.

Figure 33:
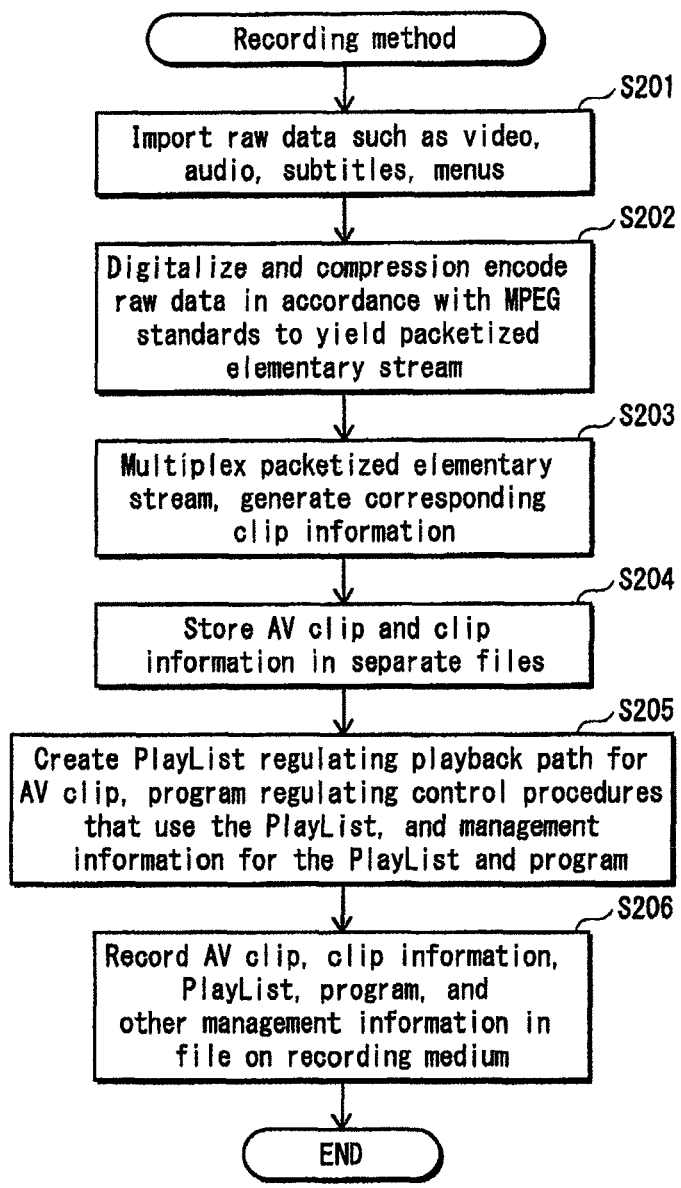
FIG. 33 is a flowchart showing procedures for a recording method.

FIG. 33 is a flowchart showing procedures for a recording method. In step S201, raw data such as video, audio, subtitles, and menus is imported. In step S202, the raw data is digitalized and compression encoded in accordance with MPEG standards to yield a packetized elementary stream. In step S203, the packetized elementary stream is multiplexed and corresponding clip information is generated. In step S204, the AV clip and the clip information are stored in separate files.

In step S205, the PlayList regulating the playback path for the AV clip, the program regulating control procedures that use the PlayList, and management information for the PlayList and program are created. In step S206, the AV clip, clip information, PlayList, program, and other management information is recorded on the recording medium.

(Embodiment 12)

The present embodiment explains what kind of hardware is used to construct the playback apparatus described in previous embodiments.

Figure 34:
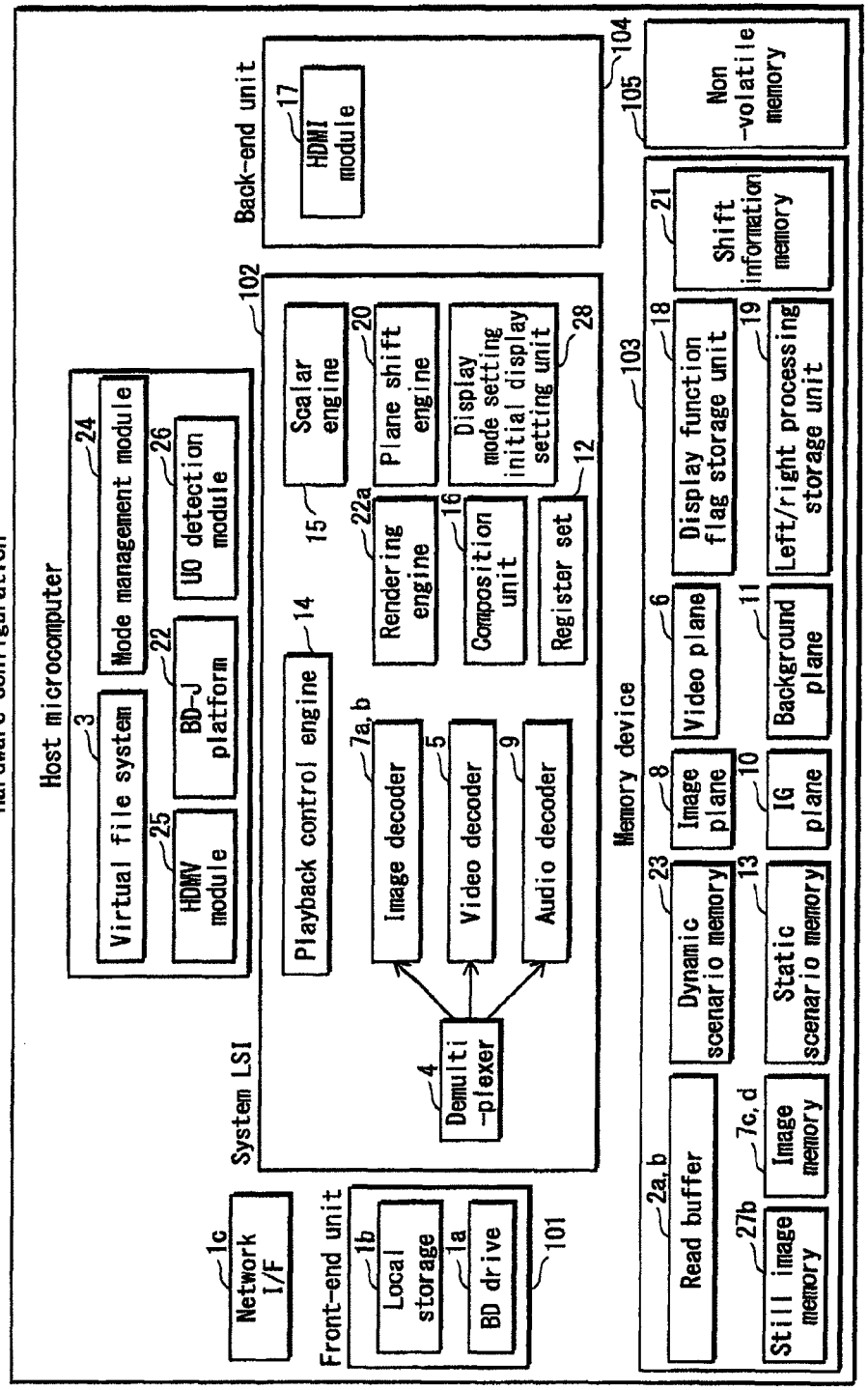
FIG. 34 shows the inner structure of the hardware in a playback apparatus.

FIG. 34 shows the inner structure of the hardware in a playback apparatus. In this figure, the main parts constituting the playback apparatus are a front-end unit 101, system LSI 102, memory device 103, back-end unit 104, non-volatile memory 105, host microcomputer 106, and network I/F 107.

The front-end unit 101 is the data input source. The front-end unit 101 includes, for example, the BD drive 1*a* and local storage 1*c* shown in FIG. 4.

The system LSI 102 consists of logic elements and forms the nucleus of the playback apparatus. At least the following structural components are embedded in the system LSI: a demultiplexer 4, video decoders 5*a* and 5*b*, image decoders 7*a* and 7*b*, audio decoder 9, register set 12, playback control engine 14, composition unit 16, and plane shift engine 20.

The memory device 103 is composed of an array of memory elements such as SDRAM. The memory device 107 includes, for example, read buffers 2*a* and 2*b*, dynamic scenario memory 23, static scenario memory 13, video plane 6, image plane 8, interactive graphics plane 10, and background plane 11.

The back-end unit 104 is a connection interface between the interior of the playback apparatus and other apparatuses and includes an HDMI transmitting/receiving unit 17.

The non-volatile memory 105 is a writeable recording medium that can preserve recorded content even when power is not supplied. It is used as a backup for the playback mode stored in the dimensional mode storage unit 29, which is described below. A flash memory, FeRAM, etc. can be used for such a non-volatile memory 105.

The host microcomputer 106 is a microcomputer system consisting of ROM, RAM, and a CPU. A program controlling the playback apparatus is stored on the ROM. The program in the ROM is read by the CPU, and by cooperating with the hardware resources, the program implements the functions of the virtual file system 3, the HDMV module 25, the BD-J platform 22, the mode management module 24, and the UO detection module 26.

The following is a description of a system LSI. A system LSI is a packaged, integrated circuit in which bare chips are mounted on a high-density substrate. System LSIs include configurations wherein a plurality of integrated circuits are each provided an external structure the same as a single LSI by mounting a plurality of bare chips on a high-density substrate and packaging the circuit. (This type of LSI is called a multi-chip module.)

Focusing on the package in a system LSI, it can be noted that there are two types: QFP (Quad Flat Package) and PGA (Pin Grid Array). QFP is a system LSI wherein pins are attached to the four sides of the package. PGA is a system LSI wherein many pins are attached over the entire bottom surface.

These pins serve as an interface with other circuits. Since the pins in a system LSI have this kind of interfacing role, connecting other circuits to these pins in the system LSI allows the system LSI to fulfill its role as the nucleus of the playback apparatus 200.

Such a system LSI can of course be embedded in the playback apparatus 200, and also in a variety of devices that handle video playback such as TVs, games, personal computers, one seg mobile phones, etc. The uses of the present invention can thus be widely expanded.

It is preferable that the architecture of the system LSI comply with UniPhier architecture.

A system LSI that complies with UniPhier architecture is composed of the following circuit blocks.

DPP (Data Parallel Processor)

This is an SIMD processor in which a plurality of component processors perform the same operation. By making the calculation unit internal to each component processor operate simultaneously with one command, decoding of a plurality of pixels constituting a picture is performed in parallel.

IPP (Instruction Parallel Processor)

The IPP is composed of a "Local Memory Controller" formed by a command RAM, command cache, data RAM, and data cache; a "Processing Unit" formed by an instruction fetch unit, decoder, execution unit, and register file; and a "Virtual Multi Processor Unit" that causes the Processing Unit to execute a plurality of applications in parallel.

MPU Block

The MPU block is composed of an ARM core, external bus interface (Bus Control Unit: BCU), DMA controller, timer, peripheral circuit such as a vector interrupt controller, UART, GPIO (General Purpose Input Output), and peripheral interface such as a synchronous serial interface.

Stream I/O Block

The stream I/O block performs data input/output with a drive device, hard disk drive device, and SD memory card drive device that are connected to external buses via a USB interface or ATA Packet interface.

AV I/O Block

The AV I/O block is composed of an audio input/output, video input/output, and OSD controller, and performs data input/output with a TV and AV amplifier.

Memory Control Block

The memory control block realizes reading and writing of an SD-RAM that is connected thereto via the external bus and is composed of an internal bus connection unit that controls an internal connection between each block, an access control unit that transfers data with the SD-RAM connected to the outside of the system LSI, and an access schedule unit that adjusts requests from the blocks for accessing the SD-RAM.

Details of a concrete production procedure are as follows. First, based on the structural diagrams shown for each embodiment, the circuit for the section forming the system LSI is created. Then, using the circuit elements, IC, and LSI, the structural components in the structural diagrams are implemented.

By implementing each structural component in this way, the buses that connect the circuit elements, IC, and LSI, the peripheral circuits for the buses, the external interface, etc. are regulated. Furthermore, the connection line, power line, ground line, clock signal line, etc. are also regulated. When performing such regulation, the circuit diagram is completed while making adjustments such as (i) adjusting the operation timing of each structural component taking the LSI specs into consideration and (ii) guaranteeing bandwidth necessary for each structural element.

When the circuit diagram is finished, the package is designed. Packaging design refers to the task of creating the substrate layout to determine where on the substrate to dispose the components (circuit elements, IC, LSI) in the circuit diagram created when designing the circuit, and to determine how to dispose the connection wires in the circuit diagram on the substrate.

After packaging design is carried out in this way and the layout on the substrate is finalized, the results of packaging design are converted into CAM data and output to a facility with an NC machine tool or the like. An NC machine tool performs a System on Chip (SoC) implementation and System in Package (SiP) implementation based on the CAM data. An SoC implementation is technology to burn a plurality of circuits on one chip. An SiP implementation is technology to form a plurality of chips as a package using resin or the like. A system LSI according to the present invention can be created through the above-described process based on the internal structure diagrams of the playback apparatus 200 shown in each embodiment.

Note that an integrated circuit generated in the above-described way may be called an IC, LSI, super LSI, or ultra LSI, according to differences in the degree of integration.

When implementing the system LSI using an FPGA, several logic elements are disposed in a grid pattern, and based on an input/output combination recorded in a Look Up Table (LUT), vertical and horizontal wires are connected to implement the hardware configuration shown in each embodiment. The LUT is stored in the SRAM, and the contents of such an SRAM are eliminated when the power is cut off. Therefore, when using such an FPGA, it is necessary to write in the SRAM, via a definition of configuration information, an LUT that implements the hardware configuration shown in each embodiment.

The present embodiment is implemented by hardware corresponding to middleware and the system LSI, hardware other than the system LSI, a part for the interface with the middleware, a part for the interface with the middleware and the system LSI, a part for the interface with required hardware other than the middleware and system LSI, and a part for the user interface. When the playback apparatus is constructed by embedding all of these elements, these elements operate in coordination to provide their particular functions.

By appropriately defining the interface for the middleware and the interface for the middleware and system LSI, it is possible to develop the user interface, middleware, and system LSI in the playback apparatus independently and in parallel, thereby making more efficient development possible. Note that these interfaces can be divided up in a variety of ways.

(Embodiment 13)

In the present embodiment, an explanation is provided for the principle of a stereoscopic view through plane shifting.

Figure 35A:
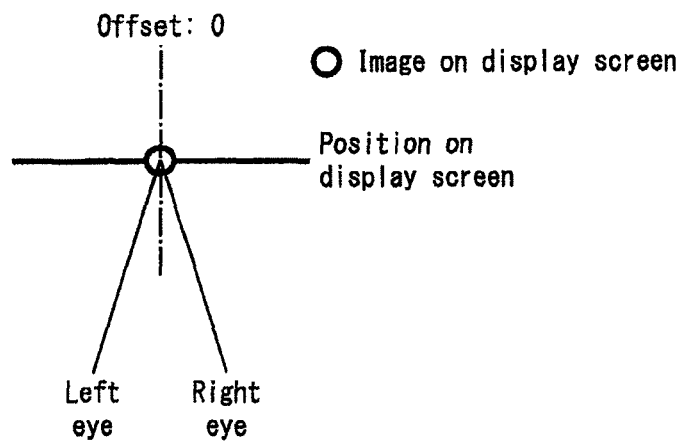
FIGS. 35A, 35B, and 35C are used to explain the principle whereby an image appears closer than the display screen when the plane offset code is positive (when a left-view graphics image is shifted to the right, and a right-view graphics image is shifted to the left).
Figure 35B:
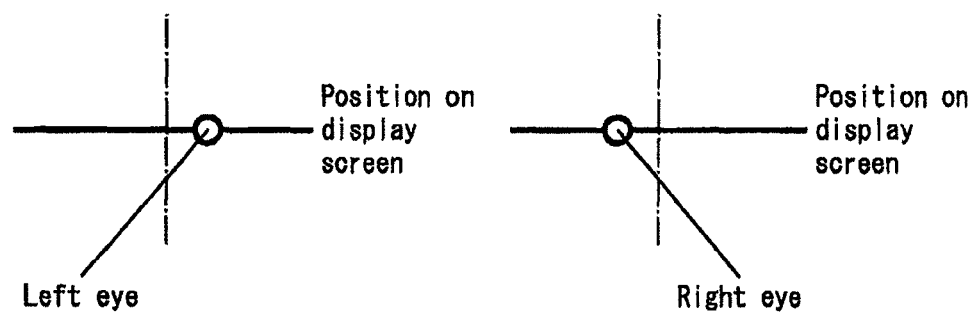
Figure 35C:
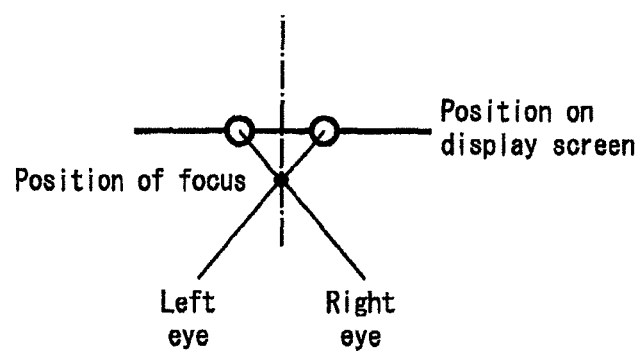

FIGS. 35A, 35B, and 35C are used to explain the principle whereby an image appears closer than the display screen when the plane offset code is positive (when a left-view graphics image is shifted to the right, and a right-view graphics image is shifted to the left).

In these figures, the circle indicates an image displayed on the display screen.

First, when there is no plane offset, the image seen by the right eye and the image seen by the left eye are in the same position. Therefore, when this image is viewed by both eyes, the position of focus is located on the display screen (FIG. 35A).

On the other hand, when stereo mode is off in 3D mode, the image seen by the left eye is seen at a position to the right of the position when the plane offset is zero. At this time, the liquid crystal shutter glasses prevent the right eye from seeing anything. Conversely, the image seen by the right eye is seen at a position to the left of the position when the plane offset is zero. At this time, the liquid crystal shutter glasses prevent the left eye from seeing anything (FIG. 35B).

People focus their vision using both eyes and perceive an image as being located at the position of focus. Accordingly, by alternately switching over a short time interval, via the liquid crystal shutter glasses, between states wherein an image is visible to the left eye and another image is visible to the right eye, a person's eyes focus on a position closer than the display screen, and as a result, the person perceives an image as being located at the position of focus, i.e. closer than the display screen (FIG. 35C).

Figure 36A:
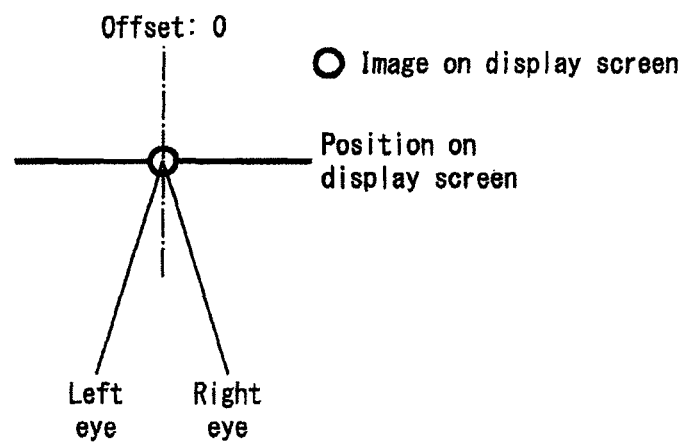
FIGS. 36A, 36B, and 36C are used to explain the principle whereby an image appears further back than the display screen when the plane offset code is negative (when a left-view graphics image is shifted to the left, and a right-view graphics image is shifted to the right).
Figure 36B:
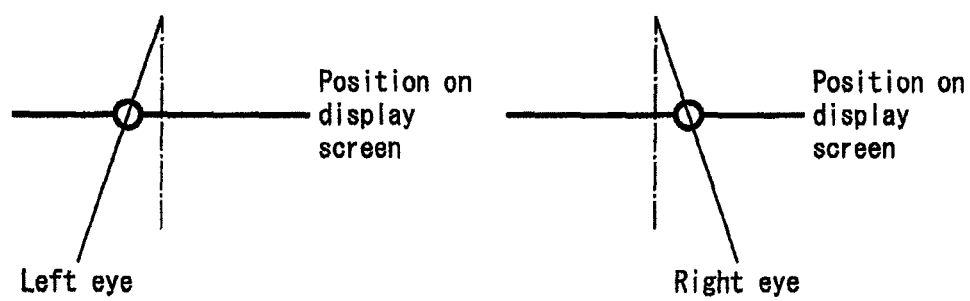
Figure 36C:
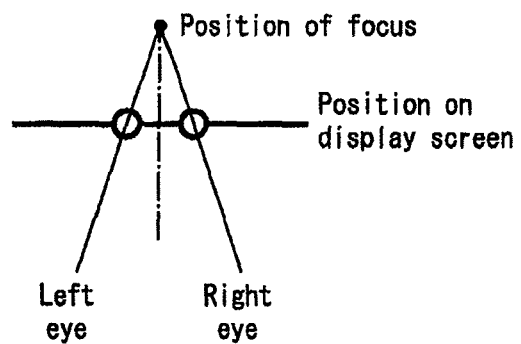

FIGS. 36A, 36B, and 36C are used to explain the principle whereby an image appears further back than the display screen when the plane offset code is negative (when a left-view graphics image is shifted to the left, and a right-view graphics image is shifted to the right).

In these figures, the circle indicates an image displayed on the display screen. First, when there is no plane offset, the image seen by the right eye and the image seen by the left eye are in the same position. Therefore, when this image is viewed by both eyes, the position of focus is located on the display screen (FIG. 36A).

On the other hand, when stereo mode is off in 3D mode, the image seen by the left eye is seen at a position to the left of the position when the plane offset is zero. At this time, the liquid crystal shutter glasses prevent the right eye from seeing anything. Conversely, the image seen by the right eye is seen at a position to the right of the position when the plane offset is zero. At this time, the liquid crystal shutter glasses prevent the left eye from seeing anything (FIG. 36B).

By alternately switching over a short time interval, via the liquid crystal shutter glasses, between states wherein an image is visible to the left eye and another image is visible to the right eye, a person's eyes focus on a position further back than the display screen, and as a result, the person perceives an image as being located at the position of focus, i.e. further back than the display screen (FIG. 36C).

The above explanation was provided for a graphics image written in the graphics plane, and it goes without saying that the same explanation holds when applying the above-described concept of offset to the interactive graphics plane, video plane, or background plane.

(Degree of Popping Out/Method of Producing Depth)

Figure 37A:
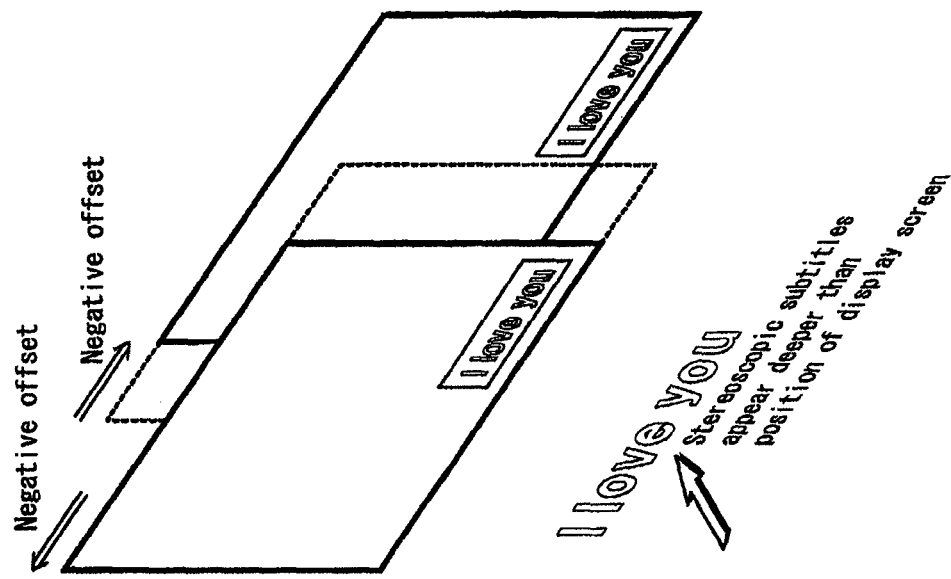
FIGS. 37A and 37B show how the amount that subtitles pop out changes according to the size of the plane offset.
Figure 37B:
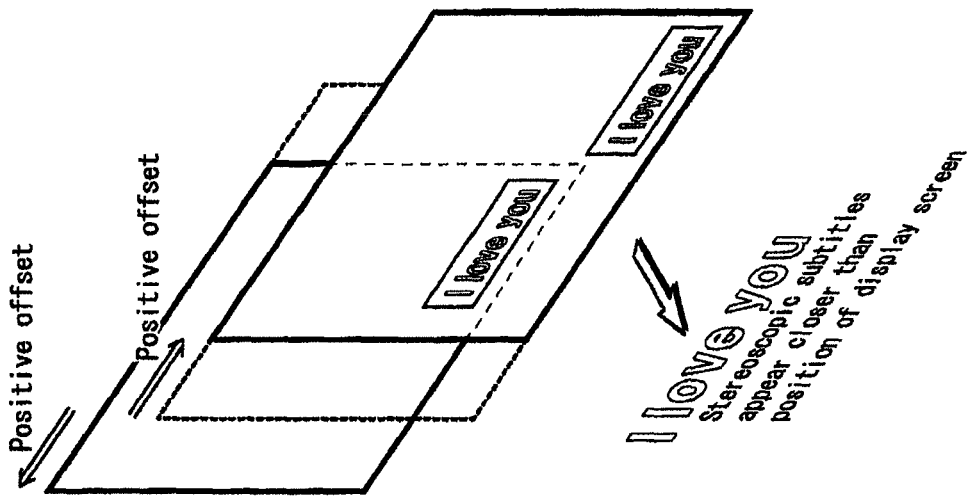

FIGS. 37A and 37B show how the amount that subtitles pop out changes according to the size of the plane offset.

In these figures, the closer image is a right-view graphics image output using a graphics plane shifted during right-view output. The image further back is a left-view graphics image output using a graphics plane shifted during left-view output.

FIG. 37A shows the case when the plane offset code is positive (when a left-view graphics image is shifted to the right, and a right-view graphics image is shifted to the left). When the plane offset is positive, the subtitles during left-view output appear to the right of the subtitles during right-view output, as shown in FIGS. 35A-35C. In other words, the point of convergence (position of focus) is closer than the screen, and thus the subtitles also appear closer.

FIG. 37B shows the case when the plane offset code is negative. When the plane offset is negative, the subtitles during left-view output appear to the left of the subtitles during right-view output, as shown in FIGS. 36A-36C. In other words, the point of convergence (position of focus) is further back than the screen, and thus the subtitles also appear further back.

This concludes the explanation of the principle of stereoscopic view. Next, an explanation is provided for when the above-described image coordinate shift is performed during 1 plane+Offset mode.

First, an explanation is provided for the inner structure of the image plane 8 and for the arrangement of pixel data before and after shifting.

Figure 38A:
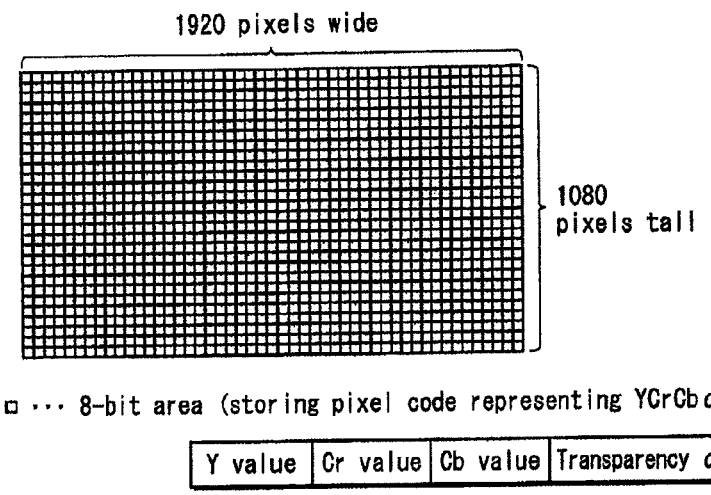
FIGS. 38A and 38B show the inner structure of an image plane 8.
Figure 38B:
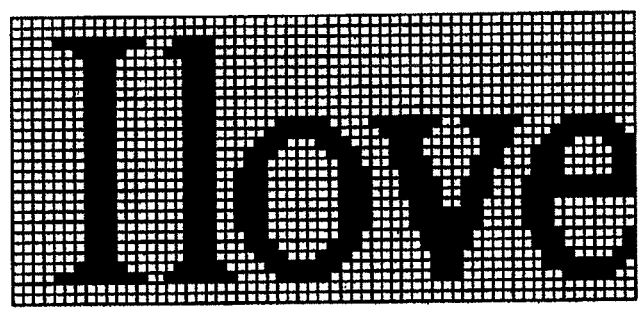

FIGS. 38A and 38B show the inner structure of the image plane 8. When the resolution is set to 1920×1080, the image plane 8 is composed of 1920×1080 8-bit long storage elements, as shown in FIG. 38A. This means that at 1920×1080 resolution, memory is allocated to store an 8-bit pixel code for each pixel. The 8-bit pixel code stored in the storage element is color converted, using a color lookup table, into Y, Cr, and Cb values. In this color lookup table, the correspondence between the pixel code and Y, Cr, and Cb values is defined by a palette definition segment within the subtitle data.

FIG. 38B shows pixel data stored in the image plane 8. As shown in this figure, the graphics data stored in the image plane 8 consists of pixel data corresponding to the foreground (the part constituting the subtitle "I love") and pixel data corresponding to the background. A pixel code indicating a transparent color is stored in the storage elements corresponding to the background, and when combined with the video plane, the video image in the video plane can be seen through this background part. On the other hand, pixel codes indicating colors other than a transparent color are stored in the storage elements corresponding to the foreground, and the subtitles are depicted by these Y, Cr, Cb, and a values for colors other than a transparent color. During plane combination by the composition unit 16, the contents of the background graphics plane and the video plane can be seen through the section corresponding to transparent pixels. The existence of such a transparent section makes plane combination possible.

Figure 39A:
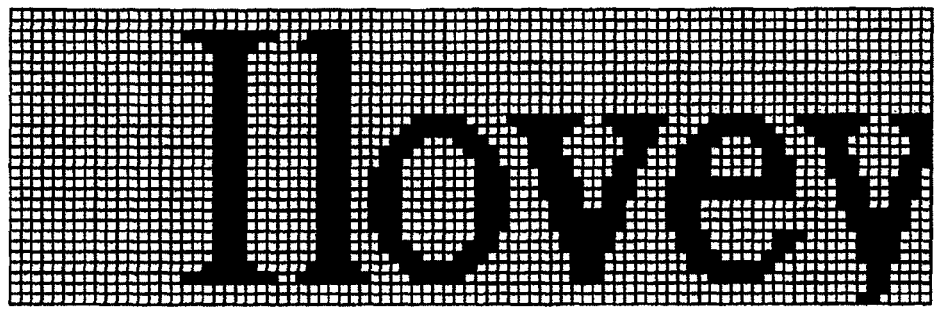
FIGS. 39A, 39B, and 39C show foreground pixel data and background pixel data before and after subtitles are shifted to the right and to the left.
Figure 39B:
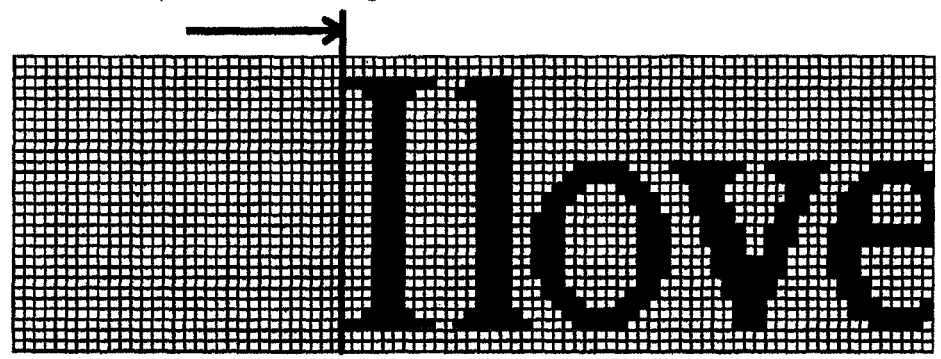
Figure 39C:

FIGS. 39A, 39B, and 39C show foreground pixel data and background pixel data before and after subtitles are shifted to the right and to the left. FIG. 39A is pixel data before having been shifted, and FIG. 39B is pixel data shifted to the right. As can be seen, by making the shift amount in the figure 15 pixels, the "y" in the subtitles "I love you" is shifted and no longer visible on the screen. FIG. 39C is pixel data shifted to the left. As can be seen, by making the shift amount in the figure 15 pixels, the "o" in the word "you" following "I love" appears.

This concludes the explanation of the inner structure of the image plane 8 and the arrangement of pixel data before and after shifting.

FIGS. 40A, 40B, and 40C show plane shift procedures for the image plane 8.

FIG. 40A shows the graphics plane after being shifted to the left and the graphics plane after being shifted to the right, as generated from the image plane 8.

FIG. 40B shows a shift to the right. As shown in this figure, the method for shifting horizontally to the right consists of steps (1-1), (1-2), and (1-3). (1-1): the right edge area of the image plane 8 is cut off. (1-2): the position of the pixel data in the image plane 8 is shifted horizontally to the right, as described above, by the shift amount indicated by the plane offset. (1-3): a transparent area is added to the left edge of the image plane 8.

FIG. 40C shows a shift to the left. As shown in this figure, the method for shifting horizontally to the left consists of steps (2-1), (2-2), and (2-3). (2-1): the left edge area of the image plane 8 is cut off. (2-2): the position of the pixel data in the image plane 8 is shifted horizontally to the left by the shift amount indicated by the plane offset. (2-3): a transparent area is added to the right edge of the image plane 8.

(Shifting Pixel Data in the Storage Elements in the Graphics Plane)

An explanation is now provided for how the pixel data in the storage elements in the graphics plane is shifted via the above-described shift. The graphics data is composed of pixel data at a resolution of 1920×1080 or 1280×720.

FIG. 41 shows pixel data stored in a graphics plane. In this figure, rectangles are 32 bit or 8-bit long storage elements, and the hexadecimal numbers 0001, 0002, 0003, 0004, 07A5, 07A6, 07A7, 07A8, 07A9, 07AA, 07AB, etc. are addresses consecutively allocated to these storage elements in the MPU memory space. The values (0, 0), (1, 0), (2, 0), (3, 0), (1916, 0), (1917, 0), (1918, 0), (1919, 0), etc. in the storage elements indicate the coordinates for the pixel data that is stored in each storage element.

In this case, the pixel data existing at coordinates (0, 0) is stored in the storage element for address 0001, the pixel data existing at coordinates (1, 0) is stored in the storage element for address 0002, the pixel data existing at coordinates (1918, 0) is stored in the storage element for address 07A7, and the pixel data existing at coordinates (0, 1) is stored in the storage element for address 07A9. It is clear, then, that graphics data for the plurality of lines constituting graphics is stored in consecutive addresses. By storing data in this way, DMA transmission is performed sequentially for the storage elements to which these consecutive addresses are assigned, thereby making it possible to read this pixel data in bursts.

FIGS. 42A and 42B show the contents stored in the graphics plane after being shifted.

FIG. 42A shows a graphics plane shifted to the right with the plane offset set to "3." Since the plane offset is "3," the pixel data for coordinates (0, 0) in the graphics plane coordinate system is stored in the storage element at address 0004, the pixel data for coordinates (1, 0) in the graphics plane coordinate system is stored in the storage element at address 0005, and the pixel data for coordinates (2, 0) in the graphics plane coordinate system is stored in the storage element at address 0006.

Also, the pixel data for coordinates (0, 1) in the graphics plane coordinate system is stored in the storage element at address 07AC, the pixel data for coordinates (1, 1) in the graphics plane coordinate system is stored in the storage element at address 07AD, and the pixel data for coordinates (2, 1) in the graphics plane coordinate system is stored in the storage element at address 07AE.

FIG. 42B shows a graphics plane shifted to the left with the plane offset set to "3." Since the plane offset is "3," the pixel data for coordinates (3, 0) in the graphics plane coordinate system is stored in the storage element at address 0001, the pixel data for coordinates (4, 0) in the graphics plane coordinate system is stored in the storage element at address 0002, and the pixel data for coordinates (5, 0) in the graphics plane coordinate system is stored in the storage element at address 0003.

Also, the pixel data for coordinates (3, 1) in the graphics plane coordinate system is stored in the storage element at address 07A9, the pixel data for coordinates (4, 1) in the graphics plane coordinate system is stored in the storage element at address 07AA, and the pixel data for coordinates (5, 1) in the graphics plane coordinate system is stored in the storage element at address 07AB.

In this way, it is clear that the coordinates for each piece of pixel data in the shifted graphics plane is shifted to the right or left from their original coordinates by the number of pixels indicated by the plane offset.

The graphics plane can be shifted by changing the addresses of storage elements, in which each piece of pixel data constituting graphics data is located, by a predetermined amount. Of course, it is possible to shift the graphics plane without changing the addresses of storage elements in which pixel data is located via equivalent processing.

(Remarks)

This concludes a description of the preferred embodiments know to the applicant at the time the present application is submitted. Further improvements or modifications may be made, however, related to the technological issues shown below. The decision to implement the present invention precisely according to the embodiments or by applying these improvements or modifications is arbitrary; consideration is thus made for the subjectivity of the person implementing the invention.

(Number of Mounted Video Decoders)

FIGS. 8 and 22 disclosed an example wherein only one video decoder 5 was mounted. This is because, when playing back stereoscopic video with an MVC video stream, it is possible to share picture data used as a reference image.

In practice, however, it is preferable to mount a video decoder to decode the left-view video stream, and another to decode the right-view video stream, thus making the number of video decoders "two."

(Use of Autoplay PlayList)

When "accessible PlayList information" exists in the BD-J object, switching from 2D playback mode to 3D playback mode and vice-versa can be performed at the time a title corresponding to the BD-J object is selected. In this case, a title switch request, such as when a disc is inserted or when selecting from a menu, triggers execution of the procedures in the flowchart in FIG. 12.

"Accessible PlayList information" includes, when a title corresponding to the BD-J object becomes the current title, instructions for a PlayList that is to be played back automatically. Accessible PlayList information also includes, when a title corresponding to the BD-J object becomes the current title, instructions for a PlayList in which applications that can be caused to operate can be chosen.

When a title is chosen, the playback control engine in the playback apparatus begins, without waiting for playback instructions from an application, to play back a PlayList designated by accessible PlayList information for the title corresponding to the selected current title. When execution of the BD-J application is completed before completion of playback of the PlayList, playback of the PlayList is continued.

When class loading of an application takes time and graphics are not rendered, causing a delay in output of a dialogue window, then with this sort of advance playback, since the playback video from playback of a PlayList is output as is, even when the application's starting delay is prominent, the playback video for a PlayList can be shown to a viewer for the time being. During the application's starting delay, at least some sort of image can be shown, thereby making a user feel relieved.

Even when completion is not simultaneous, making the application abort due to a lack of resources, if display of the PlayList playback screen is continued as is, the playback video for the PlayList will thus be continually output to the display apparatus. Via such continual output, the display apparatus will at least display something even when a Java™ program aborts. Thus, blackout of the screen when an application aborts can be prevented.

(Target of Mode Switching)

In each embodiment, the playback mode is switched from 3D to 2D, but the same effects are also achieved when switching the playback mode from 2D to 3D.

(Reuse and 2× Shift Amount)

In step S808 in FIG. 13, the graphics stream stored in the image memories 7c and 7d is decoded and output to the image plane 8. Without executing this step, however, the image plane used in step S805 in FIG. 13 may be reused, and in step S809 in FIG. 13, the image plane may be shifted in the opposite direction by two times the original amount, thereby saving the step of decoding the second image.

(Two Decoders, Two Adders)

In the structural diagram in FIG. 8, there is one video decoder, video plane, and image plane adder. To increase speed, for example, two of each of these may be provided, and the left-view image and right-view image may be processed in parallel.

(Method for Dimension Identification)

The BD-ROM has a dimension identifying flag that identifies whether a stream to be played back is for 2D playback or 3D playback, and in the embodiments, the dimension identifying flag is embedded in the PlayList (PL) information. However, information in which the stream and information specifying whether the stream is for 2D playback or 3D playback is recorded may be recorded on the BD-ROM in a different format.

(Combined Use of Scaling)

When shifting the image plane in step S809 of FIG. 13, it is preferable to make the data in the image plane larger or smaller via scaling as in step S805 in FIG. 13.

(Default Instructions for Processing)

The left/right processing storage unit 19 in steps S801-S810 in FIG. 13 is set by default to left-view processing, and thus the left-view image is first combined and output. The default may be set to right-view processing, however, to process the right-view image first.

(Target of Shifting)

In step S805 in FIG. 13, the image plane is shifted a particular amount in a particular direction, and in step S809, the image plane is shifted the same amount in the opposite direction. The amount by which the image plane is shifted, however, may be changed. Additionally, a stereoscopic effect may also be achieved by not shifting images for both eyes, but rather by shifting only the image for one eye.

(Target of Depth Setting)

In order to provide depth to only the subtitles/graphics data in a 2D video stream, the processing in steps S802-S809 in FIG. 13 can be carried out. However, in the processing in steps S804 and S807, instead of using a video frame in the left-view video stream and a video frame in the right-view video stream, a frame in the 2D stream, which is for both eyes, would be used.

(Storage Location for Image Plane Shift Information)

In the disclosure in Embodiment 1, it is assumed that the image plane shift information is stored in the current PlayList information. In order to minutely synchronize with the MVC video stream, however, it is preferable to establish an offset table in the MVC video stream and store the image plane shift information therein. In this way, minute synchronization can be performed in units of pictures. Also, when the image plane shift information is embedded in the current stream management information instead of the current PlayList information, the image plane shift information can be acquired from the current stream management information in the processing in step S5 in FIG. 12.

(Switching Depths Between Discs)

In the embodiments, the plane shift engine calculated the horizontal shift amount based on the image plane shift information in the current PlayList information. Thus, when a PlayList is switched during a processing sequence to generate output of a left-view image and a right-view image, processing to reacquire the image plane shift information acquired in step S5 in FIG. 12 is necessary. However, it is assumed that in some cases it may not be desirable to change the depth of the image plane for each PlayList. For example, it may be preferable to establish a unique depth for an entire disc or an entire title.

To establish a unique depth for an entire disc, it is assumed that the contents will be associated with information for an entire disc. For example, possibilities are the "Index.bdmv" file under the BDMV directory shown in FIG. 4, or the meta file (ZZZZZ.xml) stored in the META directory, in which a variety of pieces of information related to the video on the disc are stored.

(Switching Depths Between Titles)

To establish a unique depth for an entire title, it is assumed that the contents will be associated with information for an entire title. For example, possibilities are the "MovieObject.bdmv" file or the "XXXXX.bdjo" file respectively under the BDMV directory and BDJO directory shown in FIG. 4, or the meta file (ZZZZZ.xml) stored in the META directory, in which a variety of pieces of information related to the video on the disc are stored.

(Measures against Flickering)

HDMI may be used when connecting the playback apparatus for the BD-ROM or the like to the display apparatus, e.g. a TV. By switching from 3D display to 2D display, flickering of the video can be prevented through reauthentication of the HDMI.

(Application of Scaling)

In the real word, close objects appear to be large, and distant objects appear to be small. Only applying the above-stated plane shifting, however, makes objects appear closer or more distant without changing their size. This makes the viewer feel uncomfortable. In order to eliminate such a sense of discomfort, when the image plane is shifted in a certain direction, it can also be scaled to be shown larger or smaller.

For example, in the case of displaying an object closer to the viewer with a large shift distance, the subtitles/graphics are made larger through scaling.

(Stream Registration Information in the Playback Data Information)

Stream registration information in the playback data information is preferably constructed as an STN_table. When from among a plurality of PlayItems constituting a PlayList the PlayItem containing an STN_table becomes the current PlayItem, the STN_table defines, for a plurality of stream types, which stream to approve for playback from among (i) elementary streams multiplexed in an AV clip referred to by the main-path in the multi-path and (ii) elementary streams multiplexed in an AV clip referred to by the sub-path in the multi-path. Stream types refer to types such as a primary video stream for picture in picture, secondary video stream for picture in picture, primary audio stream for sound mixing, secondary audio stream for sound mixing, presentation graphics/text subtitle data, and interactive graphics stream. An STN_table can register, for each such type of stream, the streams for which playback is to be permitted. Concretely, an STN_table is composed of an array of pieces of stream registration information. When the PlayItem to which the STN_table belongs becomes the current PlayItem, such stream registration information indicates, in association with the stream number, what kind of stream the elementary stream that is to be permitted for playback is. The stream registration information has a data configuration wherein a combination of a stream entry and a stream attribute are associated with a logical stream number.

The stream numbers in the stream registration information are expressed as integers, such as 1, 2, 3. The largest stream number represents the number of the corresponding types of streams.

The stream attribute includes information indicating the stream's language code and the stream's encoding method. The stream entry corresponding to the stream in the main-path includes a packet identifier, and the entry corresponding to the stream in the sub-path includes an identifier specifying a transport stream file, an identifier specifying a SubPlayItem, and a packet identifier.

A packet identifier for the elementary stream to be played back is recorded in this stream entry. Since a packet identifier for the elementary stream to be played back can be recorded in the stream entry, the stream number in the stream registration information is stored in the stream number register in the playback apparatus, and based on the packet identifier in the stream entry in the stream registration information, the PID filter in the playback apparatus is made to perform packet filtering. In this way, the TS packet in the elementary stream for which playback is permitted in the STN table is output to the decoder, and the elementary stream is played back.

These pieces of stream registration information in the stream number table are arranged in order of the stream numbers. When a plurality of streams fulfill the condition of being "playable by the playback apparatus," then the positions of pieces of stream registration information in order of the stream numbers serve as the basis for which stream to prioritize for selection.

In this way, when a stream that the playback apparatus cannot play back exists in the stream registration information in the STN_table, such a stream is excluded from playback. When a plurality of streams that the playback apparatus can play back exists, the author can transmit to the playback apparatus a guideline on which stream to prioritize for selection.

The determination as to whether streams that fulfill the condition of being "playable by the playback apparatus" exist or not, as well as selection of one of the streams that fulfills the condition of being "playable," are performed when the current PlayItem switches to a new item, or when a user requests stream switching.

When the playback apparatus changes state, as when the current PlayItem switches to a new item, the above-described determination and selection are performed. A sequence of procedures to set a stream number in the stream number register, one of the registers in the register set in the playback apparatus, is referred to as "procedures to be performed upon change of state."

When a user requests stream switching, the above-described determination and selection are performed. A sequence of procedures to set a stream number in the stream number register in the playback apparatus is referred to as "procedures to be performed upon change of state."

When a BD-ROM is loaded, the procedures to set the stream number register to the initial values in the stream registration information list is referred to as "initialization."

The stream registration information list in the stream number table uniformly prioritizes the streams designated by the SubPlayItem information and the streams designated by the PlayItem information. Therefore, as long as they are designated by the SubPlayItem information, even streams that are not multiplexed with the video stream become the target for selection of streams to be played back synchronously with the video stream.

Also, the playback apparatus can play back a stream designated by the SubPlayItem information, and if the priority of the stream designated by the SubPlayItem information is higher than the priority of the graphics stream multiplexed with the video stream, then instead of a stream multiplexed with the video stream, the stream designated by the SubPlayItem information can be played back.

This provision of a stream designated by the SubPlayItem information for playback instead of a stream multiplexed with the video stream is the essence of the STN_table.

As an improvement to the STN_table for stereoscopic playback, an extension to the STN_table uniquely for 3D mode (referred to as STN_table_SS (Stereoscopic)) is created in the PlayList information. This STN_table_SS is composed of a stream registration information list for the left-view video stream, stream registration information list for the right-view video stream, stream registration information list for the left-view presentation graphics stream, stream registration information list for the right-view presentation graphics stream, stream registration information list for the left-view interactive graphics stream, and stream registration information list for the right-view interactive graphics stream.

In 3D mode, the stream registration information lists for each type of stream in the STN_table_SS are combined with the stream registration information lists for each stream in the STN_table.

This combination is performed by replacing the stream registration information list for the primary video stream in the STN_table with the stream registration information list for the left-view video stream and the stream registration information list for the right-view video stream in the STN_table_SS, replacing the stream registration information list for the secondary video stream in the STN_table with the stream registration information list for the left-view secondary video stream and the stream registration information list for the right-view secondary video stream in the STN_table_SS, replacing the stream registration information list for the presentation graphics stream in the STN_table with the stream registration information list for the left-view presentation graphics stream and the stream registration information list for the right-view presentation graphics stream in the STN_t- able_SS, and replacing the stream registration information list for the interactive graphics stream in the STN_table with the stream registration information list for the left-view interactive graphics stream and the stream registration information list for the right-view interactive graphics stream in the STN_table_SS.

If the STN_table and the STN_table_SS are combined, then by performing the above-described procedures on the combined STN_table, stream registration information for the elementary stream to be selected in 3D mode is chosen from among the stream registration information list in the combined STN_table. The stream number for the chosen stream registration information is then set in the stream number register in the playback apparatus. Additionally, a packet identifier is extracted from among the chosen stream registration information, and the PID filter in the playback apparatus is made to perform packet filtering based on the packet identifier. In this way, the TS packets constituting the left-view stream and the right-view stream are input into the decoder, which can be made to perform playback output. Accordingly, the left-view stream and the right-view stream can be provided for playback, and stereoscopic playback is thus possible through a combination of the playback output of these two streams.

(Variation on the Recording Medium)

The recording medium in the embodiments includes package media in general, such as an optical disc, semi-conductor memory card, etc. An optical disc with necessary data pre-recorded (e.g. an existing readable optical disc, such as a BD-ROM or DVD-ROM) was used as an example of a recording medium in the embodiments. The recording medium need not be limited, however, in this way. For example, 3D contents including the data necessary for implementing the present invention could be broadcast or could be transmitted over a network and then recorded on a writable optical disc (e.g. an existing writeable optical disc, such as a BD-RE or DVD-RAM) using a terminal apparatus having a function to write on an optical disc. This function could be embedded in the playback apparatus, or could be an apparatus separate from the playback apparatus. The optical disc recorded in this way could then be used by a playback apparatus according to the present invention to implement the present invention.

Also, apart from optical discs, the present invention may be implemented using a semiconductor memory card such as an SD memory card or the like as the recording medium.

(Playback of a Semiconductor Memory Card)

An explanation is now provided for playback procedures when, for example, using a semiconductor memory card as the recording medium. Whereas for an optical disc, data is for example read through an optical disc drive, when using a semiconductor memory card, a structure would be adopted with an I/F to read data in the semiconductor memory card.

Concretely, inserting a semiconductor memory card into a slot (not shown in the figures) in the playback apparatus electronically connects the playback apparatus and the semiconductor memory card via a semiconductor memory card I/F. The playback apparatus would be constructed to read data recorded on the semiconductor memory card via the semiconductor memory card I/F.

(Program Embodiment)

A program can be created based on the procedures shown in the flowcharts in each embodiment, and a computer readable recording medium with this program recorded thereon can be implemented.

First, using a programming language, a software developer writes source code to implement each flowchart and the functional, structural elements of the present invention. In accordance with the syntax of the programming language, the software developer writes source code to embody the flowcharts and functional, structural elements using class structures, variables, array variables, and calls to external functions.

The written source code is provided to a compiler as a file. The compiler translates this source code to generate object programs.

Translation by the compiler consists of a process of syntax analysis, optimization, resource allocation, and code generation. During syntax analysis, the compiler performs lexical analysis, syntax analysis, and semantic analysis on the source code to convert the source code into intermediate code. During resource allocation, in order to adapt to the instruction set of the target processor, the compiler allocates the variables in the intermediate code to the register or the memory of the target processor. During code generation, the compiler converts each intermediate instruction in the intermediate code into program code to obtain object programs.

The generated object programs consist of one or more program codes to cause a computer to execute each step in the flowcharts shown in each embodiment and each procedure in the functional, structural elements. There are many varieties of program code, such as the processor's native code, JAVA™ bytecode, etc. There are many ways to implement each step by a program code. When each step can be implemented using an external function, the call to the external function is the program code. A program code implementing one step may also belong to different object programs. In a RISC processor, in which instruction types are restricted, each step in the flowcharts can be implemented by combining arithmetic calculation instructions, logical calculation instructions, branch instructions, etc.

After object programs are generated, the programmer uses a linker on these object programs. The linker allocates the object programs and associated library programs to memory and combines them to generate a load module. A load module generated in this way is assumed to be read by a computer, and the load module causes a computer to execute the procedures shown in each flowchart and the procedures for the functional, structural elements. The program is recorded on a computer readable recording medium and provided to users.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

INDUSTRIAL APPLICABILITY

In a playback apparatus for playing back a stereoscopic video stream, the present invention is applicable to technology for overlaying and displaying subtitles and graphics on a stereoscopic video stream, and in particular to a stereoscopic video playback apparatus that also stereoscopically outputs subtitles and graphics overlaid on the stereoscopic video stream.

REFERENCE SIGNS LIST

100 BD-ROM
200 Playback apparatus
300 Remote control
400 Television 500 Liquid crystal glasses
1a BD drive
1b Network device
1c Local storage
2a, 2b Read buffers
3 Virtual file system
4 Demultiplexer
5 Video decoder
6 Video plane
7a, b Image decoders
7c, d Image memories
8 Image plane
9 Audio decoder
10 Interactive graphics plane
11 Background plane
12 Register set
13 Static scenario memory
14 Playback control engine
15 Scalar engine
16 Composition unit
17 HDMI transmitting/receiving unit
18 Display function flag storage unit
19 Left/right processing storage unit
20 Plane shift engine
21 Shift information memory
22 BD-J platform

What is claimed is:

1. A playback apparatus, a playback mode of which can be switched between 3D mode to show a user video frames stereoscopically and 2D mode to show the user video frames monoscopically, the playback apparatus comprising:
a read unit operable to read a digital stream that includes a left-view video stream and a right-view video stream from a recording medium;
a mode storage unit storing a current playback mode;
a dimension determining unit operable to determine whether the digital stream read from the recording medium supports 3D mode;
a demultiplexer operable, when (i) the digital stream supports 3D mode and (ii) the current playback mode is 3D mode, to separate both the left-view video stream and the right-view video stream from the digital stream, and when condition (i) or (ii) is not met, to separate one of the left-view video stream and the right-view video stream from the digital stream;
a video decoder operable to obtain video frames to show stereoscopically or monoscopically by decoding the separated video stream; and
a playback control unit operable to control the video decoder so that, when trickplay is requested while the current playback mode is 3D mode, a same video frame output from the video decoder is written on both a left-view video plane and a right-view video plane while maintaining the playback mode in 3D mode, wherein
the same video frame is a video frame obtained by decoding one of the left-view video stream and the right-view video stream separated from the digital stream, and
the left-view video stream and the right-view video stream being output without shifting coordinates.

2. The playback apparatus in claim 1, wherein trickplay indicates one of fast forward and rewind.

3. The playback apparatus in claim 1, wherein trickplay changes a playback speed,
when trickplay that changes a playback speed is requested, the playback control unit determines whether it is possible to output a video frame in the left-view video stream and a video frame in the right-view video stream alternately at the changed playback speed, and
writing of the same video frame on the left-view video plane and the right-view video plane is performed only when the playback control unit determines that it is not possible to output video frames alternately at the changed playback speed.

4. The playback apparatus of claim 3, wherein
a playback speed at which it is possible to output a video frame in the left-view video stream and a video frame in the right-view video stream alternately is one of a) a playback speed when trickplay is quick view, b) a playback speed when trickplay is frame forward, and c) a playback speed when trickplay is frame reverse.

5. The playback apparatus in claim 1, wherein when trickplay is indicated in 3D mode, one of (a) and (b) is performed:
(a) one of a video frame obtained by decoding a left-view video stream and a video frame obtained by decoding a right-view video stream is output, without being combined with graphics, and
(b) one of a video frame obtained by decoding a left-view video stream and a video frame obtained by decoding a right-view video stream is output after being combined with graphics whose pixel coordinates have not changed via a plane shift.

6. The playback apparatus in claim 5, further comprising:
a platform unit operable to execute a bytecode application; and
a command interpreter operable to interpret and execute a program described in commands, wherein
the playback is stopped or paused via one of (c), (d), (e), and (f):
(c) user operation via remote control;
(d) an instruction by a bytecode application executed by the platform unit;
(e) an instruction from an object program executed by the command interpreter; and
(f) the left-view or right-view video stream being played back to an end.

7. The playback apparatus in claim 1, wherein
when trickplay is indicated in 3D mode, one of (a) and (b) is performed:
(a) one of a video frame obtained by decoding a left-view video stream and a video frame obtained by decoding a right-view video stream is output, without being combined with graphics, and
(b) one of a video frame obtained by decoding a left-view video stream and a video frame obtained by decoding a right-view video stream is output after being combined with graphics whose pixel coordinates have not changed via a plane shift.

8. The playback apparatus in claim 7, further comprising:
a platform unit operable to execute a bytecode application; and
a command interpreter operable to interpret and execute a program described in commands, wherein
the playback is stopped or paused via one of (c), (d), (e), and (f):
(c) user operation via remote control;
(d) an instruction by a bytecode application executed by the platform unit;
(e) an instruction from an object program executed by the command interpreter; and
(f) the left-view or right-view video stream being played back to an end.

9. A playback apparatus, a playback mode of which can be switched between 3D mode to show a user video frames stereoscopically and 2D mode to show the user video frames monoscopically, the playback apparatus comprising:
- a read unit operable to read a digital stream that includes a left-view video stream and a right-view video stream from a recording medium;
- a mode storage unit storing a current playback mode;
- a dimension determining unit operable to determine whether the digital stream read from the recording medium supports 3D mode;
- a demultiplexer operable, when (i) the digital stream supports 3D mode and (ii) the current playback mode is 3D mode, to separate both the left-view video stream and the right-view video stream from the digital stream, and when condition (i) or (ii) is not met, to separate one of the left-view video stream and the right-view video stream from the digital stream; and
- a video decoder operable to obtain video frames to show stereoscopically or monoscopically by decoding the separated video stream; wherein:
- playback section information, which includes mask information indicating whether to mask an instruction for trickplay by a user or an instruction for trickplay by contents, is recorded on the recording medium, and
- the playback apparatus further comprises:
- a playback control unit operable to determine, when a request for trickplay is made during 3D mode, whether the mask information indicates that an instruction for trickplay by a user is masked, wherein
- when the mask information indicates that trickplay is masked, the playback control unit causes the video decoder to output video frames alternately without performing trickplay, and
- when the mask information indicates that trickplay is not masked, a same video frame output from the video decoder can be repeatedly written on the left-view video plane and the right-view video plane while maintaining the playback mode in the mode storage unit in 3D mode, and
- the left-view video stream and the right-view video stream being output without shifting coordinates.

10. The playback apparatus in claim 9, wherein when playback by the video decoder is stopped or paused, one of (a) and (b) is performed:
- (a) a video frame obtained by decoding a left-view video stream and a video frame obtained by decoding a right-view video stream that exist at a position where playback stops are alternately output after being combined with graphics whose pixel coordinates have changed via a plane shift, and
- (b) only a video frame obtained by decoding a left-view video stream and a video frame obtained by decoding a right-view video stream that exist at a position where playback stops are alternately output, and video frames are not combined with graphics.

11. The playback apparatus in claim 9, wherein when playback by the video decoder changes from normal playback to slideshow playback, one of processes (a) and (b) is performed while maintaining the playback mode in 3D mode:
- (a) a video frame obtained by decoding the left-view video stream and a video frame obtained by decoding the right-view video stream are alternately output after being combined with graphics whose pixel coordinates have changed via a plane shift, and
- (b) only a video frame obtained by decoding a left-view video stream and a video frame obtained by decoding a right-view video stream are alternately output, and graphics in the image plane are not output.

12. A playback method, comprising:
- reading a video stream including a base view video stream and an associated dependent view video stream from a recording medium;
- outputting first decoded video data as video data for a left eye from a video plane memory;
- outputting second decoded video data as video data for a right eye from the video plane memory;
- determining, when trickplay is requested during stereoscopic video playback, whether to permit the requested trickplay based on mask information indicating whether to mask trickplay; and
- providing, when the determination is that the requested trickplay is permitted, the first decoded video data and the second decoded video data based on the base view video stream, the first decoded video data and the second decoded video data not being provided based on the dependent view video stream, the first decoded video data and the second decoded video data being identical, the first decoded video data and the second decoded video data being outputted without shifting coordinates of the first decoded video data and the second decoded video data and no decoded video data being outputted from the video plane memory between the output of the first decoded video data and the output of the second decoded video data.

13. The playback method according to claim 12, wherein the mask information is recorded on the recording medium.

14. The playback method according to claim 12, wherein the trickplay is requested based on a user operation.

15. A playback apparatus, comprising:
- a reader that reads a video stream including a base view video stream and an associated dependent view video stream from a recording medium;
- an outputter that outputs first decoded video data as video data for a left eye from a video plane memory, and that outputs second decoded video data as video data for a right eye from the video plane memory;
- a determiner that determines, when trickplay is requested during stereoscopic video playback, whether to permit the requested trickplay based on mask information indicating whether to mask trickplay; and
- a provider that provides, when the determination is that the requested trickplay is permitted, the first decoded video data and the second decoded video data based on the base view video stream, the first decoded video data and the second decoded video data not being provided based on the dependent view video stream, the first decoded video data and the second decoded video data being identical, the first decoded video data and the second decoded video data being outputted without shifting coordinates of the first decoded video data and the second decoded video data and no decoded video data being outputted from the video plane memory between the output of the first decoded video data and the output of the second decoded video data.

* * * * *